(12) United States Patent
Makida et al.

(10) Patent No.: US 12,366,737 B2
(45) Date of Patent: Jul. 22, 2025

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Ayumu Makida, Kawaguchi (JP); Tomoki Ito, Kawasaki (JP); Satoshi Miwa, Yokohama (JP)

(73) Assignee: Nikon Corporation, Tokyo (JP)

( * ) Notice: Subject to any disclaimer, the term of this patent is extended or adjusted under 35 U.S.C. 154(b) by 926 days.

(21) Appl. No.: 17/423,882

(22) PCT Filed: Jan. 31, 2019

(86) PCT No.: PCT/JP2019/003359
§ 371 (c)(1),
(2) Date: Jul. 18, 2021

(87) PCT Pub. No.: WO2020/157904
PCT Pub. Date: Aug. 6, 2020

(65) Prior Publication Data
US 2022/0121021 A1    Apr. 21, 2022

(51) Int. Cl.
G02B 15/14  (2006.01)
G02B 15/20  (2006.01)
G02B 27/00  (2006.01)

(52) U.S. Cl.
CPC ......... *G02B 15/1461* (2019.08); *G02B 15/20* (2013.01); *G02B 27/0025* (2013.01)

(58) Field of Classification Search
CPC . G02B 15/1461; G02B 15/20; G02B 27/0025
See application file for complete search history.

(56) References Cited

U.S. PATENT DOCUMENTS

| 2009/0195885 A1 | 8/2009 | Yamanaka et al. |
| 2011/0019288 A1 | 1/2011 | Yamanaka et al. |
| (Continued) | | |

FOREIGN PATENT DOCUMENTS

| CN | 106461921 A | 2/2017 |
| JP | H09-184981 A | 7/1997 |
| (Continued) | | |

OTHER PUBLICATIONS

International Search Report from International Patent Application No. PCT/JP2019/003359, Apr. 23, 2019.
(Continued)

*Primary Examiner* — Jack Dinh
(74) *Attorney, Agent, or Firm* — Potomac Law Group, PLLC

(57) ABSTRACT

A zoom optical system (ZL), comprises, in order from an object: a first lens group (G1) having a positive refractive power; a second lens group (G2) having a negative refractive power; a third lens group (G3) having a positive refractive power; a fourth lens group (G4) having a positive refractive power; a fifth lens group (G5); and a sixth lens group (G6). In the zoom optical system, upon zooming, a distance between the adjacent lens groups changes. The zoom optical system satisfies the following conditional expression.

$$1.00 < Mv4/Mv3 < 3.00$$

where Mv3: an amount of movement of the third lens group upon zooming from a wide angle end state to a telephoto end state (a sign of the amount of movement toward an object is shown as +), and Mv4: an amount of movement of the fourth lens group upon zooming from the wide angle end state to the
(Continued)

telephoto end state (the sign of the amount of movement toward an object is shown as +).

18 Claims, 41 Drawing Sheets

(56) References Cited

U.S. PATENT DOCUMENTS

| | | |
|---|---|---|
| 2014/0211029 A1 | 7/2014 | Okumura |
| 2015/0219882 A1 | 8/2015 | Mog |
| 2017/0115472 A1 | 4/2017 | Obama et al. |
| 2019/0391374 A1 | 12/2019 | Obama et al. |

FOREIGN PATENT DOCUMENTS

| | | |
|---|---|---|
| JP | 2009-168933 A | 7/2009 |
| JP | 2014-145960 A | 8/2014 |
| JP | 2015-145914 A | 8/2015 |
| JP | 2015-206893 A | 11/2015 |

OTHER PUBLICATIONS

Office Action issued Jan. 26, 2022, in Chinese Patent Application No. 201980090247.8.
Office Action issued May 10, 2022, in Japanese Patent Application No. 2020-569268.
International Preliminary Report on Patentability from International Patent Application No. PCT/JP2019/003359, Aug. 12, 2021.

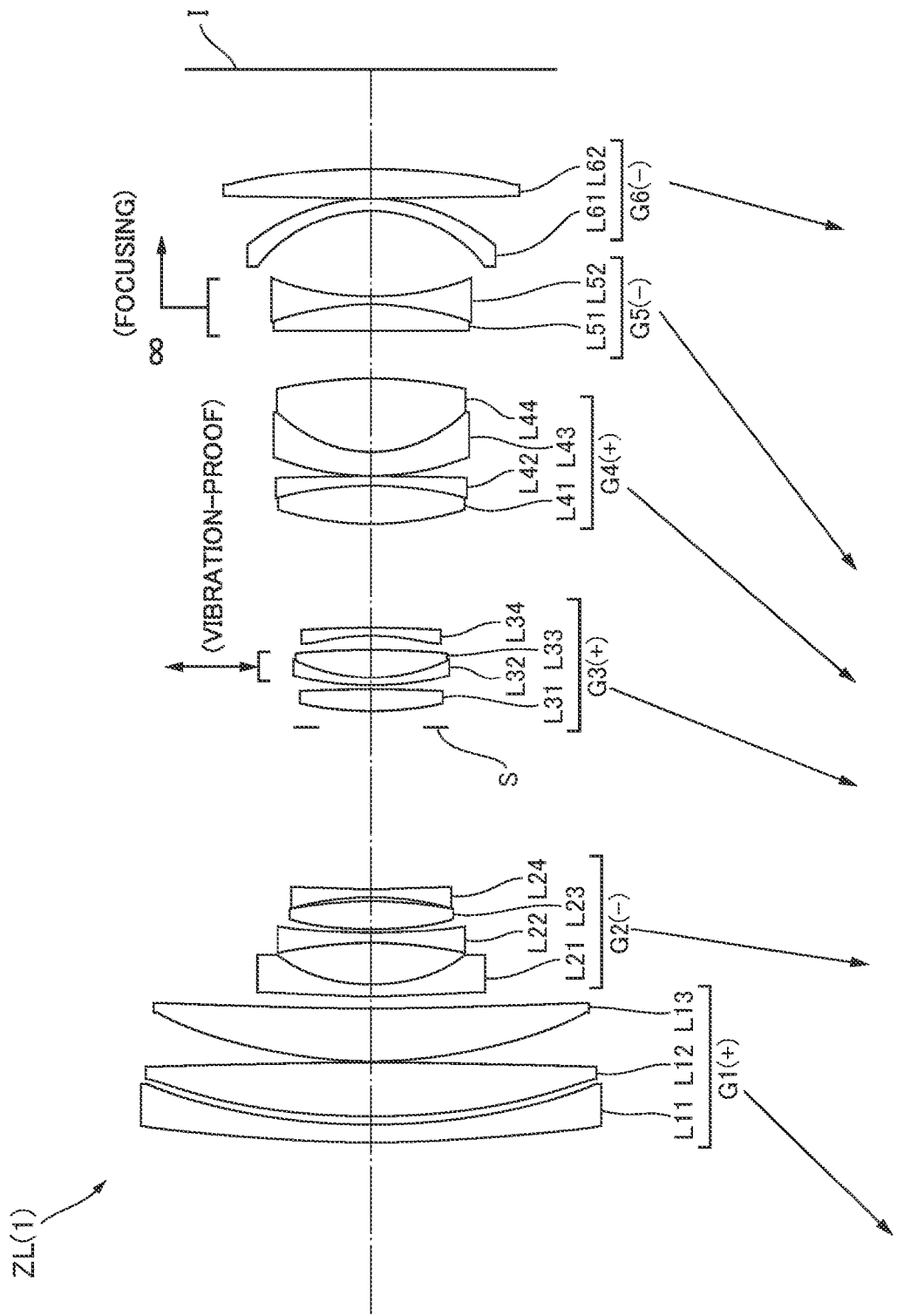

COMA ABERRATION

COMA ABERRATION

COMA ABERRATION

COMA ABERRATION

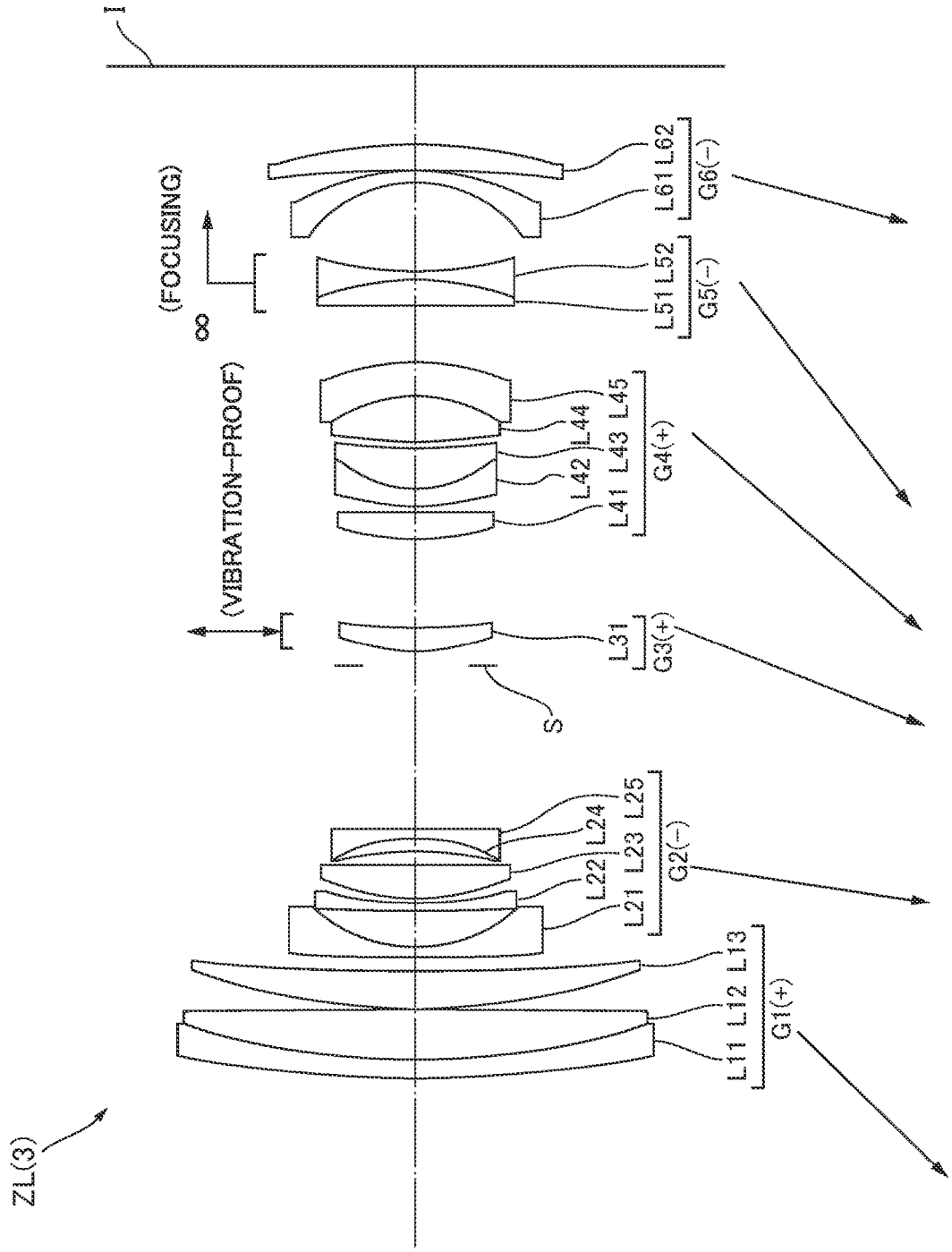

COMA ABERRATION

COMA ABERRATION

COMA ABERRATION

COMA ABERRATION

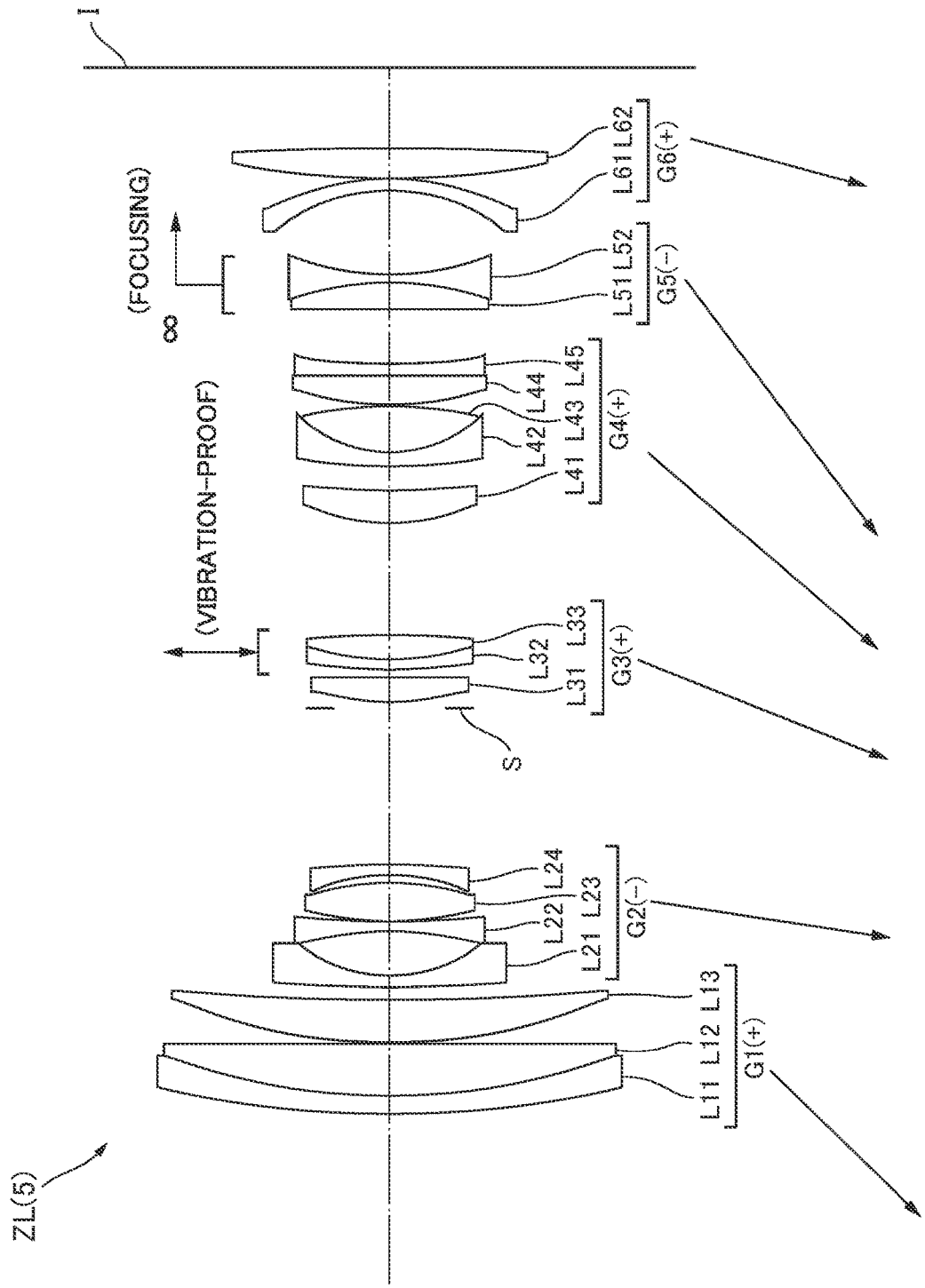

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus including the same, and a method for manufacturing the zoom optical system.

TECHNICAL BACKGROUND

Conventionally, zoom optical systems suitable for photographic cameras, electronic still cameras, video cameras and the like have been proposed (for example, see Patent literature 1). If the zooming capability and the angle of view of the zoom optical system are increased, it is difficult to achieve a favorable optical performance, and the zoom optical system tends to increase in size.

PRIOR ARTS LIST

Patent Document

Patent literature 1: Japanese Laid-Open Patent Publication No. H09-184981(A)

SUMMARY OF THE INVENTION

A zoom optical system according to a first aspect comprises, in order from an object: a first lens group having a positive refractive power; a second lens group having a negative refractive power; a third lens group having a positive refractive power; a fourth lens group having a positive refractive power; a fifth lens group; and a sixth lens group, wherein upon zooming, a distance between the adjacent lens groups changes, and the zoom optical system satisfies the following conditional expression:

$$1.00 < Mv4/Mv3 < 3.00$$

where Mv3: an amount of movement of the third lens group upon zooming from a wide angle end state to a telephoto end state (a sign of the amount of movement toward an object is shown as +), and Mv4: an amount of movement of the fourth lens group upon zooming from the wide angle end state to the telephoto end state (the sign of the amount of movement toward an object is shown as +).

An optical apparatus according to a second aspect comprises the zoom optical system mounted thereon.

A method according to a third aspect for manufacturing a zoom optical system that comprises, in order from the object: a first lens group having a positive refractive power; a second lens group having a negative refractive power; a third lens group having a positive refractive power; a fourth lens group having a positive refractive power; a fifth lens group; and a sixth lens group. the method comprises: arranging the lens groups in a lens barrel such that upon zooming, a distance between the adjacent lens groups changes, and satisfying the following conditional expression:

$$1.00 < Mv4/Mv3 < 3.00$$

where Mv3: an amount of movement of the third lens group upon zooming from a wide angle end state to a telephoto end state (a sign of the amount of movement toward an object is shown as +), and Mv4: an amount of movement of the fourth lens group upon zooming from the wide angle end state to the telephoto end state (the sign of the amount of movement toward an object is shown as +).

BRIEF DESCRIPTION OF THE DRAWINGS

FIG. 1 is a lens configuration diagram of a zoom optical system according to a first example upon focusing on infinity in a wide angle end state;

FIG. 7 is a lens configuration diagram of a zoom optical system according to a third example upon focusing on infinity in a wide angle end state;

FIG. 13 is a lens configuration diagram of a zoom optical system according to a fifth example upon focusing on infinity in a wide angle end state;

DESCRIPTION OF THE EMBODIMENTS

Figure 40:
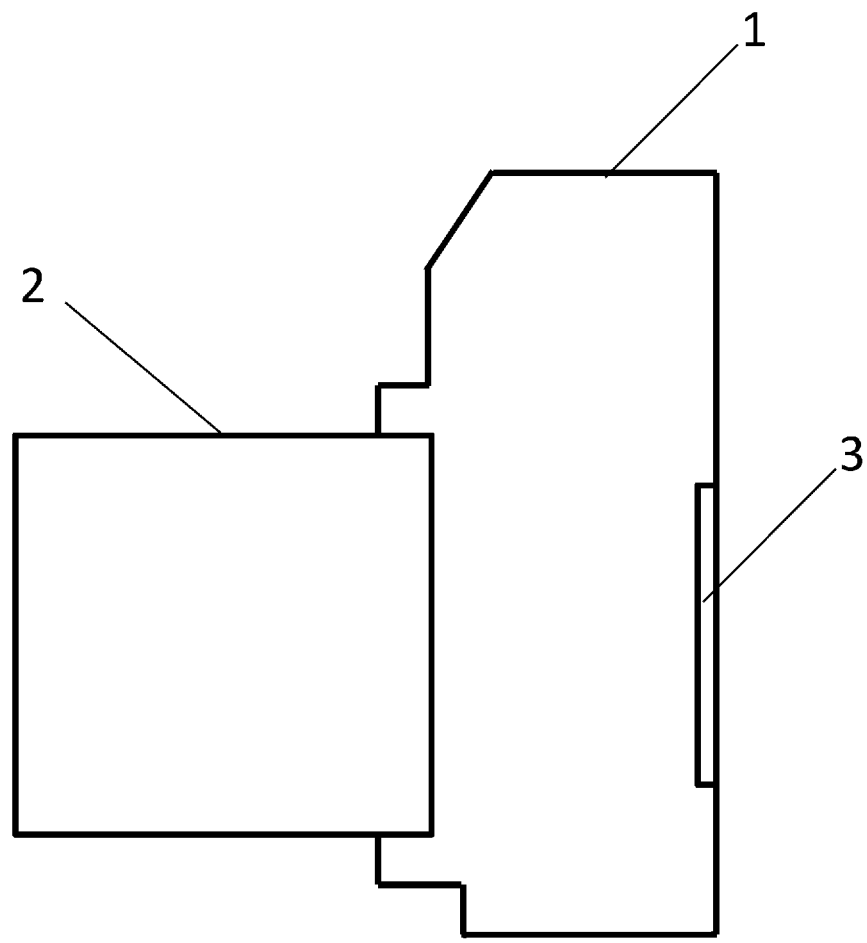
FIG. 40 shows a configuration of a camera that comprises a zoom optical system according to this embodiment.

Hereinafter, a zoom optical system and an optical apparatus according to this embodiment will be described with reference to the drawings. First, a camera (optical apparatus) comprising the zoom optical system according to this embodiment is described with reference to FIG. 40. As shown in FIG. 40, the camera 1 is a digital camera that comprises the zoom optical system according to this embodiment as a photographing lens 2. In the camera 1, light from an object (photographic object), not shown, is collected by the photographing lens 2, and reaches an image pickup element 3. Accordingly, the light from the photographic object is captured by an image pickup element 3, and is recorded as a photographic object image in a memory, not shown. A photographer can thus take an image of the photographic object through the camera 1. Note that the camera may be a mirrorless camera, or a single-lens reflex type camera that includes a quick return mirror.

Next, the zoom optical system (photographing lens) according to this embodiment will be described. As shown in FIG. 1, a zoom optical system ZL(1) that is an example of a zoom optical system (zoom lens) ZL according to this embodiment comprises, in order from an object: a first lens group G1 having a positive refractive power; a second lens group G2 having a negative refractive power; a third lens group G3 having a positive refractive power; a fourth lens group G4 having a positive refractive power; a fifth lens group G5; and a sixth lens group G6. Upon zooming, a distance between the adjacent lens groups changes. Accordingly, variation in astigmatism and spherical aberration upon zooming can be suppressed.

In the configuration described above, the zoom optical system ZL according to this embodiment satisfies the following conditional expression (1).

$$1.000 < Mv4/Mv3 < 3.00 \qquad (1)$$

where Mv3: an amount of movement of the third lens group G3 upon zooming from a wide angle end state to a telephoto end state (a sign of the amount of movement toward an object is shown as +), and Mv4: an amount of movement of the fourth lens group G4 upon zooming from the wide angle end state to the telephoto end state (a sign of the amount of movement toward an object is shown as +).

According to this embodiment, the zoom optical system that has a high zooming ratio and a favorable optical performance, and the optical apparatus that comprises the zoom optical system can be obtained. The zoom optical system ZL according to this embodiment may be a zoom optical system ZL(2) shown in FIG. 4, a zoom optical system ZL(3) shown in FIG. 7, a zoom optical system ZL(4) shown in FIG. 10, or a zoom optical system ZL(5) shown in FIG. 13. The zoom optical system ZL according to this embodiment may be a zoom optical system ZL(6) shown in FIG. 16, a zoom optical system ZL(7) shown in FIG. 19, a zoom optical system ZL(8) shown in FIG. 22, or a zoom optical system ZL(9) shown in FIG. 25. The zoom optical system ZL according to this embodiment may be a zoom optical system ZL(10) shown in FIG. 28, a zoom optical system ZL(11) shown in FIG. 31, or a zoom optical system ZL(13) shown in FIG. 37.

The conditional expression (1) defines the ratio between the amount of movement of the third lens group G3 and the amount of movement of the fourth lens group G4 upon zooming from the wide angle end state to the telephoto end state. By satisfying the conditional expression (1), variation in spherical aberration and field curves upon zooming can be suppressed.

If the corresponding value of the conditional expression (1) falls below the lower limit value, it is difficult to suppress variation in field curves upon zooming. By setting the lower limit value of the conditional expression (1) to 1.05, the advantageous effects of this embodiment can be more secured. To further secure the advantageous effects of this embodiment, the lower limit value of the conditional expression (1) may be set to 1.10, 1.15, 1.18, 1.20, 1.23, 1.25, 1.28, 1.30, 1.33 and further to 1.35.

If the corresponding value of the conditional expression (1) exceeds the upper limit value, it is difficult to correct the field curves in the wide angle end state. By setting the upper limit value of the conditional expression (1) to 2.80, the advantageous effects of this embodiment can be more secured. To further secure the advantageous effects of this embodiment, the upper limit value of the conditional expression (1) may be set to 2.50, 2.30, 2.00, 1.80, 1.65, 1.62, 1.60, 1.58, 1.55, 1.53, and further to 1.50.

Preferably, the zoom optical system ZL according to this embodiment satisfies the following conditional expression (2).

$$0.000 < Mv2/fw < 10.00 \quad (2)$$

where Mv2: an amount of movement of the second lens group G2 upon zooming from the wide angle end state to the telephoto end state (a sign of the amount of movement toward an object is shown as +), and fw: a focal length of the zoom optical system ZL in the wide angle end state.

The conditional expression (2) defines the amount of movement of the second lens group G2 upon zooming from the wide angle end state to the telephoto end state. Note that the conditional expression (2) means that the second lens group G2 moves toward the object upon zooming from the wide angle end state to the telephoto end state. By satisfying the conditional expression (2), the spherical aberration in the telephoto end state can be favorably corrected.

If the corresponding value of the conditional expression (2) falls below the lower limit value, it is difficult to correct the spherical aberration in the telephoto end state. By setting the lower limit value of the conditional expression (2) to 0.05, the advantageous effects of this embodiment can be more secured. To further secure the advantageous effects of this embodiment, the lower limit value of the conditional expression (2) may be set to 0.08, 0.10, 0.13, 0.15, 0.18, 0.20, 0.22, and further to 0.24.

If the corresponding value of the conditional expression (2) exceeds the upper limit value, it is difficult to correct the spherical aberration in the telephoto end state. By setting the upper limit value of the conditional expression (2) to 8.00, the advantageous effects of this embodiment can be more secured. To further secure the advantageous effects of this embodiment, the upper limit value of the conditional expression (2) may be set to 5.00, 3.00, 2.50, 2.20, 2.00, 1.80, 1.50, 1.30, 1.10, 0.95, 0.90, 0.85, 0.80, 0.75, and further to 0.70.

Preferably, the zoom optical system ZL according to this embodiment satisfies the following conditional expression (3).

$$3.00 < ft/fw < 30.00 \quad (3)$$

where ft: a focal length of the zoom optical system ZL in the telephoto end state, and fw: a focal length of the zoom optical system ZL in the wide angle end state.

The conditional expression (3) defines the zooming ratio of the zoom optical system ZL. By satisfying the conditional expression (3), the advantageous effects of this embodiment can be exerted to the maximum at a high zooming ratio. By setting the lower limit value of the conditional expression (3) to 3.30, the advantageous effects of this embodiment can be more secured. To further secure the advantageous effects of this embodiment, the lower limit value of the conditional expression (3) may be set to 3.50, 4.00, 4.50, 5.00, 6.00, and further to 7.00. By setting the upper limit value of the conditional expression (3) to 25.00, the advantageous effects of this embodiment can be more secured. To further secure the advantageous effects of this embodiment, the upper limit value of the conditional expression (3) may be set to 20.00, 15.00, 10.00, 9.00, and further to 8.00.

Preferably, the zoom optical system ZL according to this embodiment satisfies the following conditional expression (4).

$$35.0° < \omega w < 75.0° \quad (4)$$

where ωw: a half angle of view of the zoom optical system ZL in the wide angle end state.

The conditional expression (4) defines the half angle of view of the zoom optical system ZL in the wide angle end state. By satisfying the conditional expression (4), the field curves can be favorably corrected. By setting the lower limit value of the conditional expression (4) to 38.0°, the advantageous effects of this embodiment can be more secured. To further secure the advantageous effects of this embodiment, the lower limit value of the conditional expression (4) may be set to 40.0°. By setting the upper limit value of the conditional expression (4) to 70.0°, the advantageous effects of this embodiment can be more secured. To further secure the advantageous effects of this embodiment, the upper limit value of the conditional expression (4) may be set to 60.0°, 50.0°, and further to 45.0°.

Preferably, the zoom optical system ZL according to this embodiment satisfies the following conditional expression (5).

$$2.5° < \omega t < 15.0° \quad (5)$$

where ωt: a half angle of view of the zoom optical system ZL in the telephoto end state.

The conditional expression (5) defines the half angle of view of the zoom optical system ZL in the telephoto end state. By satisfying the conditional expression (5), the advantageous effects of this embodiment can be exerted to the maximum at a high zooming ratio. By setting the lower limit value of the conditional expression (5) to 4.0°, the advantageous effects of this embodiment can be more secured. To further secure the advantageous effects of this embodiment, the lower limit value of the conditional expression (5) may be set to 5.0° and further to 5.5°. By setting the upper limit value of the conditional expression (5) to 13.0°, the advantageous effects of this embodiment can be more secured. To further secure the advantageous effects of this embodiment, the upper limit value of the conditional expression (5) may be set to 12.0°, 11.0°, 10.0°, and further to 9.0°.

Preferably, the zoom optical system ZL according to this embodiment satisfies the following conditional expression (6).

$$-0.30 < fw/f123w < 0.60 \qquad (6)$$

where fw: a focal length of the zoom optical system ZL in the wide angle end state, and f123w: a combined focal length of the first lens group G1, the second lens group G2 and the third lens group G3 in the wide angle end state.

The conditional expression (6) defines the ratio between the focal length of the zoom optical system ZL and the combined focal length of the first lens group G1, the second lens group G2 and the third lens group G3 in the wide angle end state. Note that the conditional expression (6) means that the first lens group G1, the second lens group G2 and the third lens group G3 are substantially afocal in the wide angle end state. By satisfying the conditional expression (6), the spherical aberration and field curves in the wide angle end state can be favorably corrected.

If the corresponding value of the conditional expression (6) falls below the lower limit value, it is difficult to correct the spherical aberration in the wide angle end state. By setting the lower limit value of the conditional expression (6) to −0.28, the advantageous effects of this embodiment can be more secured. To further secure the advantageous effects of this embodiment, the lower limit value of the conditional expression (6) may be set to −0.25, −0.20, −0.15, and further to −0.12.

If the corresponding value of the conditional expression (6) exceeds the upper limit value, it is difficult to correct the spherical aberration in the wide angle end state. By setting the upper limit value of the conditional expression (6) to 0.55, the advantageous effects of this embodiment can be more secured. To further secure the advantageous effects of this embodiment, the upper limit value of the conditional expression (6) may be set to 0.50, 0.45, 0.40, 0.35, 0.30, 0.25, 0.20, 0.15, 0.10, and further to 0.05.

Preferably, the zoom optical system ZL according to this embodiment satisfies the following conditional expression (7).

$$-1.50 < ft/f123t < 1.00 \qquad (7)$$

where ft: a focal length of the zoom optical system ZL in the telephoto end state, and f123t: a combined focal length of the first lens group G1, the second lens group G2 and the third lens group G3 in the telephoto end state.

The conditional expression (7) defines the ratio between the focal length of the zoom optical system ZL and the combined focal length of the first lens group G1, the second lens group G2 and the third lens group G3 in the telephoto end state. Note that the conditional expression (7) means that the first lens group G1, the second lens group G2 and the third lens group G3 are substantially afocal in the telephoto end state. By satisfying the conditional expression (7), the spherical aberration and field curves in the telephoto end state can be favorably corrected.

If the corresponding value of the conditional expression (7) falls below the lower limit value, it is difficult to correct the spherical aberration in the telephoto end state. By setting the lower limit value of the conditional expression (7) to −1.35, the advantageous effects of this embodiment can be more secured. To further secure the advantageous effects of this embodiment, the lower limit value of the conditional expression (7) may be set to −1.00, −0.90, and further to −0.80.

If the corresponding value of the conditional expression (7) exceeds the upper limit value, it is difficult to correct the spherical aberration in the telephoto end state. By setting the upper limit value of the conditional expression (7) to 0.50, the advantageous effects of this embodiment can be more secured. To further secure the advantageous effects of this embodiment, the upper limit value of the conditional expression (7) may be set to 0.20, 0.10, −0.10, and further to −0.20.

Preferably, the zoom optical system ZL according to this embodiment satisfies the following conditional expression (8).

$$0.20 < BFw/fw < 0.60 \qquad (8)$$

where BFw: a distance to an image surface from a lens surface of the zoom optical system ZL closest to an image in the wide angle end state, and fw: a focal length of the zoom optical system ZL in the wide angle end state.

The conditional expression (8) defines the ratio between the back focus of the zoom optical system ZL and the focal length of the zoom optical system ZL in the wide angle end state. By satisfying the conditional expression (8), the field curves in the wide angle end state can be efficiently corrected.

If the corresponding value of the conditional expression (8) falls below the lower limit value, it is difficult to correct the field curves in the wide angle end state. By setting the lower limit value of the conditional expression (8) to 0.25, the advantageous effects of this embodiment can be more secured. To further secure the advantageous effects of this embodiment, the lower limit value of the conditional expression (8) may be set to 0.30, 0.35, 0.37 and further to 0.40.

If the corresponding value of the conditional expression (8) exceeds the upper limit value, correction of the field curves in the wide angle end state becomes insufficient. By setting the upper limit value of the conditional expression (8) to 0.56, the advantageous effects of this embodiment can be more secured. To further secure the advantageous effects of this embodiment, the upper limit value of the conditional expression (8) may be set to 0.54, 0.52, and further to 0.50.

Preferably, in the zoom optical system ZL according to this embodiment, upon focusing, the fifth lens group G5 moves with respect to an image surface. Accordingly, variation in spherical aberration upon focusing can be suppressed.

Preferably, in the zoom optical system ZL according to this embodiment, the fifth lens group G5 includes at least one positive lens, and at least one negative lens. Accordingly, variation in field curves upon focusing can be suppressed.

Preferably, the zoom optical system ZL according to this embodiment satisfies the following conditional expression (9).

$$1.00 < (-f5)/fw < 16.00 \quad (9)$$

where f5: a focal length of the fifth lens group G5, and fw: a focal length of the zoom optical system ZL in the wide angle end state.

The conditional expression (9) defines the ratio between the focal length of the fifth lens group G5 and the focal length of the zoom optical system ZL in the wide angle end state. By satisfying the conditional expression (9), the field curves caused upon focusing can be favorably corrected.

If the corresponding value of the conditional expression (9) falls below the lower limit value, it is difficult to suppress the field curves caused upon focusing. The amount of movement of the fifth lens group G5 upon focusing increases, which in turn increases the size of the lens barrel. By setting the lower limit value of the conditional expression (9) to 1.10, the advantageous effects of this embodiment can be more secured. To further secure the advantageous effects of this embodiment, the lower limit value of the conditional expression (9) may be set to 1.20, 1.30, 1.40, and further to 1.45.

If the corresponding value of the conditional expression (9) exceeds the upper limit value, correction of the field curves upon focusing becomes insufficient. The amount of movement of the fifth lens group G5 upon focusing increases, which in turn increases the size of the lens barrel. By setting the upper limit value of the conditional expression (9) to 15.50, the advantageous effects of this embodiment can be more secured. To further secure the advantageous effects of this embodiment, the upper limit value of the conditional expression (9) may be set to 10.00, 8.00, 5.00, 4.00, 3.00, 2.45, 2.38, 2.33, 2.28, 2.25, and further to 2.10.

Preferably, the zoom optical system ZL according to this embodiment satisfies the following conditional expression (10).

$$1.00 < Mv5/Mv6 < 3.00 \quad (10)$$

where Mv5: an amount of movement of the fifth lens group G5 upon zooming from the wide angle end state to the telephoto end state (a sign of the amount of movement toward an object is shown as +), and Mv6: an amount of movement of the sixth lens group G6 upon zooming from the wide angle end state to the telephoto end state (a sign of the amount of movement toward an object is shown as +).

The conditional expression (10) defines the ratio between the amount of movement of the fifth lens group G5 and the amount of movement of the sixth lens group G6 upon zooming from the wide angle end state to the telephoto end state. By satisfying the conditional expression (10), the field curves can be favorably corrected.

If the corresponding value of the conditional expression (10) falls below the lower limit value, it is difficult to suppress the field curves caused in the fifth lens group G5. By setting the lower limit value of the conditional expression (10) to 1.10, the advantageous effects of this embodiment can be more secured. To further secure the advantageous effects of this embodiment, the lower limit value of the conditional expression (10) may be set to 1.20, 1.30, and further to 1.40.

If the corresponding value of the conditional expression (10) exceeds the upper limit value, it is difficult to correct the field curves in the fifth lens group G5. By setting the upper limit value of the conditional expression (10) to 2.50, the advantageous effects of this embodiment can be more secured. To further secure the advantageous effects of this embodiment, the upper limit value of the conditional expression (10) may be set to 2.00, 1.80, and further to 1.60.

Preferably, in the zoom optical system ZL according to this embodiment, upon zooming, the first lens group G1 moves with respect to the image surface. Accordingly, a high zooming ratio can be achieved.

Preferably, in the zoom optical system ZL according to this embodiment, the first lens group G1 consists of three or more lenses. Accordingly, particularly in the telephoto end state, the spherical aberration can be favorably corrected. Furthermore, a high zooming ratio can be achieved.

Preferably, the zoom optical system ZL according to this embodiment satisfies the following conditional expression (11).

$$0.30 < Mv1/(ft-fw) < 0.80 \quad (11)$$

where Mv1: an amount of movement of the first lens group G1 upon zooming from the wide angle end state to the telephoto end state (a sign of the amount of movement toward an object is shown as +), ft: a focal length of the zoom optical system ZL in the telephoto end state, and fw: a focal length of the zoom optical system ZL in the wide angle end state.

The conditional expression (11) defines the amount of movement of the first lens group G1 with respect to variation in focal length upon zooming from the wide angle end state to the telephoto end state. By satisfying the conditional expression (11), the spherical aberration and field curves in the telephoto end state can be favorably corrected.

If the corresponding value of the conditional expression (11) falls below the lower limit value, it is difficult to correct the spherical aberration in the telephoto end state. By setting the lower limit value of the conditional expression (11) to 0.32, the advantageous effects of this embodiment can be more secured. To further secure the advantageous effects of this embodiment, the lower limit value of the conditional expression (11) may be set to 0.33, 0.34, and further to 0.35.

If the corresponding value of the conditional expression (11) exceeds the upper limit value, it is difficult to correct the field curves in the telephoto end state. Furthermore, the diameter of the first lens group G1 increases, which in turn increases the weight of the lens barrel. By setting the upper limit value of the conditional expression (11) to 0.77, the advantageous effects of this embodiment can be more secured. To further secure the advantageous effects of this embodiment, the upper limit value of the conditional expression (11) may be set to 0.70, 0.65, 0.58, 0.50, 0.45, and further to 0.40.

Preferably, in the zoom optical system ZL according to this embodiment, an air lens is provided in the sixth lens group G6, and the zoom optical system ZL satisfies the following conditional expression (12).

$$0.00 < (RAr2+RAr1)/(RAr2-RAr1) < 2.00 \quad (12)$$

where RAr1: a radius of curvature of an object-side lens surface of the air lens of the sixth lens group G6, and RAr2: a radius of curvature of an image-side lens surface of the air lens of the sixth lens group G6.

The conditional expression (12) defines the shape factor of the air lens provided in the sixth lens group G6. By satisfying the conditional expression (12), the field curves can be favorably corrected.

If the corresponding value of the conditional expression (12) falls below the lower limit value, it is difficult to correct the field curves. By setting the lower limit value of the conditional expression (12) to 0.01, the advantageous effects of this embodiment can be more secured. To further secure the advantageous effects of this embodiment, the lower limit value of the conditional expression (12) may be set to 0.10, 0.20, 0.28, 0.30, 0.40, and further to 0.45.

If the corresponding value of the conditional expression (12) exceeds the upper limit value, it is difficult to correct the field curves. By setting the upper limit value of the conditional expression (12) to 1.90, the advantageous effects of this embodiment can be more secured. To further secure the advantageous effects of this embodiment, the upper limit value of the conditional expression (12) may be set to 1.70, 1.50, 1.20, and further to 1.00.

Preferably, in the zoom optical system ZL according to this embodiment, upon zooming, at least the first lens group G1, the third lens group G3, the fourth lens group G4, the fifth lens group G5, and the sixth lens group G6 move with respect to an image surface. Accordingly, the variation in magnification of each lens group upon zooming can be increased. Furthermore, the aberrations occurring at the third lens group G3 upon zooming can be corrected by the fourth lens group G4.

Preferably, in the zoom optical system ZL according to this embodiment, the lens groups moving upon zooming move toward the object upon zooming from the wide angle end state to the telephoto end state. Accordingly, a sufficient zooming ratio satisfying the performance of this embodiment can be secured.

Figure 41:
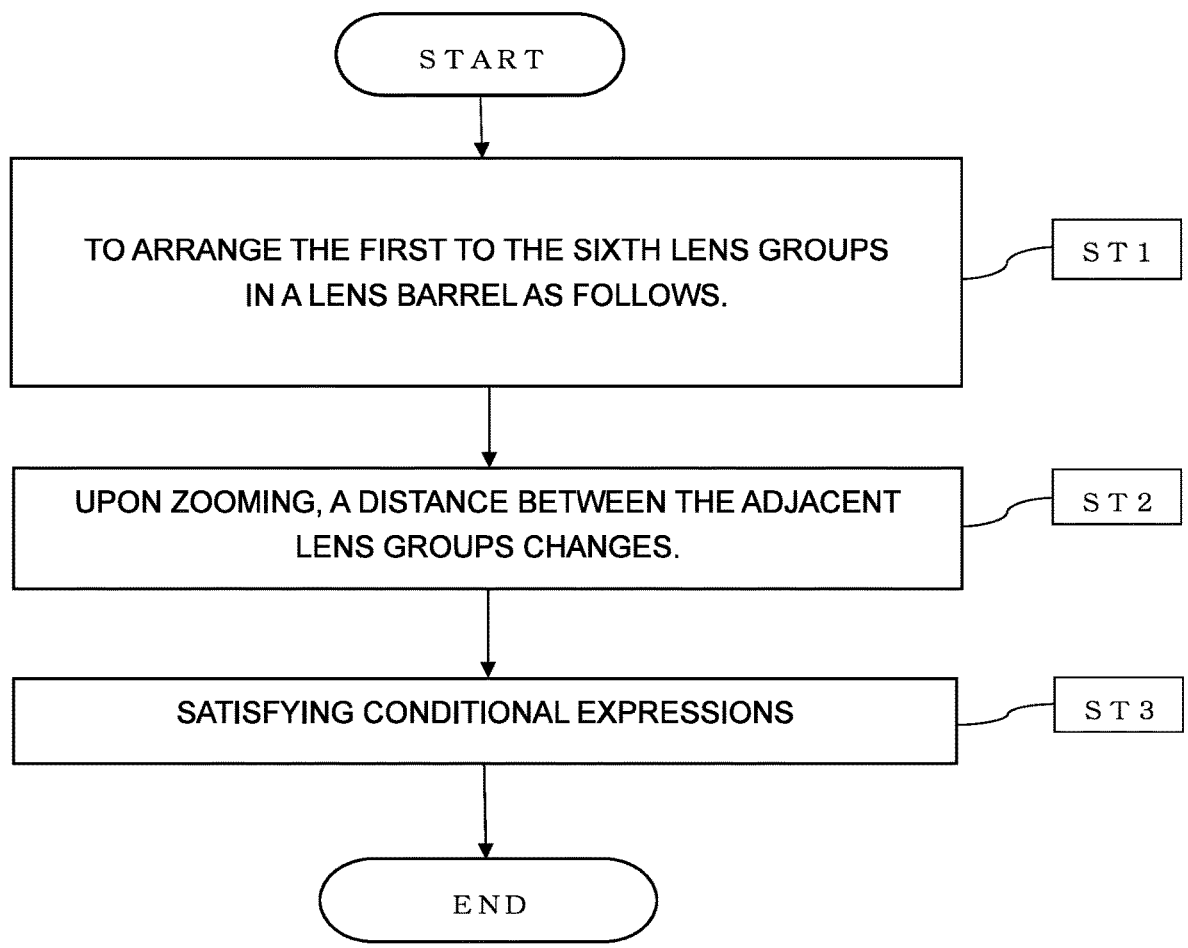
FIG. 41 is a flowchart showing a method for manufacturing the zoom optical system according to this embodiment.

Subsequently, referring to FIG. 41, a method of manufacturing the zoom optical system ZL according to this embodiment is generally described. First, in order from an object, a first lens group G1 having a positive refractive power, a second lens group G2 having a negative refractive power, a third lens group G3 having a positive refractive power, a fourth lens group G4 having a positive refractive power, a fifth lens group G5, and a sixth lens group G6, are arranged (step ST1). It is configured such that the distance between the adjacent lens groups changes upon zooming (step ST2). Each lens is arranged in a lens barrel so as to satisfy at least the conditional expression (1) described above (step ST3). According to such a manufacturing method, the zoom optical system that has a high zooming ratio and a favorable optical performance can be manufactured.

EXAMPLES

Hereinafter, zoom optical systems ZL according to examples of this embodiment will be described with reference to the drawings. FIGS. 1, 4, 7, 10, 13, 16, 19, 22, 25, 28, 31, 34 and 37 are sectional views showing configurations and refractive power distributions of the zoom optical systems ZL {ZL(1) to ZL(13)} according to first to thirteenth examples. The first to the eleventh examples and the thirteenth example are those of present inventions. The twelfth example is a reference example. In each diagram, the movement direction along the optical axis of each lens group that moves upon zooming from the wide angle end state to the telephoto end state is indicated by an arrow. Furthermore, the movement direction of a focusing group upon focusing from the infinity to a short distant object is indicated by an arrow accompanied by characters "FOCUSING". At least a part of the third lens group G3 is assumed as a vibration-proof group. The movement direction upon image blur correction is indicated by an arrow accompanied by characters "VIBRATION-PROOF".

In these drawings (FIGS. 1, 4, 7, 10, 13, 16, 19, 22, 25, 28, 31, 34 and 37), each lens group is represented by a combination of a symbol G and a numeral, and each lens is represented by a combination of a symbol L and a numeral. In this case, to prevent the number of types and the numbers of symbols and numerals from being large and complicated, the lens groups and the like are represented using combinations of symbols and numerals independently among the examples. Accordingly, even though the same combinations of symbols and numerals are used among the examples, such usage does not mean the same configuration.

Tables 1 to 13 are hereinafter shown. Among them, Table 1 is a table showing each data item in the first example, Table 2 is that in the second example, Table 3 is that in the third example, Table 4 is that in the fourth example, Table 5 is that in the fifth example, Table 6 is that in the sixth example, Table 7 is that in the seventh example, Table 8 is that in the eighth example, Table 9 is that in the ninth example, Table 10 is that in the tenth example, Table 11 is that in the eleventh example, Table 12 is that in the twelfth example, and Table 13 is that in the thirteenth example. In each example, d-line (wavelength $\lambda$=587.6 nm), and g-line (wavelength $\lambda$=435.8 nm) are selected as calculation targets of aberration characteristics.

In tables of [General data], FNO indicates the F-number, $\omega$ indicates the half angle of view (the unit is ° (degrees)), and Y indicates the image height. TL indicates a distance obtained by adding BF to the distance from the lens foremost surface to the lens last surface on the optical axis upon focusing on infinity. BF indicates the air equivalent distance (back focus) from the lens last surface to the image surface I on the optical axis upon focusing on infinity. Note that these values are indicated for zoom states at the wide-angle end (W), a first intermediate focal length (M1), a second intermediate focal length (M2), and the telephoto end (T). f123w indicates the combined focal length of the first lens group G1, the second lens group G2 and the third lens group G3 in the wide angle end state. f123t indicates the combined focal length of the first lens group G1, the second lens group G2 and the third lens group G3 in the telephoto end state.

In the table of [Lens data], Surface number indicates the order of the optical surface from the object side along the direction in which the ray travels, R indicates the radius of curvature (the surface whose center of curvature resides on the image side is regarded to have a positive value) of each optical surface, D indicates the surface distance from each optical surface to the next optical surface (or the image surface) on the optical axis, nd is the refractive index of the material of the optical member for d-line, and vd indicates the Abbe number of the material of the optical member with reference to d-line. The radius of curvature "∞" indicates a plane or an aperture, and (Aperture stop S) indicates an aperture stop. The description of the air refractive index nd=1.00000 is omitted. In a case where the lens surface is an aspherical surface, the surface number is assigned * symbol, and the field of the radius of curvature R indicates the paraxial radius of curvature.

In the table of [Aspherical surface data], the shape of the aspherical surface indicated in [Lens data] is indicated by the following expression W. X(y) indicates the distance (sag amount) from the tangent plane at the vertex of the aspherical surface to the position on the aspherical surface at the height y along the optical axis direction. R indicates the radius of curvature (paraxial radius of curvature) of the reference spherical surface. $\kappa$ indicates the conic constant.

Ai indicates the i-order aspherical coefficient. "E-n" indicates "×10⁻ⁿ". For example, 1.234E-05=1.234×10⁻⁵. Note that the second-order aspherical coefficient A2 is zero, and its description is omitted.

$$X(y)=(y^2/R)/\{1+(1-\kappa \times y^2/R^2)^{1/2}\}+A4 \times y^4+A6 \times y^6+A8 \times y^8+A10 \times y^{10}+A12 \times y^{12} \quad (A)$$

The table of [Lens group data] shows the first surface (the surface closest to the object) and the focal length of each lens group.

The table of [Variable distance data] shows the surface distances at surface numbers where the surface distance is "Variable" in the table showing [Lens data]. Here, surface distances in the zoom states at the wide-angle end (W), the first intermediate focal length (M1), the second intermediate focal length (M2) and the telephoto end (T) upon the infinity focus and the short range focus are indicated. In [Variable distance data], f indicates the focal length of the entire lens system, and β indicates the photographing magnification.

The table of [Conditional expression corresponding value] shows the value corresponding to each conditional expression.

Hereinafter, among all the data values, "mm" is generally used for the listed focal length f, radius of curvature R, surface distance D, other lengths and the like if not otherwise specified. However, there is no limitation thereto, because the optical system can achieve equivalent optical performances even if being proportionally enlarged or reduced.

The description of the table so far is common to all the examples. Hereinafter, redundant description is omitted.

First Example

A first example is described with reference to FIGS. 1 to 3A and 3B and Table 1. FIG. 1 is a lens configuration diagram of a zoom optical system according to the first example upon focusing on infinity in a wide angle end state. The zoom optical system ZL(1) according to the first example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in the directions indicated by arrows in FIG. 1 along the optical axis, and the distances between the adjacent lens groups change. Note that upon zooming, the aperture stop S, the third lens group G3 and the sixth lens group G6 integrally move. The sign (+) or (−) assigned to each lens group symbol indicates the refractive power of the corresponding lens group. This similarly applies to all the following examples.

The first lens group G1 consists of, in order from the object: a negative meniscus lens L11 having a convex surface facing the object; a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a biconcave negative lens L24.

The third lens group G3 consists of, in order from the object: a biconvex positive lens L31; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a cemented lens composed of a biconvex positive lens L41 and a negative meniscus lens L42 having a concave surface facing the object; and a cemented lens composed of a negative meniscus lens L43 having a convex surface facing the object and a biconvex positive lens L44. The image side surface of the positive lens L44 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image side surface of the negative meniscus lens L61 is of aspherical shape. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 1 lists values of data on the zoom optical system according to the first example.

TABLE 1

| [General Data] | | | | |
|---|---|---|---|---|
| Zooming ratio 7.848 | | | | |
| f123w = −217.63848 | | | | |
| f123t = −267.32298 | | | | |
| | W | M1 | M2 | T |
| FNO | 4.12109 | 5.58779 | 6.39998 | 6.50002 |
| ω | 42.58698 | 22.66696 | 11.13686 | 6.13014 |
| Y | 20.50 | 21.70 | 21.70 | 21.70 |
| TL | 126.45486 | 144.98844 | 168.50373 | 188.4741 |

| [Lens Data] | | | | |
|---|---|---|---|---|
| Surface Number | R | D | vd | nd |
| 1 | 185.7354 | 2.0000 | 31.27 | 1.903660 |
| 2 | 75.9813 | 1.0263 | | |
| 3 | 81.5981 | 6.4204 | 67.90 | 1.593190 |
| 4 | −494.4016 | 0.1000 | | |
| 5 | 59.1320 | 6.1300 | 67.90 | 1.593190 |
| 6 | 390.1369 | D1(Variable) | | |
| 7 | 236.0277 | 1.2500 | 32.33 | 1.953750 |
| 8 | 19.0394 | 5.0675 | | |
| 9 | −46.6700 | 1.1000 | 52.33 | 1.755000 |

TABLE 1-continued

| 10 | 68.1612 | 0.4169 | | |
| 11 | 37.1210 | 3.3840 | 20.88 | 1.922860 |
| 12 | −52.5580 | 0.5124 | | |
| 13 | −32.9357 | 1.0000 | 46.59 | 1.816000 |
| 14 | 416.8076 | D2(Variable) | | |
| 15 | ∞ | 2.0000 | | (Aperture Stop S) |
| 16 | 39.8204 | 2.5136 | 35.72 | 1.902650 |
| 17 | −292.5261 | 0.5000 | | |
| 18 | 36.7161 | 1.0000 | 29.12 | 2.001000 |
| 19 | 20.9452 | 3.3404 | 53.74 | 1.579570 |
| 20 | −76.0620 | 1.4447 | | |
| 21 | −35.5626 | 1.0000 | 32.33 | 1.953750 |
| 22 | −290.1606 | D3(Variable) | | |
| 23 | 37.1374 | 4.6344 | 42.73 | 1.834810 |
| 24 | −37.1374 | 1.0000 | 31.27 | 1.903660 |
| 25 | −308.9768 | 0.1000 | | |
| 26 | 31.6449 | 2.7756 | 32.33 | 1.953750 |
| 27 | 15.2741 | 8.7030 | 81.49 | 1.497100 |
| 28* | −40.3095 | D4(Variable) | | |
| 29 | 1365.4927 | 3.0634 | 23.80 | 1.846660 |
| 30 | −35.3251 | 1.0000 | 40.13 | 1.851350 |
| 31* | 32.6144 | D5(Variable) | | |
| 32 | −16.9998 | 1.4000 | 42.51 | 1.820800 |
| 33* | −22.5398 | 0.1000 | | |
| 34 | 626.7496 | 3.5530 | 37.57 | 1.683760 |
| 35 | −77.6296 | BF | | |

[Aspherical Surface Data]

28th Surface

κ = 1.0000, A4 = 3.13017E−05, A6 = −1.03090E−07
A8 = 6.53525E−10, A10 = −2.57830E−12, A12 = 0.32673E−14

31st Surface

κ = 1.0000, A4 = −6.66636E−06, A6 = 5.10546E−08
A8 = 1.72567E−11, A10 = −2.40595E−12, A12 = 0.98445E−14

33rd Surface

κ = 1.0000, A4 = −1.93366E−06, A6 = −2.05750E−08
A8 = 8.81224E−11, A10 = −2.94021E−13, A12 = 0.00000E+00

[Lens Group Data]

| Group | First surface | Focal length |
| --- | --- | --- |
| G1 | 1 | 98.9899 |
| G2 | 7 | −16.5057 |
| G3 | 16 | 48.48369 |
| G4 | 23 | 28.91747 |
| G5 | 29 | −39.0895 |
| G6 | 32 | −15588.34 |

[Variable Distance Data]

| | W Infinity | M1 Infinity | M2 Infinity | T Infinity |
| --- | --- | --- | --- | --- |
| f | 24.72001 | 49.99999 | 105.05133 | 193.99063 |
| D0 | ∞ | ∞ | ∞ | ∞ |
| D1 | 1.50000 | 17.29645 | 38.92328 | 54.52847 |
| D2 | 18.83905 | 10.91446 | 4.55495 | 1.10018 |
| D3 | 12.23175 | 6.39417 | 3.18615 | 1.47844 |
| D4 | 5.54311 | 4.42699 | 5.70823 | 2.00068 |
| D5 | 10.05055 | 17.00460 | 18.93085 | 24.34574 |
| BF | 11.75486 | 22.41624 | 30.66474 | 38.48515 |

| | W Short-distance | M1 Short-distance | M2 Short-distance | T Short-distance |
| --- | --- | --- | --- | --- |
| β | −0.06221 | −0.11053 | −0.17918 | −0.28386 |
| D0 | 365.9340 | 397.4004 | 473.8851 | 503.9147 |
| D1 | 1.50000 | 17.29645 | 38.92328 | 54.52847 |
| D2 | 18.83905 | 10.91446 | 4.55495 | 1.10018 |
| D3 | 12.23175 | 6.39417 | 3.18615 | 1.47844 |
| D4 | 6.43705 | 6.05192 | 10.02051 | 11.69839 |
| D5 | 9.15661 | 15.37967 | 14.61857 | 14.64803 |
| BF | 11.78171 | 22.50112 | 30.88824 | 39.04500 |

[Conditional expression corresponding value]

Conditional Expression(1) Mv4/Mv3 = 1.402
Conditional Expression(2) Mv2/fw = 0.364
Conditional Expression(3) ft/fw = 7.848
Conditional Expression(4) ωw = 42.587
Conditional Expression(5) ωt = 6.130
Conditional Expression(6) fw/f123w = −0.114
Conditional Expression(7) ft/f123t = −0.726
Conditional Expression(8) BFw/fw = 0.476
Conditional Expression(9) (−f5)/fw = 1.581
Conditional Expression(10) Mv5/Mv6 = 1.535
Conditional Expression(11) Mv1/(ft − fw) = 0.366
Conditional Expression(12) (RAr2 + RAr1)/(RAr2 − RAr1) = 0.931

Figure 2A:
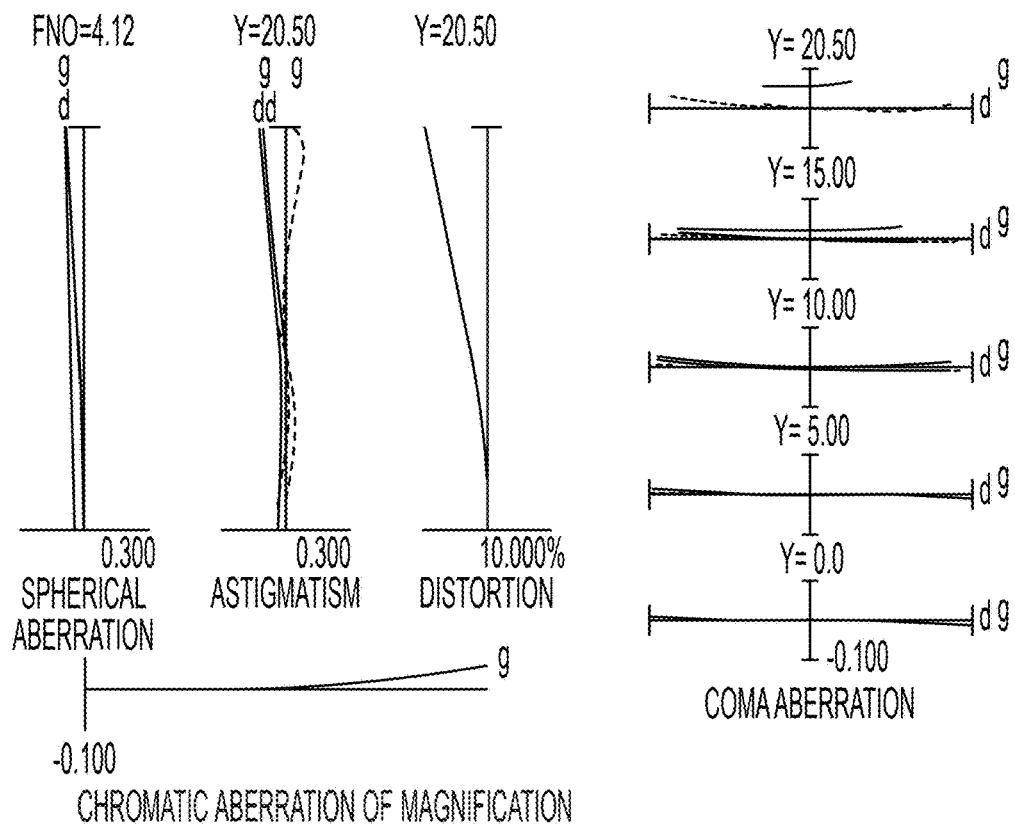
FIGS. 2A and 2B are various aberration graphs of the zoom optical system according to the first example upon focusing on infinity in the wide-angle end state and a telephoto end state.
Figure 2B:
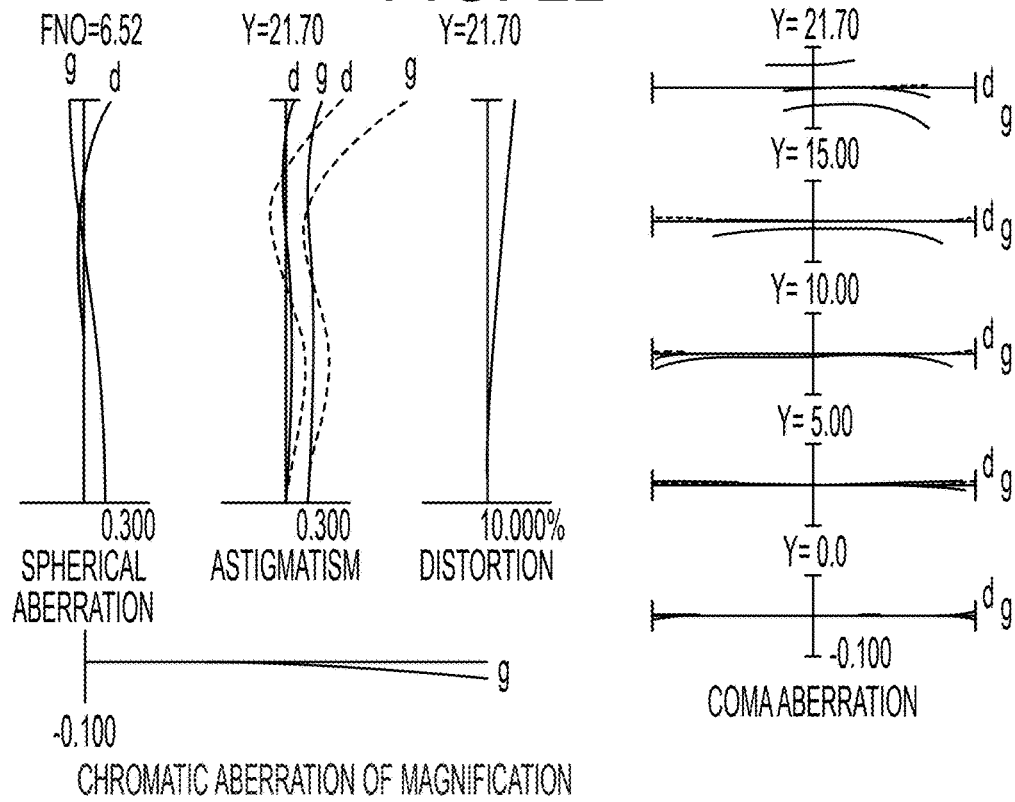
Figure 3A:
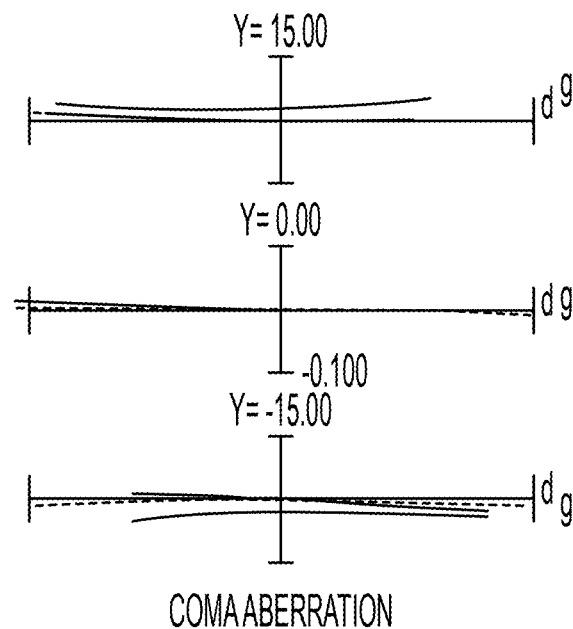
FIGS. 3A and 3B are coma aberration graphs of the zoom optical system according to the first example in the wide-angle end state and the telephoto end state when blur correction is performed.
Figure 3B:
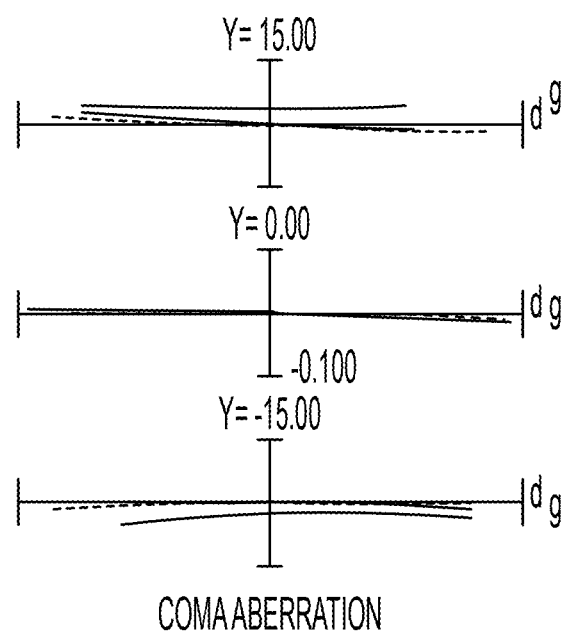

FIGS. 2A and 2B are various aberration graphs of the zoom optical system according to the first example upon focusing on infinity in the wide-angle end state and the telephoto end state. FIGS. 3A and 3B are coma aberration graphs of the zoom optical system according to the first example in the wide-angle end state and the telephoto end state when blur correction is performed. In the aberration graphs in FIGS. 2A and 2B, FNO indicates the F-number, and Y indicates the image height. The spherical aberration graph indicates the value of the F-number corresponding to the maximum diameter. The astigmatism graph and the distortion graph each indicate the maximum value of the image height. The coma aberration graph indicates the value of each image height. The coma aberration graphs in FIGS. 3A and 3B indicate the value of each image height. In each aberration graph, d indicates d-line (wavelength)=587.6 nm), and g indicates g-line (wavelength λ=435.8 nm). In the astigmatism graph, a solid line indicates a sagittal image surface, and a broken line indicates a meridional image surface. Note that also in the aberration graph in each example described below, symbols similar to those in this example are used, and redundant description is omitted.

The various aberration graphs show that the zoom optical system according to the first example favorably corrects the various aberrations, and has an excellent imaging performance.

Second Example

Figure 4:
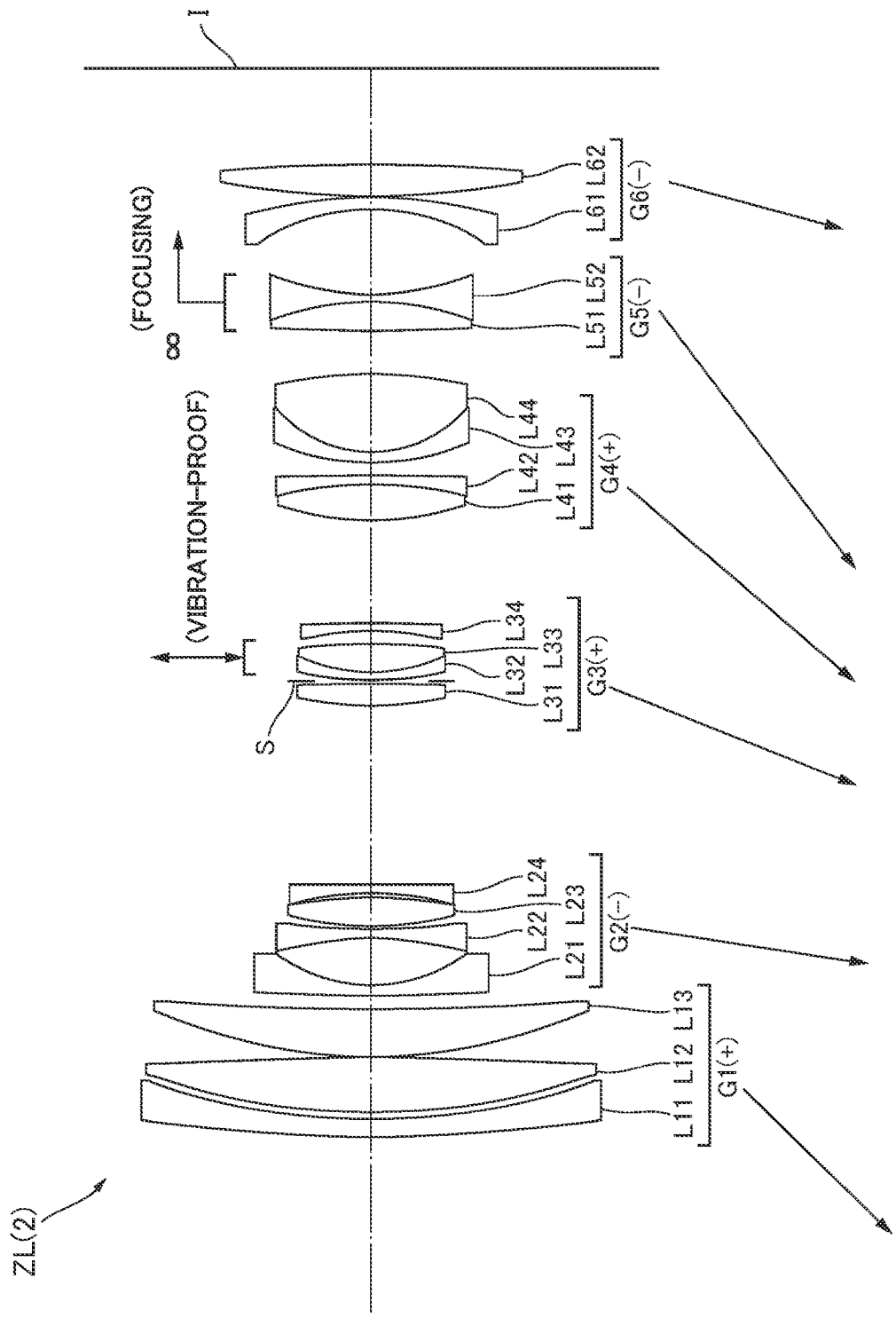
FIG. 4 is a lens configuration diagram of a zoom optical system according to a second example upon focusing on infinity in a wide angle end state.

A second example is described with reference to FIGS. 4 to 6A and 6B and Table 2. FIG. 4 is a lens configuration diagram of a zoom optical system according to the second example upon focusing on infinity in a wide angle end state. The zoom optical system ZL(2) according to the second example consists of, in order from the object: a first lens group G1 having a positive refractive power; a second lens group G2 having a negative refractive power; a third lens group G3 that has a positive refractive power and is provided with an aperture stop S; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the third lens group G3 provided with the aperture stop S, the fourth lens group G4, the fifth lens group G5 and the sixth lens group G6 move in the directions indicated by arrows in FIG. 4 along the optical axis, and the distances between the adjacent lens groups change. Note that upon zooming, the aperture stop S, the third lens group G3 and the sixth lens group G6 integrally move.

The first lens group G1 consists of, in order from the object: a negative meniscus lens L11 having a convex surface facing the object; a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object.

The third lens group G3 consists of, in order from the object: a biconvex positive lens L31; an aperture stop S; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a cemented lens composed of a biconvex positive lens L41, and a negative meniscus lens L42 having a concave surface facing the object; and a cemented lens composed of a negative meniscus lens L43 having a convex surface facing the object and a biconvex positive lens L44. The image side surface of the positive lens L44 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image side surface of the negative meniscus lens L61 is of aspherical shape. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 2 lists values of data on the zoom optical system according to the second example.

TABLE 2

[General Data]

Zooming ratio 7.848
f123w = −377.733
f123t = −288.19144

|  | W | M1 | M2 | T |
|---|---|---|---|---|
| FNO | 4.12000 | 5.60000 | 6.20000 | 6.49999 |
| ω | 43.04718 | 22.53540 | 10.65017 | 6.13829 |
| Y | 20.91 | 21.70 | 21.70 | 21.70 |
| TL | 125.95528 | 142.51715 | 167.85323 | 186.8435 |

TABLE 2-continued

[Lens Data]

| Surface Number | R | D | vd | nd |
|---|---|---|---|---|
| 1 | 188.64525 | 2.00000 | 31.27 | 1.903660 |
| 2 | 77.80524 | 0.84780 | | |
| 3 | 80.41425 | 6.51915 | 67.90 | 1.593190 |
| 4 | −471.30377 | 0.10000 | | |
| 5 | 62.30684 | 5.66572 | 67.90 | 1.593190 |
| 6 | 358.24871 | D1(Variable) | | |
| 7 | 230.01286 | 1.25000 | 43.79 | 1.848500 |
| 8 | 18.45421 | 5.50336 | | |
| 9 | −40.33983 | 1.10000 | 52.34 | 1.755000 |
| 10 | 79.65336 | 0.38546 | | |
| 11 | 39.14822 | 3.37749 | 23.80 | 1.846660 |
| 12 | −47.38891 | 0.46523 | | |
| 13 | −31.94449 | 1.00000 | 46.59 | 1.816000 |
| 14 | −2729.77760 | D2(Variable) | | |
| 15 | 41.64137 | 2.51154 | 35.73 | 1.902650 |
| 16 | −289.39118 | 0.40000 | | |
| 17 | ∞ | 0.10000 | | (Aperture Stop S) |
| 18 | 38.12143 | 1.00000 | 29.12 | 2.001000 |
| 19 | 21.49924 | 3.26023 | 53.74 | 1.579570 |
| 20 | −73.20919 | 1.47119 | | |
| 21 | −34.94662 | 1.00000 | 32.33 | 1.953750 |
| 22 | −165.99888 | D3(Variable) | | |
| 23 | 37.20805 | 4.18411 | 42.73 | 1.834810 |
| 24 | −43.17368 | 1.00003 | 31.27 | 1.903660 |
| 25 | −659.56023 | 1.54931 | | |
| 26 | 28.71779 | 1.32801 | 32.33 | 1.953750 |
| 27 | 14.76801 | 9.10325 | 81.49 | 1.497100 |
| 28* | −42.86465 | D4 (Variable) | | |
| 29 | 255.99237 | 3.36761 | 23.80 | 1.846660 |
| 30 | −33.68693 | 1.00000 | 40.13 | 1.851350 |
| 31* | 31.06431 | D5(Variable) | | |
| 32 | −23.57856 | 1.40000 | 45.21 | 1.794457 |
| 33* | −50.21699 | 0.10000 | | |
| 34 | 91.45040 | 3.78568 | 29.84 | 1.800000 |
| 35 | −197.78095 | BF | | |

[Aspherical Surface Data]

28th Surface

κ = 1.0000, A4 = 2.56920E−05, A6 = −9.38399E−08
A8 = 4.71077E−10, A10 = −1.70196E−12, A12 = 0.00000E+00

31st Surface

κ = 1.0000, A4 = −6.78111E−06, A6 = 6.47335E−08
A8 = −3.28125E−10, A10 = 2.56418E−13, A12 = 0.00000E+00

33rd Surface

κ = 1.0000, A4 = 3.30419E−06, A6 = −1.76274E−09
A8 = 1.66657E−12, A10 = 1.80471E−14, A12 = 0.00000E+00

[Lens Group Data]

| Group | First surface | Focal length |
|---|---|---|
| G1 | 1 | 102.16195 |
| G2 | 7 | −16.76640 |
| G3 | 15 | 47.83089 |
| G4 | 23 | 29.71748 |
| G5 | 29 | −41.62356 |
| G6 | 32 | −236.16863 |

[Variable Distance Data]

|  | W Infinity | M1 Infinity | M2 Infinity | T Infinity |
|---|---|---|---|---|
| f | 24.72031 | 50.00094 | 110.00281 | 194.00483 |
| D0 | ∞ | ∞ | ∞ | ∞ |
| D1 | 1.50000 | 17.23398 | 38.86323 | 55.71214 |
| D2 | 19.13452 | 10.77832 | 3.90279 | 1.10000 |
| D3 | 12.16022 | 5.90688 | 2.59619 | 1.47832 |
| D4 | 5.12094 | 4.32200 | 5.90770 | 2.00000 |
| D5 | 10.00915 | 17.06861 | 18.78383 | 23.80987 |
| BF | 11.25528 | 20.43218 | 31.02431 | 35.96804 |

TABLE 2-continued

|  | W<br>Short-<br>distance | M1<br>Short-<br>distance | M2<br>Short-<br>distance | T<br>Short-<br>distance |
|---|---|---|---|---|
| β | −0.06086 | −0.10794 | −0.18504 | −0.27368 |
| D0 | 374.0451 | 407.4838 | 482.1484 | 513.1582 |
| D1 | 1.50000 | 17.23398 | 38.86323 | 55.71214 |
| D2 | 19.13452 | 10.77832 | 3.90279 | 1.10000 |
| D3 | 12.16022 | 5.90688 | 2.59619 | 1.47832 |
| D4 | 6.06949 | 6.02341 | 10.42761 | 11.59738 |
| D5 | 9.06059 | 15.36720 | 14.26392 | 14.21249 |
| BF | 11.25529 | 20.4322 | 31.02445 | 35.96847 |

[Conditional expression corresponding value]

Conditional Expression(1) Mv4/Mv3 = 1.432
Conditional Expression(2) Mv2/fw = 0.270
Conditional Expression(3) ft/fw = 7.848
Conditional Expression(4) ωw = 43.047
Conditional Expression(5) ωt = 6.138
Conditional Expression(6) fw/f123w = −0.112
Conditional Expression(7) ft/f123t = −0.783
Conditional Expression(8) BFw/fw = 0.455
Conditional Expression(9) (−f5)/fw = 1.684
Conditional Expression(10) Mv5/Mv6 = 1.558
Conditional Expression(11) Mv1/(ft − fw) = 0.360
Conditional Expression(12) (RAr2 + RAr1)/(RAr2 − RAr1) = 0.291

Figure 5A:
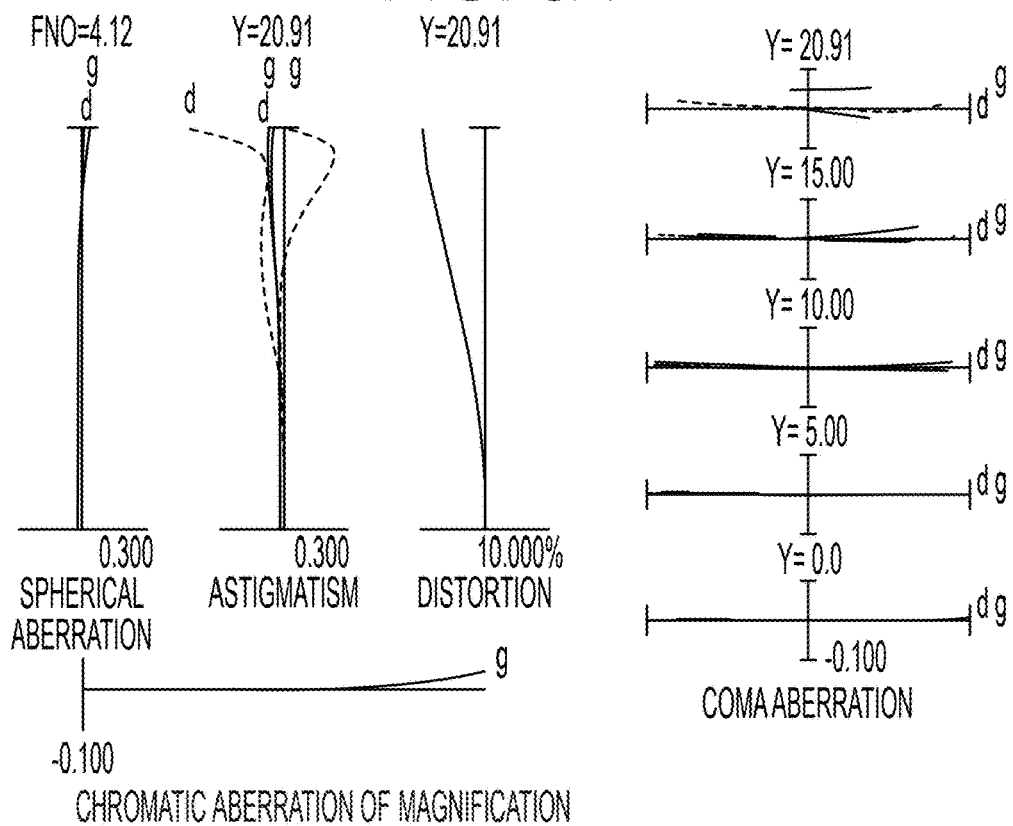
FIGS. 5A and 5B are various aberration graphs of the zoom optical system according to the second example upon focusing on infinity in the wide-angle end state and a telephoto end state.
Figure 5B:
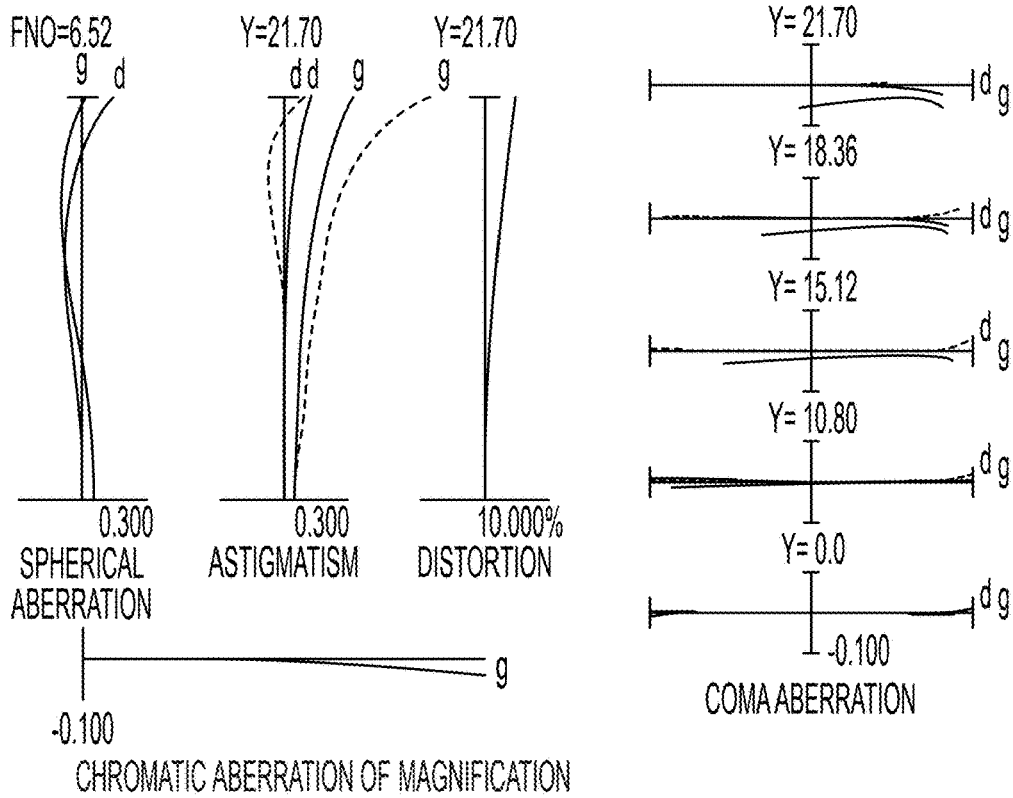
Figure 6A:
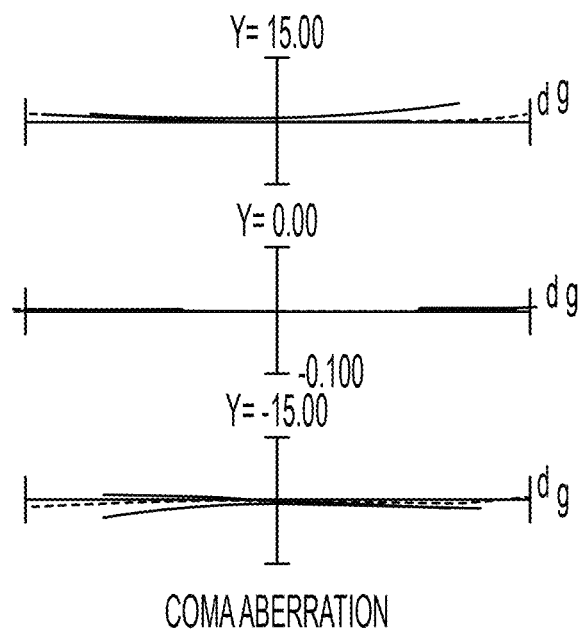
FIGS. 6A and 6B are coma aberration graphs of the zoom optical system according to the second example in the wide-angle end state and the telephoto end state when blur correction is performed.
Figure 6B:
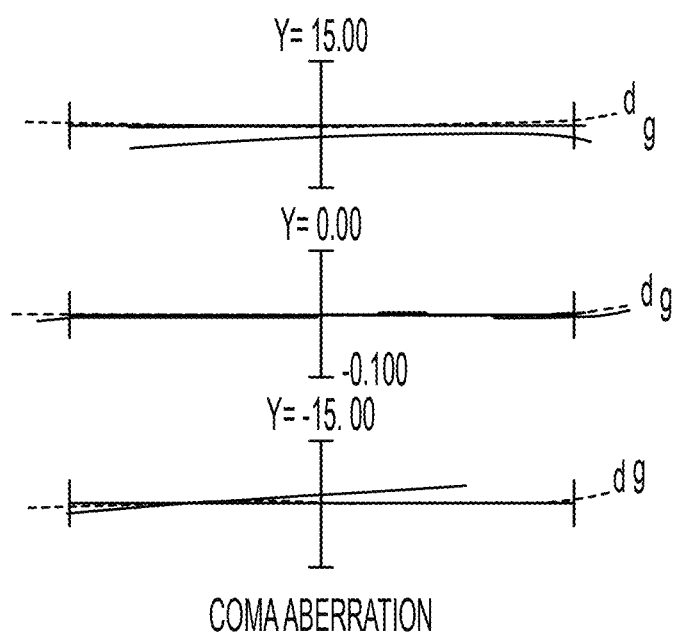

FIGS. 5A and 5B are various aberration graphs of the zoom optical system according to the second example upon focusing on infinity in the wide-angle end state and the telephoto end state. FIGS. 6A and 6B are coma aberration graphs of the zoom optical system according to the second example in the wide-angle end state and the telephoto end state when blur correction is performed. The various aberration graphs show that the zoom optical system according to the second example favorably corrects the various aberrations, and has an excellent imaging performance.

Third Example

A third example is described with reference to FIGS. 7 to 9A and 9B and Table 3. FIG. 7 is a lens configuration diagram of a zoom optical system according to the third example upon focusing on infinity in a wide angle end state. The zoom optical system ZL(3) according to the third example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in the directions indicated by arrows in FIG. 7 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a biconvex positive lens L12; and a positive meniscus lens L13 having a convex surface facing the object.

The second lens group G2 consists of, in order from the object: a negative meniscus lens L21 having a convex surface facing the object; a negative meniscus lens L22 having a convex surface facing the object; a positive meniscus lens L23 having a convex surface facing the object; and a cemented lens composed of a positive meniscus lens L24 having a concave surface facing the object and a negative meniscus lens L25 having a concave surface facing the object. The image side surface of the negative meniscus lens L21 is of aspherical shape. The image side surface of the negative meniscus lens L25 is of aspherical shape.

The third lens group G3 consists of a positive meniscus lens L31 having a convex surface facing the object. The image side surface of the positive meniscus lens L31 is of aspherical shape.

The fourth lens group G4 consists of, in order from the object: a biconvex positive lens L41; a cemented lens composed of a negative meniscus lens L42 having a convex surface facing the object and a positive meniscus lens L43 having a convex surface facing the object; and a cemented lens composed of a biconvex positive lens L44 and a negative meniscus lens L45 having a concave surface facing the object. The image side surface of the negative meniscus lens L45 is of aspherical shape.

The fifth lens group G5 consists of a cemented lens composed of a positive meniscus lens L51 having a concave surface facing the object and a biconcave negative lens L52. The image side surface of the negative lens L52 is of aspherical shape.

The sixth lens group G6 consists of, in order from the object: a negative meniscus lens L61 having a concave surface facing the object; and a positive meniscus lens L62 having a concave surface facing the object. An air lens is formed between the negative meniscus lens L61 and the positive meniscus lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the positive meniscus lens L31 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 3 lists values of data on the zoom optical system according to the third example.

TABLE 3

[General Data]

Zooming ratio 7.850
f123w = −526.69259
f123t = −297.45559

|  | W | M1 | M2 | T |
|---|---|---|---|---|
| FNO | 4.12000 | 5.00001 | 6.14000 | 6.50003 |
| ω | 41.94830 | 22.05780 | 10.36801 | 5.96172 |
| Y | 21.34 | 21.70 | 21.70 | 21.70 |
| TL | 118.25612 | 134.48400 | 163.70742 | 182.4804 |

[Lens Data]

| Surface Number | R | D | vd | nd |
|---|---|---|---|---|
| 1 | 151.3952 | 2.0000 | 23.80 | 1.846660 |
| 2 | 87.2806 | 5.9280 | 67.90 | 1.593190 |
| 3 | −1349.8590 | 0.1000 |  |  |
| 4 | 76.7487 | 4.4238 | 67.90 | 1.593190 |
| 5 | 320.3570 | D1(Variable) |  |  |

TABLE 3-continued

| 6* | 395.1403 | 1.2500 | 40.66 | 1.883000 |
|---|---|---|---|---|
| 7 | 17.9444 | 4.0881 | | |
| 8 | 172.0131 | 1.0000 | 27.15 | 1.944421 |
| 9 | 41.2622 | 0.6317 | | |
| 10 | 28.0910 | 3.7608 | 20.88 | 1.922860 |
| 11 | 282.0417 | 1.6588 | | |
| 12 | −43.9082 | 1.6452 | 25.64 | 1.784720 |
| 13 | −19.4929 | 1.1000 | 43.36 | 1.839318 |
| 14* | −367.3130 | D2(Variable) | | |
| 15 | ∞ | 1.8230 | | (Aperture Stop S) |
| 16* | 25.2025 | 2.7754 | 59.33 | 1.609605 |
| 17 | 116.8971 | D3(Variable) | | |
| 18 | 27.7315 | 3.2255 | 67.90 | 1.593190 |
| 19 | −829.3049 | 0.7234 | | |
| 20 | 31.9256 | 2.0849 | 32.32 | 1.953747 |
| 21 | 14.4283 | 4.6386 | 70.32 | 1.487490 |
| 22 | 87.2035 | 0.7730 | | |
| 23 | 61.3969 | 5.2420 | 82.57 | 1.497820 |
| 24 | −18.0219 | 4.1197 | 37.22 | 1.882023 |
| 25* | −25.6911 | D4(Variable) | | |
| 26 | −1678.9249 | 3.0141 | 25.26 | 1.902000 |
| 27 | −33.6869 | 1.0000 | 40.12 | 1.851080 |
| 28* | 40.9152 | D5(Variable) | | |
| 29 | −15.4450 | 1.2500 | 46.59 | 1.816000 |
| 30 | −29.1017 | 0.1000 | | |
| 31 | −162.7939 | 2.9649 | 29.37 | 1.950000 |
| 32 | −61.0034 | BF | | |

[Aspherical Surface Data]

6th Surface

κ = 1.9193, A4 = 5.26888E−06, A6 = −1.61582E−08
A8 = 5.37910E−11, A10 = −9.15512E−14, A12 = 0.00000E+00

14th Surface

κ = 6.0000, A4 = 8.64764E−07, A6 = −1.04249E−08
A8 = −8.45595E−12, A10 = 4.36832E−13, A12 = 0.00000E+00

16th Surface

κ = −0.0411, A4 = −5.82687E−06, A6 = 1.89727E−08
A8 = −3.04157E−10, A10 = 1.94188E−12, A12 = 0.00000E+00

25th Surface

κ = 1.0633, A4 = 1.55522E−05, A6 = −4.60661E−08
A8 = 2.01166E−10, A10 = −8.69226E−13, A12 = 0.00000E+00

28th Surface

κ = 0.0000, A4 = −8.62706E−06, A6 = 9.53672E−08
A8 = −5.21848E−10, A10 = 1.74761E−12, A12 = 0.00000E+00

[Lens Group Data]

| Group | First surface | Focal length |
|---|---|---|
| G1 | 1 | 111.43064 |
| G2 | 6 | −17.83112 |
| G3 | 16 | 52.10796 |
| G4 | 18 | 30.96133 |
| G5 | 26 | −50.42308 |
| G6 | 29 | −77.20586 |

[Variable Distance Data]

| | W Infinity | M1 Infinity | M2 Infinity | T Infinity |
|---|---|---|---|---|
| f | 24.72028 | 50.00010 | 110.02145 | 194.04302 |
| D0 | ∞ | ∞ | ∞ | ∞ |
| D1 | 1.56355 | 16.96393 | 42.92481 | 58.95782 |
| D2 | 18.90672 | 9.77960 | 3.82294 | 0.50000 |
| D3 | 10.22026 | 5.92276 | 2.94135 | 1.20000 |
| D4 | 6.49920 | 5.70254 | 5.42574 | 2.50000 |
| D5 | 10.45535 | 15.54950 | 18.80771 | 23.47480 |
| BF | 9.29011 | 19.24474 | 28.46394 | 34.52694 |

TABLE 3-continued

| | W Short-distance | M1 Short-distance | M2 Short-distance | T Short-distance |
|---|---|---|---|---|
| β | −0.06124 | −0.12203 | −0.24452 | −0.38142 |
| D0 | 373.1327 | 356.9049 | 327.6814 | 308.9084 |
| D1 | 1.56355 | 16.96393 | 42.92481 | 58.95782 |
| D2 | 18.90672 | 9.77960 | 3.82294 | 0.50000 |
| D3 | 10.22026 | 5.92276 | 2.94135 | 1.20000 |
| D4 | 7.63429 | 7.89257 | 11.92314 | 16.79614 |
| D5 | 9.32026 | 13.35947 | 12.31031 | 9.17866 |
| BF | 9.31670 | 19.34984 | 28.88441 | 35.54307 |

[Conditional expression corresponding value]

Conditional Expression(1) Mv4/Mv3 = 1.357
Conditional Expression(2) Mv2/fw = 0.276
Conditional Expression(3) ft/fw = 7.850
Conditional Expression(4) ωw = 41.948
Conditional Expression(5) ωt = 5.962
Conditional Expression(6) fw/f123w = −0.047
Conditional Expression(7) ft/f123t = −0.652
Conditional Expression(8) BFw/fw = 0.376
Conditional Expression(9) (−f5)/fw = 2.040
Conditional Expression(10) Mv5/Mv6 = 1.516
Conditional Expression(11) Mv1/(ft − fw) = 0.379
Conditional Expression(12) (RAr2 + RAr1)/(RAr2 − RAr1) = 1.435

Figure 8A:
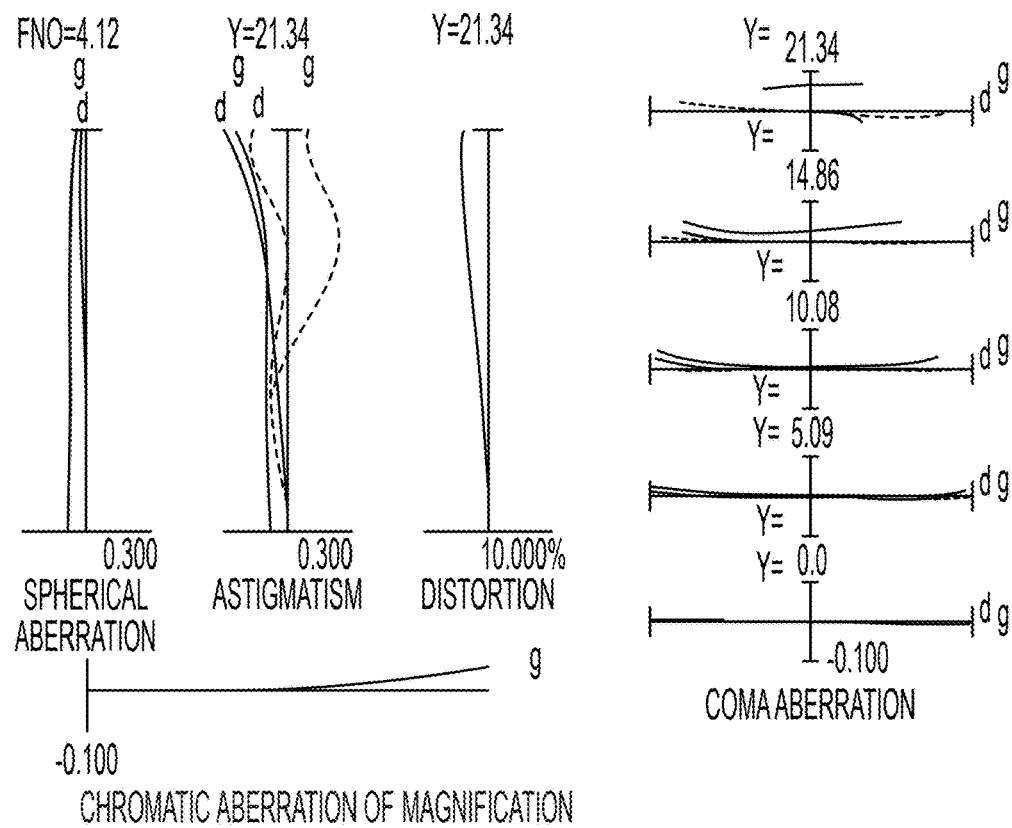
FIGS. 8A and 8B are various aberration graphs of the zoom optical system according to the third example upon focusing on infinity in the wide-angle end state and a telephoto end state.
Figure 8B:
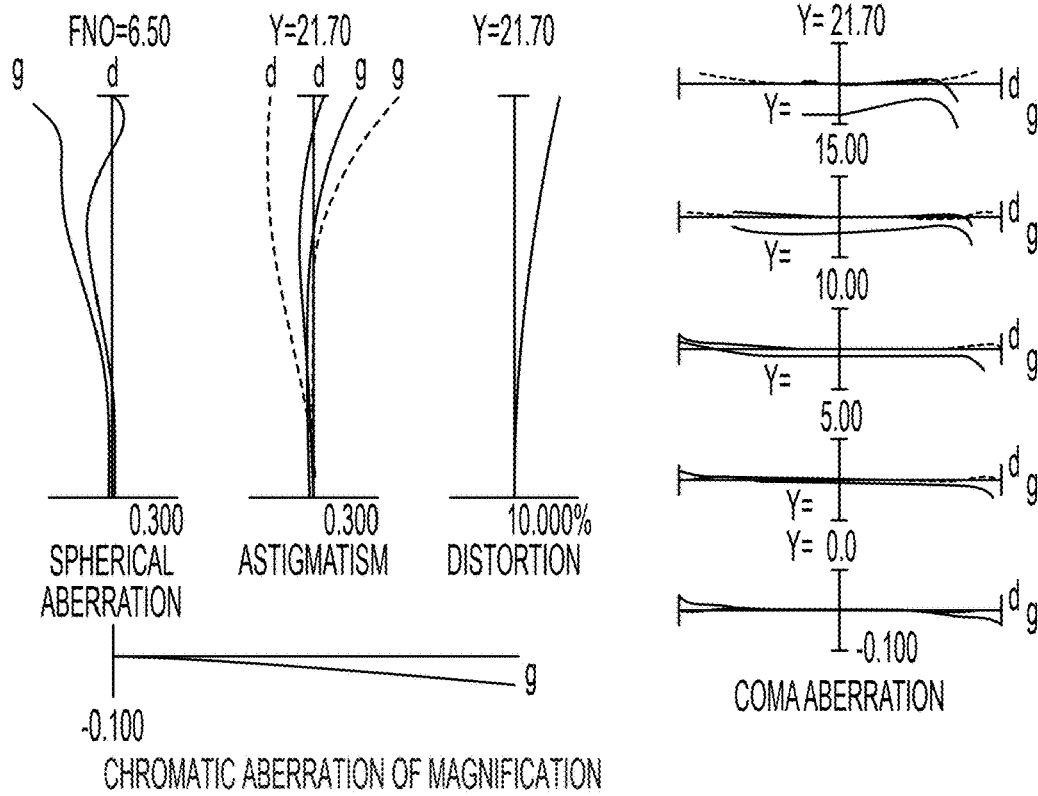
Figure 9A:
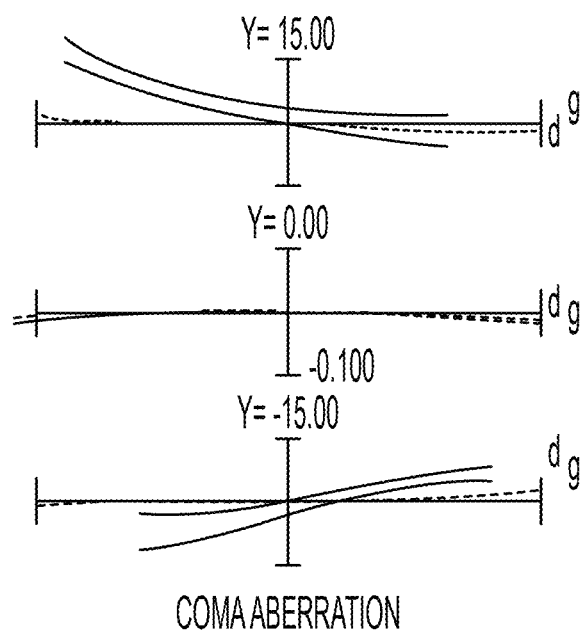
FIGS. 9A and 9B are coma aberration graphs of the zoom optical system according to the third example in the wide-angle end state and the telephoto end state when blur correction is performed.
Figure 9B:
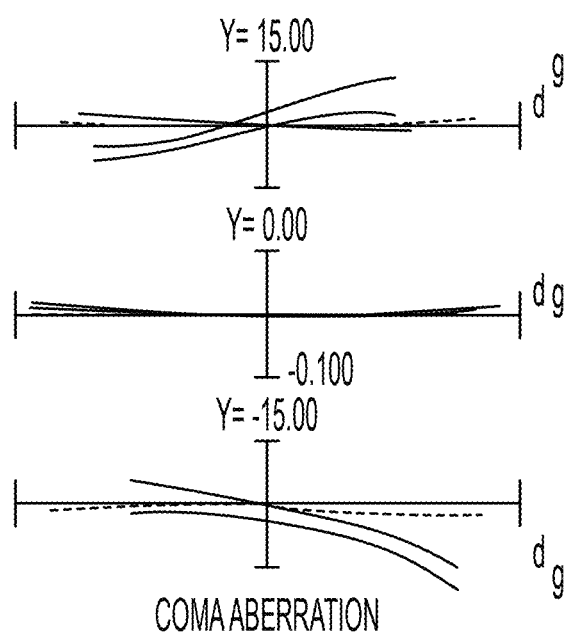

FIGS. 8A and 8B are various aberration graphs of the zoom optical system according to the third example upon focusing on infinity in the wide-angle end state and the telephoto end state. FIGS. 9A and 9B are coma aberration graphs of the zoom optical system according to the third example in the wide-angle end state and the telephoto end state when blur correction is performed. The various aberration graphs show that the zoom optical system according to the third example favorably corrects the various aberrations, and has an excellent imaging performance.

Fourth Example

Figure 10:
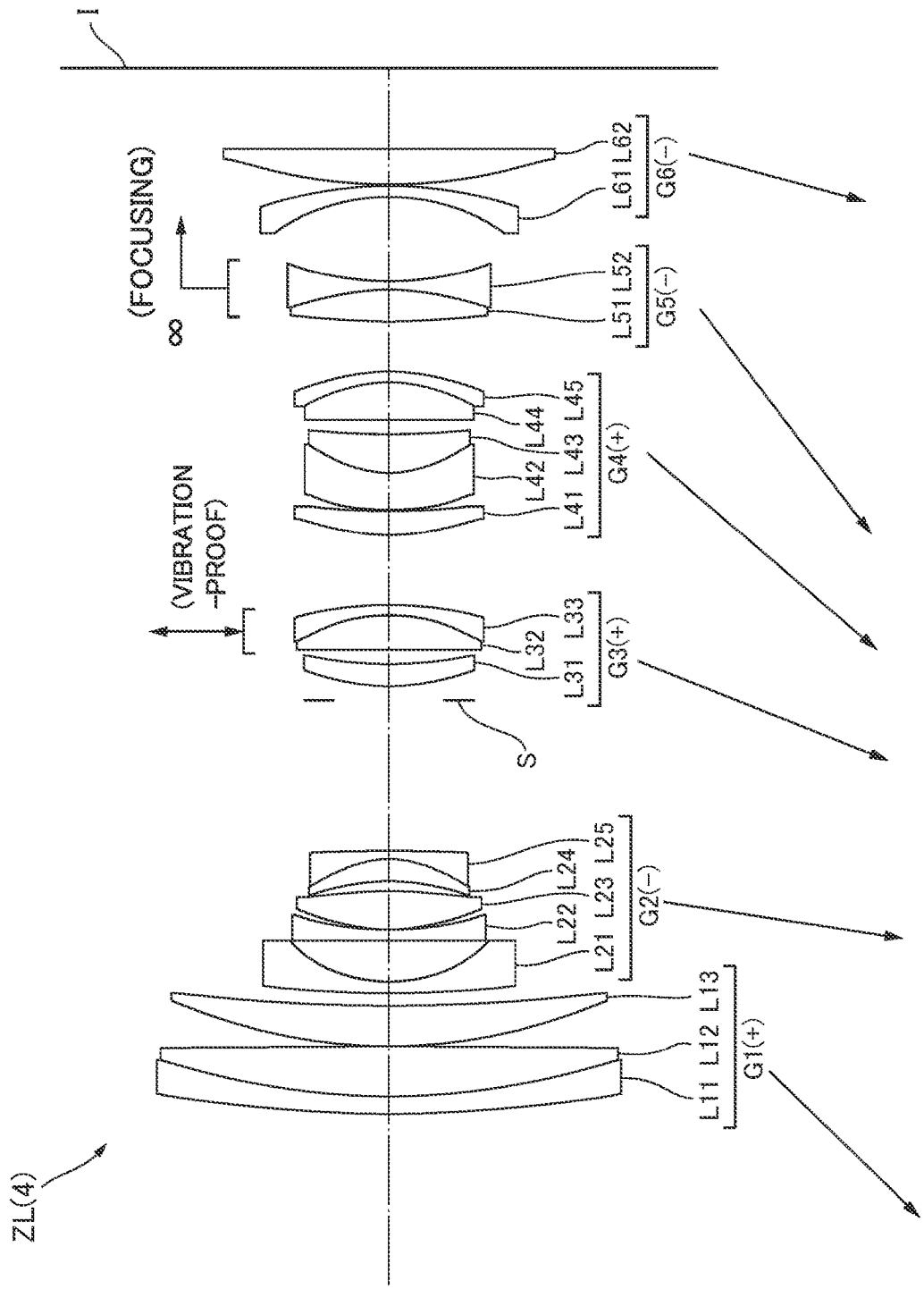
FIG. 10 is a lens configuration diagram of a zoom optical system according to a fourth example upon focusing on infinity in a wide angle end state.

A fourth example is described with reference to FIGS. 10 to 12A and 12B and Table 4. FIG. 10 is a lens configuration diagram of a zoom optical system according to the fourth example upon focusing on infinity in a wide angle end state. The zoom optical system ZL(4) according to the fourth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 10 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a biconvex positive lens L12; and a positive meniscus lens L13 having a convex surface facing the object.

The second lens group G2 consists of, in order from the object: a negative meniscus lens L21 having a convex surface facing the object; a negative meniscus lens L22 having a convex surface facing the object; a biconvex positive lens L23; a cemented lens composed of a positive meniscus lens L24 having a concave surface facing the object and a negative meniscus lens L25 having a concave surface facing the object. The object side surface of the negative meniscus lens L21 is of aspherical shape. The image side surface of the negative meniscus lens L25 is of aspherical shape.

The third lens group G3 consists of, in order from the object: a positive meniscus lens L31 having a convex surface facing the object; and a cemented lens composed of a biconvex positive lens L32 and a negative meniscus lens L33 having a concave surface facing the object. The image side surface of the positive meniscus lens L31 is of aspherical shape.

The fourth lens group G4 consists of, in order from the object: a positive meniscus lens L41 having a convex surface facing the object; a cemented lens composed of a negative meniscus lens L42 having a convex surface facing the object and a positive meniscus lens L43 having a convex surface facing the object; and a cemented lens composed of a positive meniscus lens L44 having a concave surface facing the object and a negative meniscus lens L45 having a concave surface facing the object. The image side surface of the negative meniscus lens L45 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a plano-convex positive lens L62 having a plane facing the image surface I. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the positive lens L32 and the negative meniscus lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 4 lists values of data on the zoom optical system according to the fourth example.

TABLE 4

[General Data]

Zooming ratio 7.848
f123w = 102.18699
f123t = −1535.17561

|  | W | M1 | M2 | T |
|---|---|---|---|---|
| FNO | 4.12000 | 5.00001 | 6.14000 | 6.50003 |
| ω | 41.94830 | 22.05780 | 10.36801 | 5.96172 |
| Y | 21.65 | 21.70 | 21.70 | 21.70 |
| TL | 122.11284 | 138.25648 | 173.12226 | 195.4602 |

[Lens Data]

| Surface Number | R | D | vd | nd |
|---|---|---|---|---|
| 1 | 157.9423 | 2.0000 | 23.80 | 1.846660 |
| 2 | 81.8879 | 5.9036 | 67.90 | 1.593190 |
| 3 | −2013.3747 | 0.1000 |  |  |
| 4 | 63.5017 | 4.6636 | 63.34 | 1.618000 |

TABLE 4-continued

| | | | | |
|---|---|---|---|---|
| 5 | 210.8809 | D1(Variable) | | |
| 6* | 318.1018 | 1.2500 | 40.66 | 1.883000 |
| 7 | 16.7008 | 4.7201 | | |
| 8 | 704.9777 | 1.3500 | 25.79 | 1.940573 |
| 9 | 35.9277 | 0.1354 | | |
| 10 | 25.6246 | 4.3288 | 20.88 | 1.922860 |
| 11 | −84.8316 | 1.1878 | | |
| 12 | −26.8353 | 2.5514 | 26.72 | 1.759928 |
| 13 | −14.0619 | 1.1000 | 40.66 | 1.883000 |
| 14* | −120.1155 | D2(Variable) | | |
| 15 | ∞ | 1.7168 | | (Aperture Stop S) |
| 16* | 25.0707 | 2.5492 | 56.42 | 1.650119 |
| 17 | 50.5707 | 1.8201 | | |
| 18 | 2141.2793 | 3.9646 | 47.10 | 1.718816 |
| 19 | −19.4561 | 1.2000 | 29.37 | 1.950000 |
| 20 | −40.3974 | D3(Variable) | | |
| 21 | 33.1155 | 2.7430 | 58.12 | 1.622989 |
| 22 | 102.1338 | 0.1000 | | |
| 23 | 26.3197 | 4.3495 | 29.37 | 1.950000 |
| 24 | 14.1783 | 4.4212 | 70.32 | 1.487490 |
| 25 | 72.5822 | 1.6811 | | |
| 26 | −306.2709 | 4.3812 | 82.57 | 1.497820 |
| 27 | −18.7373 | 1.2500 | 37.22 | 1.882023 |
| 28* | −24.4766 | D4 (Variable) | | |
| 29 | 119.2349 | 3.5589 | 25.92 | 1.805628 |
| 30 | −33.6869 | 1.0000 | 40.12 | 1.851080 |
| 31* | 32.8619 | D5 (Variable) | | |
| 32 | −22.4629 | 1.2500 | 40.66 | 1.883000 |
| 33 | −43.8572 | 0.1000 | | |
| 34 | 61.5070 | 4.1976 | 33.02 | 1.689260 |
| 35 | ∞ | BF | | |

[Aspherical Surface Data]

6th Surface

κ = 6.0000, A4 = 9.24936E−06, A6 = 4.48621E−09
A8 = −4.48203E−11, A10 = 1.65001E−13, A12 = 0.00000E+00

14th Surface

κ = 5.8635, A4 = −1.80704E−06, A6 = 1.46957E−08
A8 = −7.35664E−11, A10 = −5.50824E−13, A12 = 0.00000E+00

16th Surface

κ = 0.0729, A4 = −4.52720E−06, A6 = 2.52623E−08
A8 = −1.11420E−10, A10 = 1.41519E−13, A12 = 0.00000E+00

28th Surface

κ = 1.0568, A4 = 1.62692E−05, A6 = −9.59061E−09
A8 = −6.35322E−11, A10 = 1.73247E−13, A12 = 0.00000E+00

31st Surface

κ = 1.0365, A4 = −5.49985E−06, A6 = 5.29125E−08
A8 = −9.39998E−11, A10 = 1.17057E−13, A12 = 0.00000E+00

[Lens Group Data]

| Group | First surface | Focal length |
|---|---|---|
| G1 | 1 | 106.62052 |
| G2 | 6 | −16.22739 |
| G3 | 16 | 41.04090 |
| G4 | 21 | 40.60874 |
| G5 | 29 | −49.86905 |
| G6 | 32 | −140.23760 |

[Variable Distance Data]

| | W Infinity | M1 Infinity | M2 Infinity | T Infinity |
|---|---|---|---|---|
| f | 24.71999 | 49.99999 | 109.99995 | 193.99988 |
| D0 | ∞ | ∞ | ∞ | ∞ |
| D1 | 1.50000 | 18.53350 | 35.68354 | 55.45436 |
| D2 | 17.47125 | 8.41504 | 3.49296 | 0.78316 |
| D3 | 8.24386 | 2.43196 | 1.40000 | 1.44036 |
| D4 | 6.00186 | 7.14502 | 5.60349 | 2.49999 |

TABLE 4-continued

| D5 | 10.03309 | 14.70182 | 17.27531 | 20.33845 |
|---|---|---|---|---|
| BF | 9.28884 | 17.45519 | 40.09303 | 45.36996 |

| | W Short-distance | M1 Short-distance | M2 Short-distance | T Short-distance |
|---|---|---|---|---|
| β | −0.06195 | −0.10885 | −0.20280 | −0.28444 |
| D0 | 369.2759 | 403.0933 | 448.2665 | 495.9287 |
| D1 | 1.50000 | 18.53350 | 35.68354 | 55.45436 |
| D2 | 17.47125 | 8.41504 | 3.49296 | 0.78316 |
| D3 | 8.24386 | 2.43196 | 1.40000 | 1.44036 |
| D4 | 7.29302 | 9.64626 | 10.19294 | 12.30143 |
| D5 | 8.74193 | 12.20058 | 12.68586 | 10.53701 |
| BF | 9.31603 | 17.53910 | 40.38407 | 45.94189 |

[Conditional expression corresponding value]

Conditional Expression(1) Mv4/Mv3 = 1.189
Conditional Expression(2) Mv2/fw = 0.785
Conditional Expression(3) ft/fw = 7.848
Conditional Expression(4) ωw = 41.948
Conditional Expression(5) ωt = 5.962
Conditional Expression(6) fw/f123w = 0.242
Conditional Expression(7) ft/f123t = −0.126
Conditional Expression(8) BFw/fw = 0.376
Conditional Expression(9) (−f5)/fw = 2.017
Conditional Expression(10) Mv5/Mv6 = 1.286
Conditional Expression(11) Mv1/(ft − fw) = 0.433
Conditional Expression(12) (RAr2 + RAr1)/(RAr2 − RAr1) = 0.168

Figure 11A:
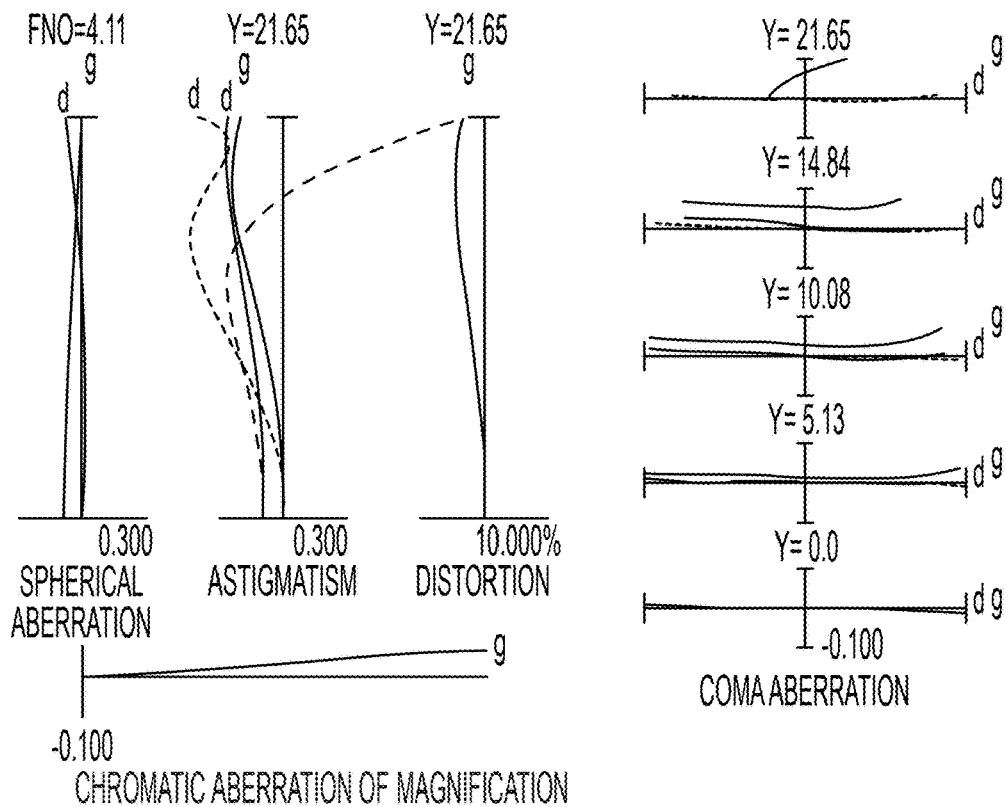
FIGS. 11A and 11B are various aberration graphs of the zoom optical system according to the fourth example upon focusing on infinity in the wide-angle end state and a telephoto end state.
Figure 11B:
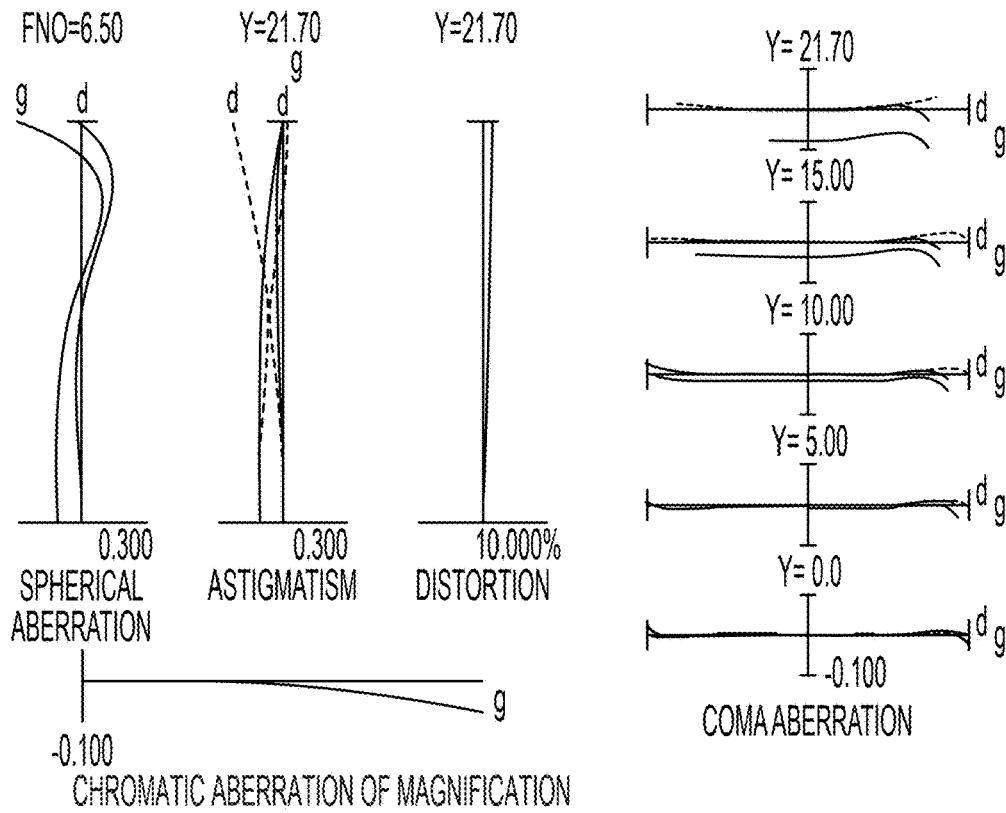
Figure 12A:
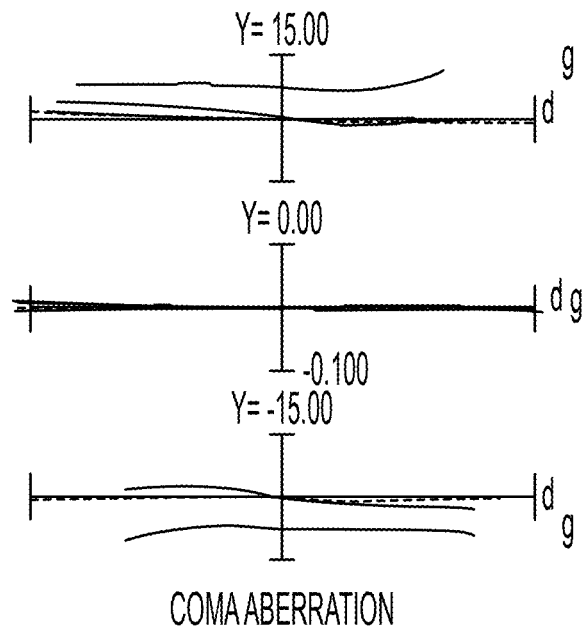
FIGS. 12A and 12B are coma aberration graphs of the zoom optical system according to the fourth example in the wide-angle end state and the telephoto end state when blur correction is performed.
Figure 12B:
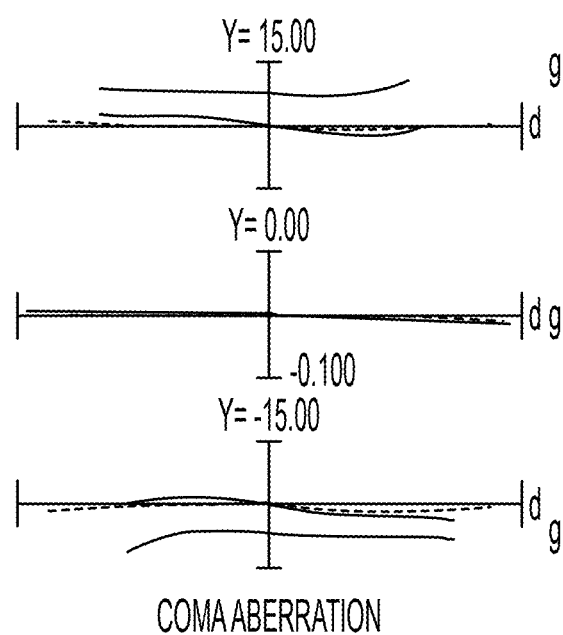

FIGS. 11A and 11B are various aberration graphs of the zoom optical system according to the fourth example upon focusing on infinity in the wide-angle end state and the telephoto end state. FIGS. 12A and 12B are coma aberration graphs of the zoom optical system according to the fourth example in the wide-angle end state and the telephoto end state when blur correction is performed. The various aberration graphs show that the zoom optical system according to the fourth example favorably corrects the various aberrations, and has an excellent imaging performance.

Fifth Example

A fifth example is described with reference to FIGS. 13 to 15A and 15B and Table 5. FIG. 13 is a lens configuration diagram of a zoom optical system according to the fifth example upon focusing on infinity in a wide angle end state. The zoom optical system ZL(5) according to the fifth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a positive refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 13 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The object side surface of the negative meniscus lens L21 is of aspherical shape. The image side surface of the negative meniscus lens L24 is of aspherical shape.

The third lens group G3 consists of, in order from the object: a positive meniscus lens L31 having a convex surface facing the object; and a cemented lens composed of a negative meniscus lens L32 having a convex surface facing the object and a biconvex positive lens L33. The image side surface of the positive meniscus lens L31 is of aspherical shape.

The fourth lens group G4 consists of, in order from the object: a positive meniscus lens L41 having a convex surface facing the object; a cemented lens composed of a negative meniscus lens L42 having a convex surface facing the object and a biconvex positive lens L43; and a cemented lens composed of a biconvex positive lens L44 and a biconcave negative lens L45. The image side surface of the negative lens L45 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 5 lists values of data on the zoom optical system according to the fifth example.

TABLE 5

[General Data]

Zooming ratio 7.848
f123w = 148.33142
f123t = −861.38789

| | W | M1 | M2 | T |
|---|---|---|---|---|
| FNO | 4.12000 | 5.60000 | 6.20000 | 6.49999 |
| ω | 42.61146 | 22.53540 | 10.65017 | 6.13829 |
| Y | 20.68 | 21.70 | 21.70 | 21.70 |
| TL | 122.11284 | 137.15660 | 162.89036 | 188.0553 |

[Lens Data]

| Surface Number | R | D | vd | nd |
|---|---|---|---|---|
| 1 | 120.0314 | 2.0000 | 23.80 | 1.846660 |
| 2 | 75.2829 | 6.2421 | 82.57 | 1.497820 |
| 3 | −2364.7242 | 0.1000 | | |
| 4 | 64.4734 | 5.0111 | 64.74 | 1.607834 |

TABLE 5-continued

| | | | | |
|---|---|---|---|---|
| 5 | 308.6603 | D1(Variable) | | |
| 6* | 221.2774 | 1.2500 | 40.66 | 1.883000 |
| 7 | 17.1630 | 5.2789 | | |
| 8 | −38.7201 | 1.1000 | 33.32 | 1.903162 |
| 9 | 95.9763 | 0.1000 | | |
| 10 | 40.1060 | 4.3656 | 20.88 | 1.922860 |
| 11 | −33.5026 | 0.9492 | | |
| 12 | −22.3899 | 1.1000 | 40.67 | 1.882762 |
| 13* | −102.6938 | D2(Variable) | | |
| 14 | ∞ | 0.8341 | | (Aperture Stop S) |
| 15* | 31.3299 | 2.7567 | 63.86 | 1.517039 |
| 16 | 394.2979 | 1.0000 | | |
| 17 | 76.9690 | 1.1000 | 25.78 | 1.906571 |
| 18 | 30.3656 | 2.9449 | 45.71 | 1.623046 |
| 19 | −89.6818 | D3(Variable) | | |
| 20 | 23.7528 | 3.8095 | 41.66 | 1.659437 |
| 21 | 83.0826 | 2.6863 | | |
| 22 | 52.1032 | 1.8385 | 32.25 | 1.954620 |
| 23 | 15.4393 | 5.4045 | 70.32 | 1.487490 |
| 24 | −39.4485 | 0.1000 | | |
| 25 | 37.0327 | 3.3978 | 67.89 | 1.593103 |
| 26 | −838.1647 | 1.2500 | 43.15 | 1.810385 |
| 27* | 82.5521 | D4(Variable) | | |
| 28 | 623.8813 | 3.1385 | 22.74 | 1.808090 |
| 29 | −33.6869 | 1.0000 | 41.21 | 1.836497 |
| 30* | 32.8807 | D5(Variable) | | |
| 31 | −21.3174 | 1.2500 | 27.35 | 1.663819 |
| 32 | −31.8044 | 0.1043 | | |
| 33 | 92.9303 | 3.5471 | 28.93 | 1.727721 |
| 34 | −394.1540 | BF | | |

[Aspherical Surface Data]

6th Surface

κ = 5.7341, A4 = 1.16802E−06, A6 = 2.03518E−09
A8 = 1.81447E−11, A10 = 8.58869E−14, A12 = 0.00000E+00

13th Surface

κ = 3.2914, A4 = −1.11111E−06, A6 = 1.49282E−09
A8 = −3.72110E−11, A10 = 6.45032E−13, A12 = 0.00000E+00

15th Surface

κ = 0.0277, A4 = −8.27654E−06, A6 = 1.77158E−08
A8 = −1.81439E−10, A10 = 1.08193E−12, A12 = 0.00000E+00

27th Surface

κ = 1.9922, A4 = 1.24262E−05, A6 = −1.46784E−08
A8 = 3.73707E−10, A10 = −2.02655E−12, A12 = 0.00000E+00

30th Surface

κ = 1.9072, A4 = −8.91746E−06, A6 = 3.65180E−08
A8 = −5.04265E−10, A10 = 1.78607E−12, A12 = 0.00000E+00

[Lens Group Data]

| Group | First surface | Focal length |
|---|---|---|
| G1 | 1 | 99.41971 |
| G2 | 6 | −15.74038 |
| G3 | 15 | 41.65192 |
| G4 | 20 | 37.63548 |
| G5 | 28 | −40.12367 |
| G6 | 31 | 7119.59107 |

[Variable Distance Data]

| | W Infinity | M1 Infinity | M2 Infinity | T Infinity |
|---|---|---|---|---|
| f | 24.71999 | 49.99997 | 109.99986 | 193.99963 |
| D0 | ∞ | ∞ | ∞ | ∞ |
| D1 | 1.50000 | 16.60455 | 37.99399 | 53.23975 |
| D2 | 18.36307 | 10.15010 | 3.58234 | 1.66590 |
| D3 | 13.02129 | 4.83611 | 1.75831 | 1.47831 |
| D4 | 6.45265 | 6.28920 | 8.47335 | 2.50000 |
| D5 | 9.82549 | 18.17413 | 19.06777 | 25.32113 |
| BF | 9.29124 | 17.44341 | 28.35549 | 40.19113 |

| | W Short-distance | M1 Short-distance | M2 Short-distance | T Short-distance |
|---|---|---|---|---|
| β | −0.06170 | −0.10941 | −0.19455 | −0.28776 |
| D0 | 370.3154 | 405.3261 | 459.3561 | 504.3260 |
| D1 | 1.50000 | 16.60455 | 37.99399 | 53.23975 |
| D2 | 18.36307 | 10.15010 | 3.58234 | 1.66590 |
| D3 | 13.02129 | 4.83611 | 1.75831 | 1.47831 |
| D4 | 7.54590 | 8.23070 | 14.07758 | 12.27653 |
| D5 | 8.73225 | 16.23263 | 13.46354 | 15.54460 |
| BF | 9.31427 | 17.51651 | 28.58674 | 40.69673 |

[Conditional expression corresponding value]

Conditional Expression(1) Mv4/Mv3 = 1.374
Conditional Expression(2) Mv2/fw = 0.575
Conditional Expression(3) ft/fw = 7.848
Conditional Expression(4) ωw = 42.611
Conditional Expression(5) ωt = 6.138
Conditional Expression(6) fw/f123w = 0.167
Conditional Expression(7) ft/f123t = −0.225
Conditional Expression(8) BFw/fw = 0.376
Conditional Expression(9) (−f5)/fw = 1.623
Conditional Expression(10) Mv5/Mv6 = 1.501
Conditional Expression(11) Mv1/(ft − fw) = 0.390
Conditional Expression(12) (RAr2 + RAr1)/(RAr2 − RAr1) = 0.490

Figure 14A:
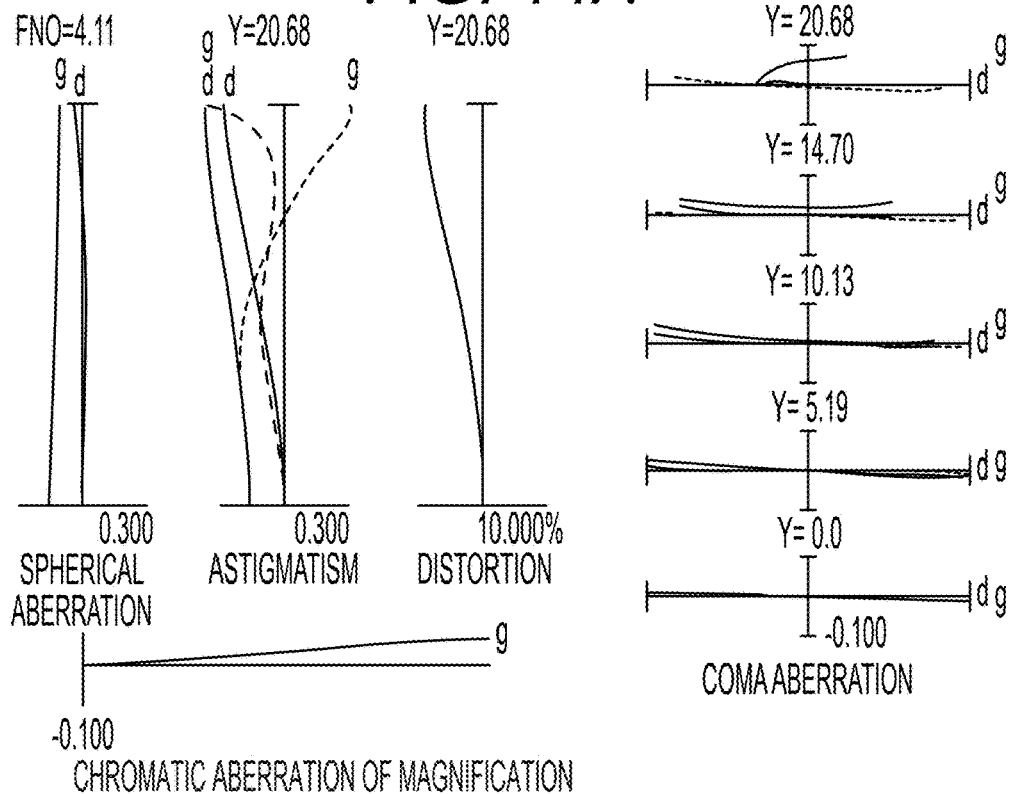
FIGS. 14A and 14B are various aberration graphs of the zoom optical system according to the fifth example upon focusing on infinity in the wide-angle end state and a telephoto end state.
Figure 14B:
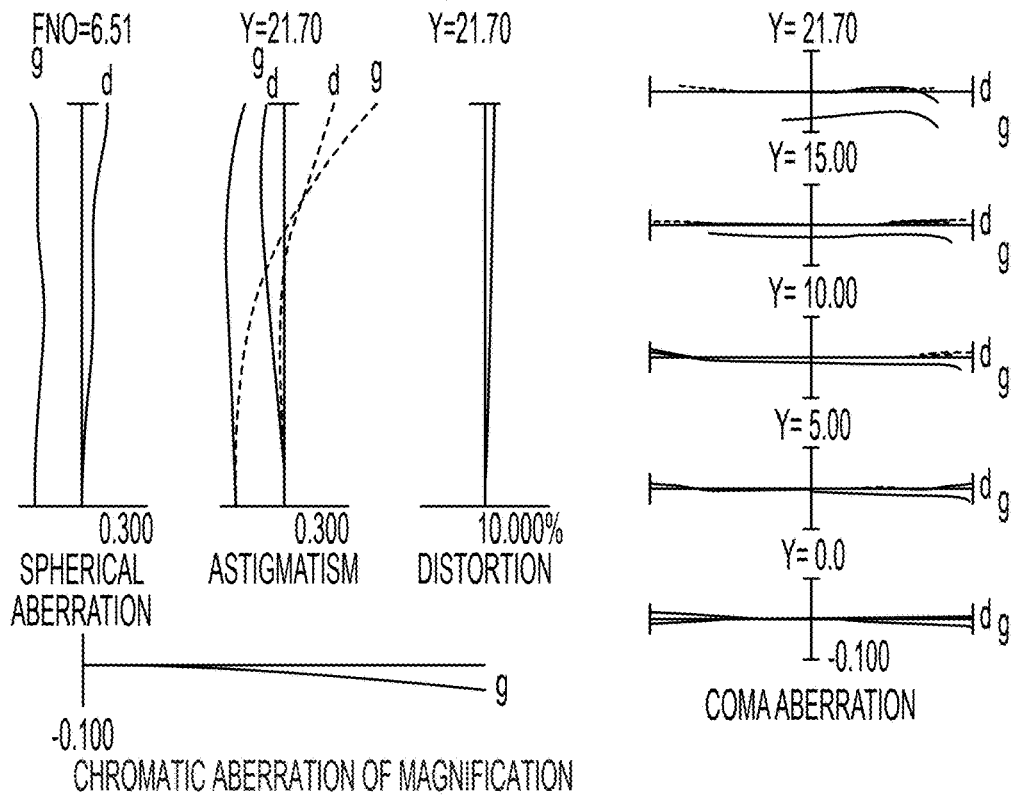
Figure 15A:
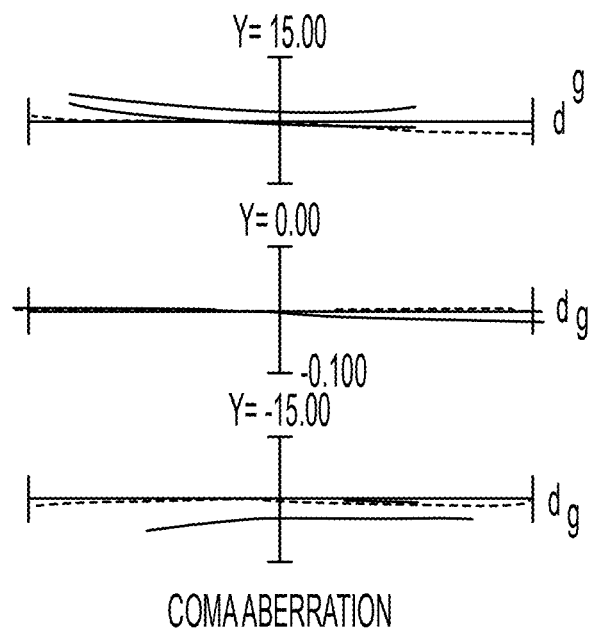
FIGS. 15A and 15B are coma aberration graphs of the zoom optical system according to the fifth example in the wide-angle end state and the telephoto end state when blur correction is performed.
Figure 15B:
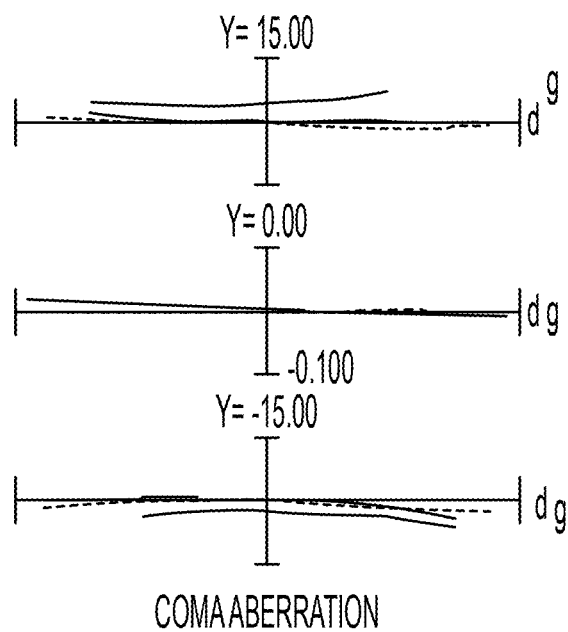

FIGS. 14A and 14B are various aberration graphs of the zoom optical system according to the fifth example upon focusing on infinity in the wide-angle end state and the telephoto end state. FIGS. 15A and 15B are coma aberration graphs of the zoom optical system according to the fifth example in the wide-angle end state and the telephoto end state when blur correction is performed. The various aberration graphs show that the zoom optical system according to the fifth example favorably corrects the various aberrations, and has an excellent imaging performance.

Sixth Example

Figure 16:
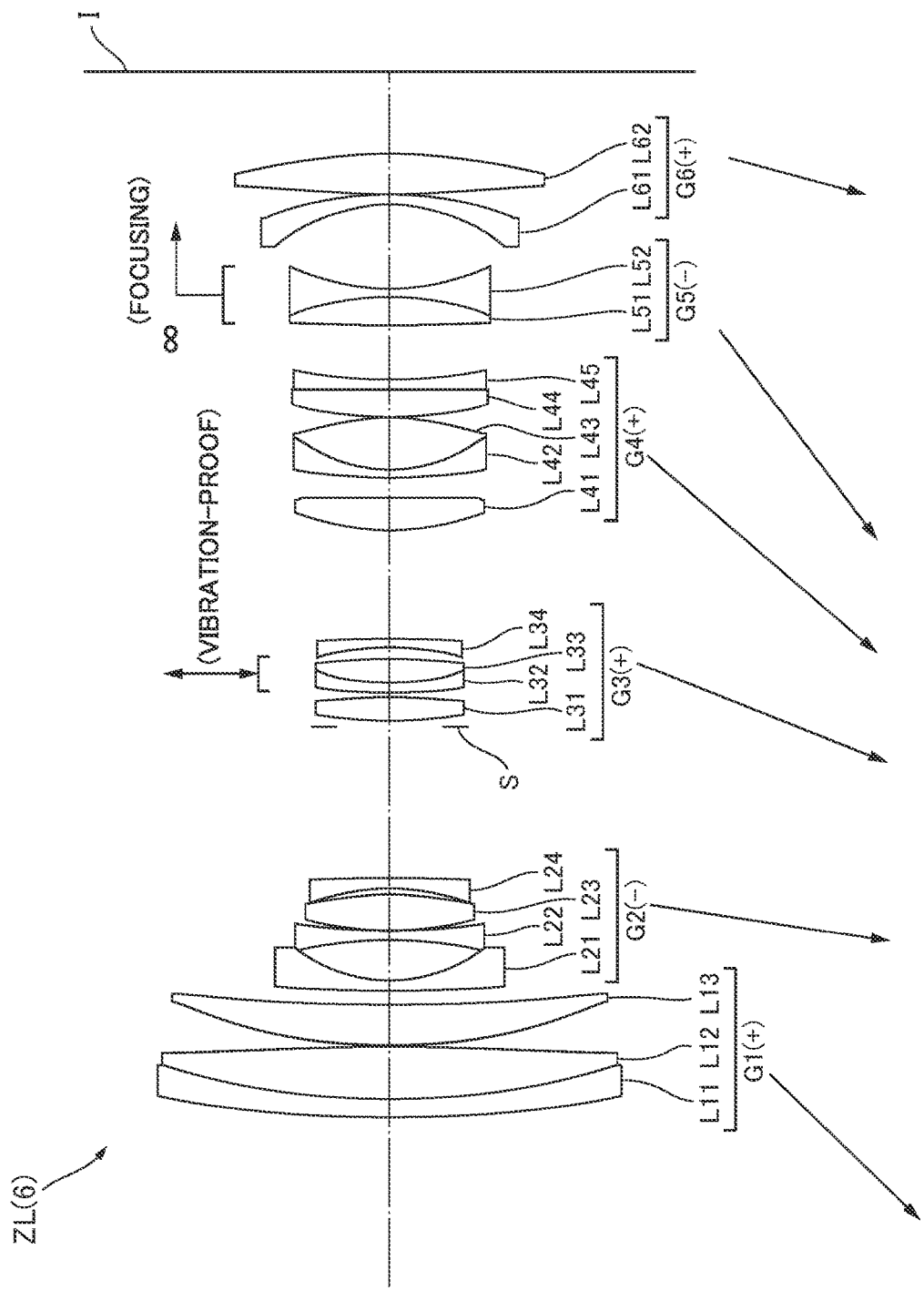
FIG. 16 is a lens configuration diagram of a zoom optical system according to a sixth example upon focusing on infinity in a wide angle end state.

A sixth example is described with reference to FIGS. 16 to 18A and 18B and Table 6. FIG. 16 is a lens configuration diagram of a zoom optical system according to the sixth example upon focusing on infinity in a wide angle end state. The zoom optical system ZL(6) according to the sixth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a positive refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 16 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The image side surface of the negative meniscus lens L21 is of aspherical shape. The image side surface of the negative meniscus lens L24 is of aspherical shape.

The third lens group G3 consists of, in order from the object: a biconvex positive lens L31; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a biconvex positive lens L41; a cemented lens composed of a negative meniscus lens L42 having a convex surface facing the object and a biconvex positive lens L43; and a cemented lens composed of a positive meniscus lens L44 having a convex surface facing the object and a negative meniscus lens L45 having a concave surface facing the object. The image side surface of the positive lens L41 is of aspherical shape. The image side surface of the negative meniscus lens L45 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 6 lists values of data on the zoom optical system according to the sixth example.

TABLE 6

[General Data]

Zooming ratio 7.848
f123w = −136.43292
f123t = −215.16315

|  | W | M1 | M2 | T |
|---|---|---|---|---|
| FNO | 4.12001 | 5.60001 | 6.20000 | 6.50003 |
| ω | 42.67959 | 22.59339 | 10.65052 | 6.14768 |
| Y | 20.58 | 21.70 | 21.70 | 21.70 |
| TL | 122.11285 | 136.30769 | 162.04178 | 189.3093 |

[Lens Data]

| Surface Number | R | D | vd | nd |
|---|---|---|---|---|
| 1 | 152.2083 | 2.0000 | 23.80 | 1.846660 |
| 2 | 89.2068 | 6.1884 | 82.57 | 1.497820 |
| 3 | −413.2934 | 0.1000 | | |
| 4 | 63.3220 | 4.8830 | 67.90 | 1.593190 |
| 5 | 253.0230 | D1(Variable) | | |
| 6* | 137.9264 | 1.2500 | 40.66 | 1.882996 |
| 7 | 17.8991 | 4.7805 | | |

TABLE 6-continued

| 8 | −47.3363 | 1.1000 | 36.88 | 1.897432 |
| 9 | 75.2485 | 0.1000 | | |
| 10 | 39.7397 | 4.1374 | 21.58 | 1.918850 |
| 11 | −39.0575 | 0.7197 | | |
| 12 | −24.5868 | 1.1000 | 47.49 | 1.802013 |
| 13* | −591.6627 | D2(Variable) | | |
| 14 | ∞ | 0.7464 | | (Aperture Stop S) |
| 15 | 46.9722 | 2.7552 | 48.04 | 1.768500 |
| 16 | −93.2395 | 0.5000 | | |
| 17 | 51.8617 | 1.1000 | 29.95 | 1.987022 |
| 18 | 25.2907 | 2.9021 | 45.71 | 1.623046 |
| 19 | −73.0708 | 1.4973 | | |
| 20 | −29.7887 | 1.0273 | 35.73 | 1.902641 |
| 21 | −85.6917 | D3(Variable) | | |
| 22* | 28.7123 | 3.8190 | 45.24 | 1.768369 |
| 23 | −400.5317 | 2.3100 | | |
| 24 | 68.0478 | 1.0008 | 32.32 | 1.953752 |
| 25 | 17.9627 | 5.9680 | 78.66 | 1.495797 |
| 26 | −34.0844 | 0.1000 | | |
| 27 | 42.3850 | 3.2656 | 67.90 | 1.593190 |
| 28 | 754.0925 | 1.2500 | 44.96 | 1.790885 |
| 29* | 73.7905 | D4(Variable) | | |
| 30 | 256.5317 | 3.3327 | 22.74 | 1.808090 |
| 31 | −33.6869 | 1.0000 | 40.27 | 1.839964 |
| 32* | 28.6240 | D5(Variable) | | |
| 33 | −20.9675 | 1.2500 | 27.35 | 1.663819 |
| 34 | −40.3074 | 0.1000 | | |
| 35 | 173.3096 | 4.5044 | 31.21 | 1.841022 |
| 36 | −72.4610 | BF | | |

[Aspherical Surface Data]

6th Surface

κ = 0.0442, A4 = −4.01520E−06, A6 = 2.02052E−08
A8 = −1.03759E−10, A10 = 3.37776E−13, A12 = 0.00000E+00

13th Surface

κ = 1.0000, A4 = −6.36415E−06, A6 = 2.72142E−08
A8 = −2.64695E−10, A10 = 8.53046E−13, A12 = 0.00000E+00

22nd Surface

κ = 1.0000, A4 = −4.72982E−06, A6 = 7.21651E−09
A8 = −1.20147E−10, A10 = 3.75555E−13, A12 = 0.00000E+00

29th Surface

κ = 1.0000, A4 = 1.53597E−05, A6 = −6.12529E−09
A8 = 2.59000E−10, A10 = −2.05818E−12, A12 = 0.00000E+00

32nd Surface

κ = 1.0000, A4 = −5.88848E−06, A6 = 4.28279E−08
A8 = −4.85291E−10, A10 = 2.28998E−12, A12 = 0.00000E+00

[Lens Group Data]

| Group | First surface | Focal length |
|---|---|---|
| G1 | 1 | 101.19406 |
| G2 | 6 | −16.04849 |
| G3 | 15 | 49.36913 |
| G4 | 22 | 29.13636 |
| G5 | 30 | −37.13373 |
| G6 | 33 | 424.58679 |

[Variable Distance Data]

|  | W | M1 | M2 | T |
|---|---|---|---|---|
|  | Infinity | Infinity | Infinity | Infinity |
| f | 24.72000 | 50.00001 | 109.99999 | 194.00003 |
| D0 | ∞ | ∞ | ∞ | ∞ |
| D1 | 1.50000 | 15.59832 | 37.20427 | 54.26539 |
| D2 | 17.63580 | 9.34111 | 2.87140 | 1.75361 |
| D3 | 12.53679 | 5.46459 | 2.24074 | 1.47831 |
| D4 | 6.27123 | 7.05298 | 10.12752 | 2.50000 |
| D5 | 9.72366 | 16.01381 | 16.16341 | 24.55336 |
| BF | 9.65757 | 18.04908 | 28.64666 | 39.97093 |

TABLE 6-continued

|  | W Short-distance | M1 Short-distance | M2 Short-distance | T Short-distance |
|---|---|---|---|---|
| β | −0.06163 | −0.10967 | −0.19523 | −0.28795 |
| D0 | 370.3333 | 405.5358 | 460.2499 | 503.0996 |
| D1 | 1.50000 | 15.59832 | 37.20427 | 54.26539 |
| D2 | 17.63580 | 9.34111 | 2.87140 | 1.75361 |
| D3 | 12.53679 | 5.46459 | 2.24074 | 1.47831 |
| D4 | 7.24735 | 8.97695 | 15.97733 | 12.28747 |
| D5 | 8.74755 | 14.08984 | 10.31360 | 14.76589 |
| BF | 9.68397 | 18.12250 | 28.87954 | 40.47730 |

[Conditional expression corresponding value]

Conditional Expression(1) Mv4/Mv3 = 1.365
Conditional Expression(2) Mv2/fw = 0.584
Conditional Expression(3) ft/fw = 7.848
Conditional Expression(4) ωw = 42.680
Conditional Expression(5) ωt = 6.148
Conditional Expression(6) fw/f123w = −0.181
Conditional Expression(7) ft/f123t = −0.902
Conditional Expression(8) BFw/fw = 0.391
Conditional Expression(9) (−f5)/fw = 1.502
Conditional Expression(10) Mv5/Mv6 = 1.489
Conditional Expression(11) Mv1/(ft − fw) = 0.397
Conditional Expression(12) (RAr2 + RAr1)/(RAr2 − RAr1) = 0.623

Figure 17A:
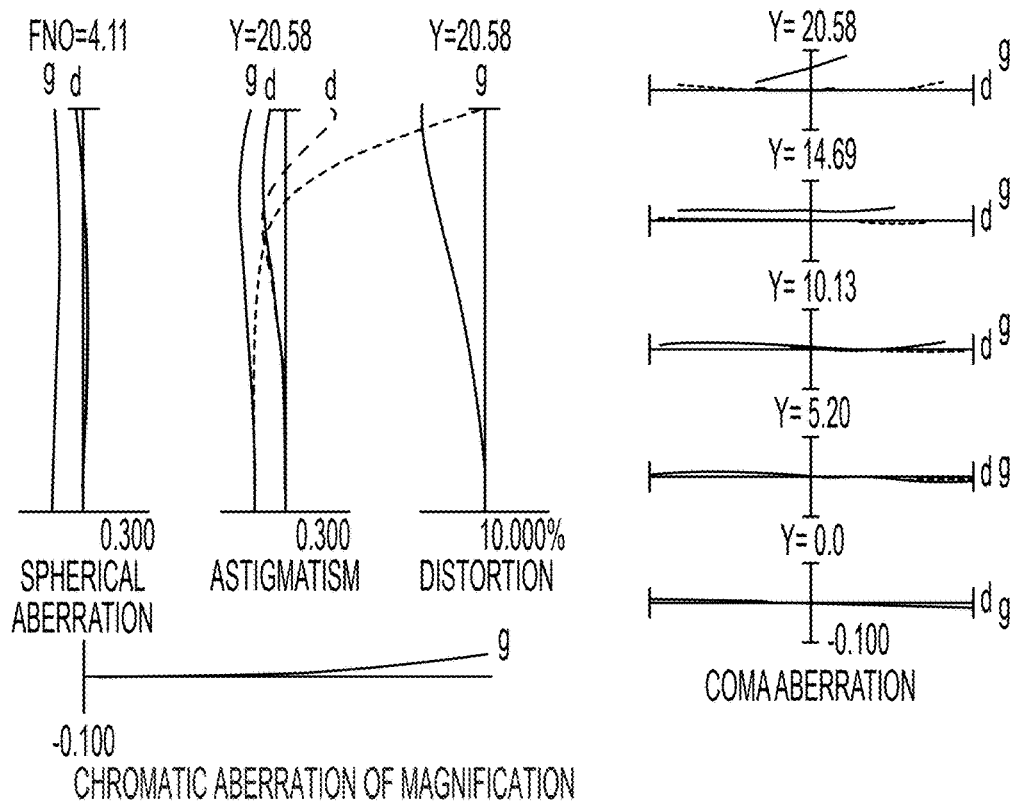
FIGS. 17A and 17B are various aberration graphs of the zoom optical system according to the sixth example upon focusing on infinity in the wide-angle end state and a telephoto end state.
Figure 17B:
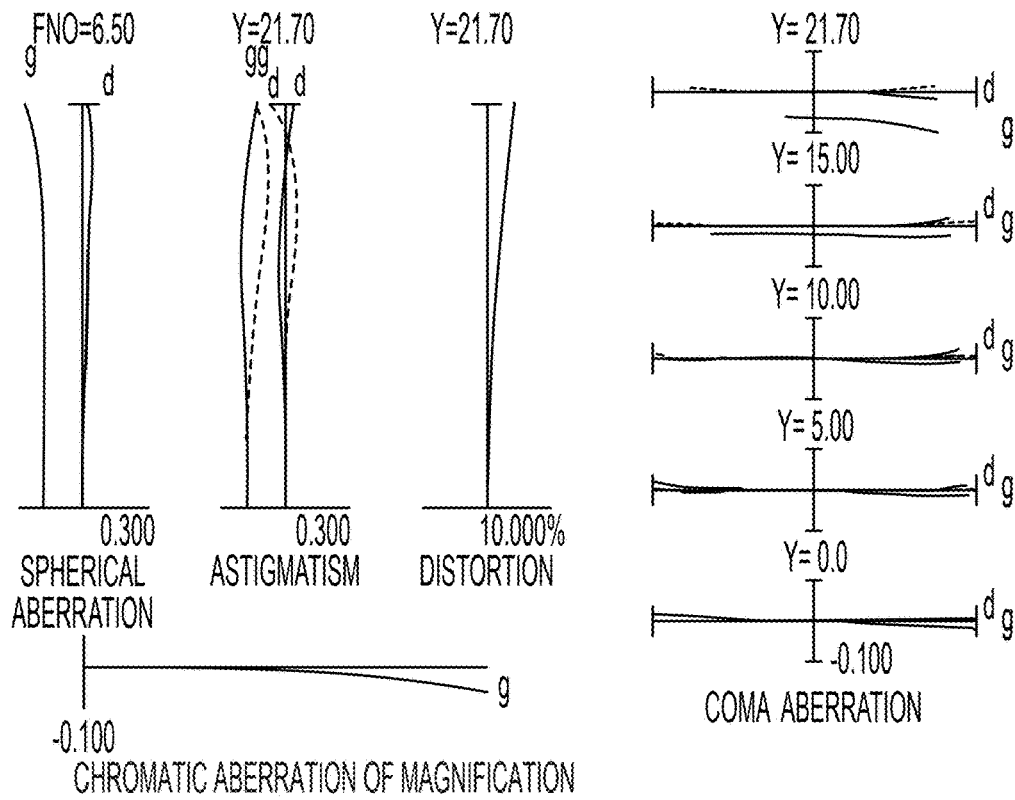
Figure 18A:
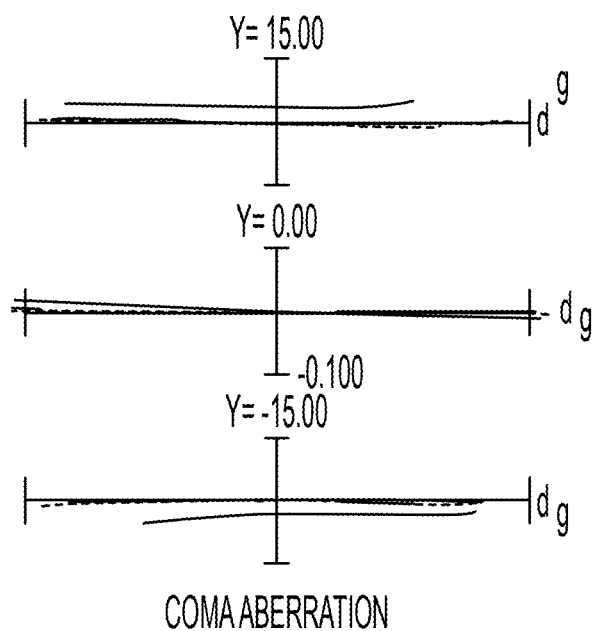
FIGS. 18A and 18B are coma aberration graphs of the zoom optical system according to the sixth example in the wide-angle end state and the telephoto end state when blur correction is performed.
Figure 18B:
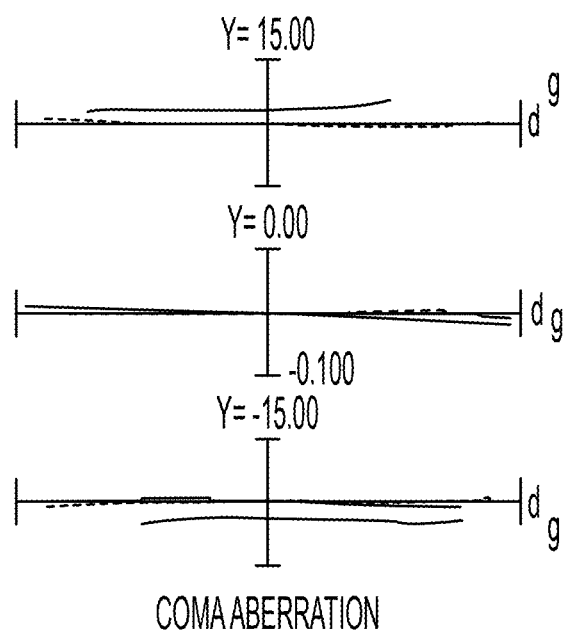

FIGS. 17A and 17B are various aberration graphs of the zoom optical system according to the sixth example upon focusing on infinity in the wide-angle end state and the telephoto end state. FIGS. 18A and 18B are coma aberration graphs of the zoom optical system according to the sixth example in the wide-angle end state and the telephoto end state when blur correction is performed. The various aberration graphs show that the zoom optical system according to the sixth example favorably corrects the various aberrations, and has an excellent imaging performance.

Seventh Example

Figure 19:
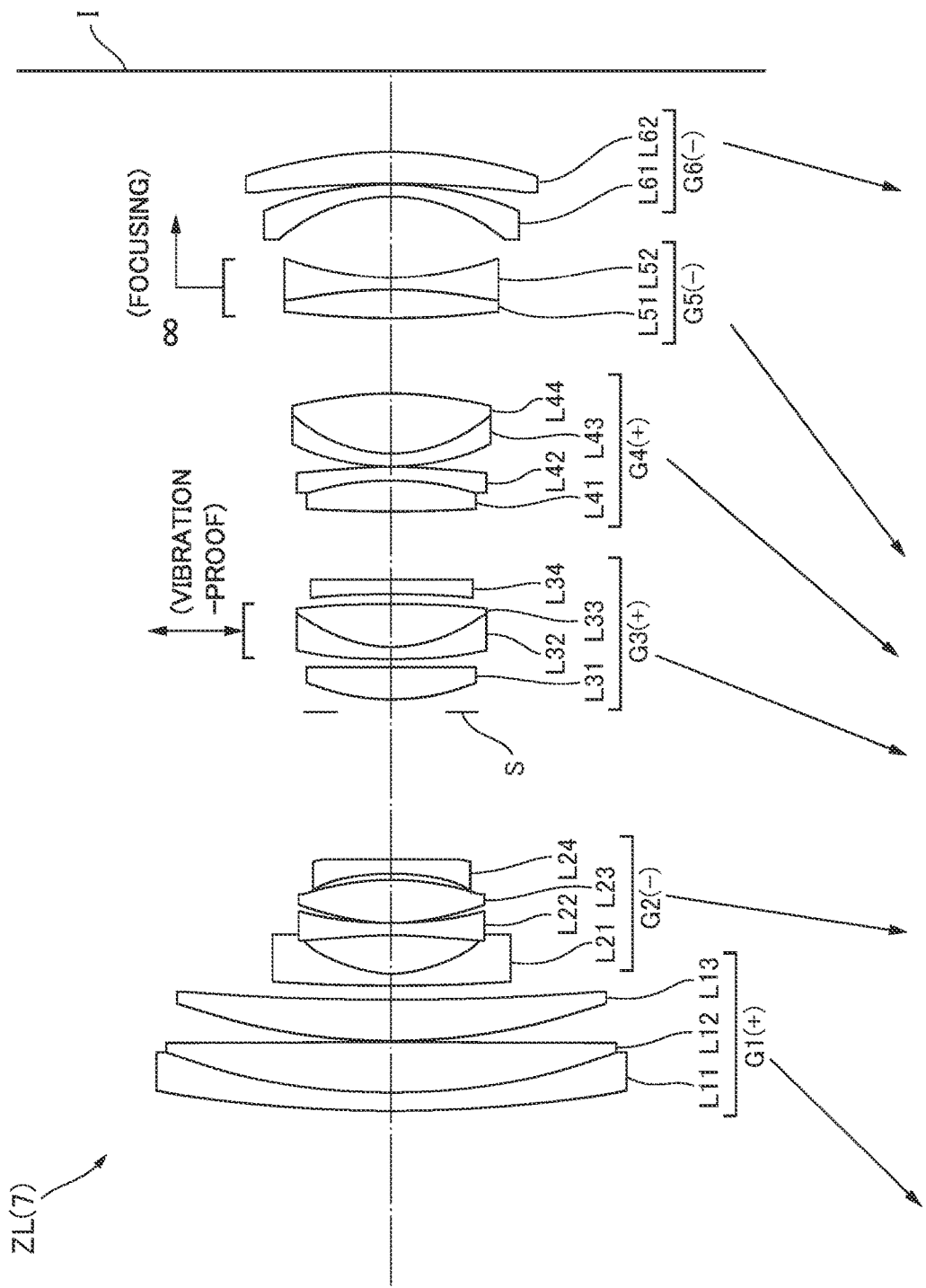
FIG. 19 is a lens configuration diagram of a zoom optical system according to a seventh example upon focusing on infinity in a wide angle end state.

A seventh example is described with reference to FIGS. 19 to 21A and 21B and Table 7. FIG. 19 is a lens configuration diagram of a zoom optical system according to the seventh example upon focusing on infinity in a wide angle end state. The zoom optical system ZL(7) according to the seventh example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 19 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The image side surface of the negative meniscus lens L21 is of aspherical shape. The image side surface of the negative meniscus lens L24 is of aspherical shape.

The third lens group G3 consists of, in order from the object: a positive meniscus lens L31 having a convex surface facing the object; a cemented lens composed of a negative meniscus lens L32 having a convex surface facing the object and a biconvex positive lens L33; and a plano-concave negative lens L34 having a plane facing the image surface I. The image side surface of the positive meniscus lens L31 is of aspherical shape.

The fourth lens group G4 consists of, in order from the object: a cemented lens composed of a biconvex positive lens L41 and a negative meniscus lens L42 having a concave surface facing the object; and a cemented lens composed of a negative meniscus lens L43 having a convex surface facing the object and a biconvex positive lens L44. The image side surface of the positive lens L44 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a positive meniscus lens L62 having a concave surface facing the object. An air lens is formed between the negative meniscus lens L61 and the positive meniscus lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 7 lists values of data on the zoom optical system according to the seventh example.

TABLE 7

[General Data]

Zooming ratio 7.854
f123w = 108.15193
f123t = −1180.72115

|  | W | M1 | M2 | T |
|---|---|---|---|---|
| FNO | 4.11505 | 5.74532 | 6.36855 | 6.68279 |
| ω | 42.27184 | 21.88249 | 10.96245 | 6.04244 |
| Y | 20.89 | 21.70 | 21.70 | 21.70 |
| TL | 120.45755 | 140.80075 | 169.77272 | 195.4575 |

[Lens Data]

| Surface Number | R | D | vd | nd |
|---|---|---|---|---|
| 1 | 164.3654 | 2.0000 | 23.80 | 1.846660 |
| 2 | 73.5155 | 5.9893 | 67.90 | 1.593190 |
| 3 | −2353.2843 | 0.1000 |  |  |
| 4 | 72.1741 | 4.8721 | 46.03 | 1.721059 |
| 5 | 384.7599 | D1(Variable) |  |  |

TABLE 7-continued

| | | | | |
|---|---|---|---|---|
| 6* | 168.2036 | 1.5000 | 40.66 | 1.883000 |
| 7 | 15.8326 | 4.3451 | | |
| 8 | −82.6447 | 1.5000 | 40.66 | 1.883000 |
| 9 | 46.2086 | 0.1000 | | |
| 10 | 30.2898 | 4.8789 | 23.29 | 1.872769 |
| 11 | −32.6789 | 0.7547 | | |
| 12 | −24.9555 | 1.5000 | 40.66 | 1.883000 |
| 13* | −2867.4336 | D2(Variable) | | |
| 14 | ∞ | 1.5000 | | (Aperture Stop S) |
| 15* | 24.1510 | 3.7103 | 57.75 | 1.633994 |
| 16 | 594.5882 | 1.0000 | | |
| 17 | 70.2793 | 1.5000 | 35.28 | 1.801392 |
| 18 | 17.4502 | 4.9253 | 46.90 | 1.702987 |
| 19 | −111.3896 | 1.2478 | | |
| 20 | −65.1233 | 1.5000 | 44.85 | 1.743972 |
| 21 | ∞ | D3(Variable) | | |
| 22 | 132.6869 | 3.6334 | 82.57 | 1.497820 |
| 23 | −33.2203 | 1.5000 | 23.99 | 1.871866 |
| 24 | −81.5274 | 0.1000 | | |
| 25 | 26.2321 | 1.5000 | 40.98 | 1.869660 |
| 26 | 16.8448 | 7.0033 | 57.83 | 1.512954 |
| 27* | −36.7178 | D4(Variable) | | |
| 28 | 100.0646 | 3.3139 | 24.26 | 1.791180 |
| 29 | −60.0000 | 1.5000 | 40.12 | 1.851080 |
| 30* | 35.0435 | D5(Variable) | | |
| 31 | −19.8065 | 1.5000 | 40.79 | 1.877404 |
| 32 | −36.0179 | 0.1000 | | |
| 33 | −118.6453 | 3.6033 | 27.58 | 1.755201 |
| 34 | −51.9780 | BF | | |

[Aspherical Surface Data]

6th Surface $\kappa$ = 2.0000, A4 = −3.54713E−06, A6 = 8.39421E−09
A8 = 5.74900E−12, A10 = −2.30186E−14, A12 = 0.00000E+00

13th Surface $\kappa$ = 1.0000, A4 = −8.88610E−06, A6 = 8.60054E−10
A8 = 9.35296E−11, A10 = −8.32892E−13, A12 = 0.00000E+00

15th Surface $\kappa$ = 1.0000, A4 = −1.25166E−05, A6 = 2.21212E−08
A8 = −2.03902E−10, A10 = 7.07567E−13, A12 = 0.00000E+00

27th Surface $\kappa$ = 1.0000, A4 = 2.74577E−05, A6 = −5.57744E−08
A8 = 3.60461E−10, A10 = −1.20456E−12, A12 = 0.00000E+00

30th Surface $\kappa$ = 1.0000, A4 = −6.49026E−06, A6 = 5.84808E−08
A8 = −3.26107E−10, A10 = 9.49542E−13, A12 = 0.00000E+00

[Lens Group Data]

| Group | First surface | Focal length |
|---|---|---|
| G1 | 1 | 99.48878 |
| G2 | 6 | −15.91549 |
| G3 | 15 | 36.81358 |
| G4 | 22 | 35.33722 |
| G5 | 28 | −59.27007 |
| G6 | 31 | −101.60759 |

[Variable Distance Data]

| | W Infinity | M1 Infinity | M2 Infinity | T Infinity |
|---|---|---|---|---|
| f | 24.70000 | 50.00001 | 105.00002 | 194.00004 |
| D0 | ∞ | ∞ | ∞ | ∞ |
| D1 | 1.50000 | 16.10146 | 35.16750 | 51.29406 |
| D2 | 17.11600 | 9.70503 | 4.20600 | 1.50000 |
| D3 | 7.94167 | 4.05851 | 2.07803 | 1.50000 |
| D4 | 8.59873 | 5.64789 | 5.81781 | 1.50000 |
| D5 | 9.32368 | 17.20284 | 18.29639 | 22.86408 |
| BF | 9.30000 | 21.40756 | 37.52953 | 50.12197 |

| | W Short-distance | M1 Short-distance | M2 Short-distance | T Short-distance |
|---|---|---|---|---|
| β | −0.06152 | −0.11064 | −0.19039 | −0.28955 |
| D0 | 370.9313 | 400.5881 | 451.6162 | 495.9313 |
| D1 | 1.50000 | 16.10146 | 35.16750 | 51.29406 |
| D2 | 17.11600 | 9.70503 | 4.20600 | 1.50000 |
| D3 | 7.94167 | 4.05851 | 2.07803 | 1.50000 |
| D4 | 10.20432 | 7.93636 | 10.79923 | 11.04504 |
| D5 | 7.71809 | 14.91438 | 13.31498 | 13.31904 |
| BF | 9.32674 | 21.49415 | 37.78613 | 50.71489 |

[Conditional expression corresponding value]

Conditional Expression(1) Mv4/Mv3 = 1.158
Conditional Expression(2) Mv2/fw = 1.017
Conditional Expression(3) ft/fw = 7.890
Conditional Expression(4) ωw = 42.272
Conditional Expression(5) ωt = 6.042
Conditional Expression(6) fw/f123w = 0.227
Conditional Expression(7) ft/f123t = −0.171
Conditional Expression(8) BFw/fw = 0.375
Conditional Expression(9) (−f5)/fw = 2.392
Conditional Expression(10) Mv5/Mv6 = 1.332
Conditional Expression(11) Mv1/(ft − fw) = 0.439
Conditional Expression(12) (RAr2 + RAr1)/(RAr2 − RAr1) = 1.872

Figure 20A:
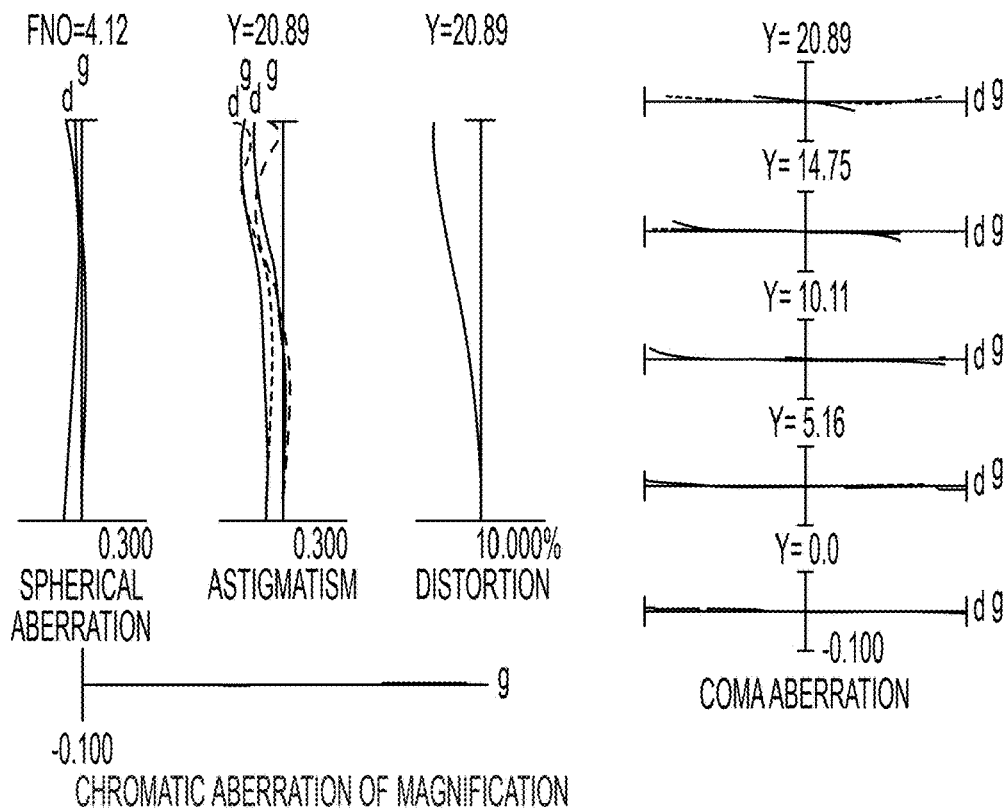
FIGS. 20A and 20B are various aberration graphs of the zoom optical system according to the seventh example upon focusing on infinity in the wide-angle end state and a telephoto end state.
Figure 20B:
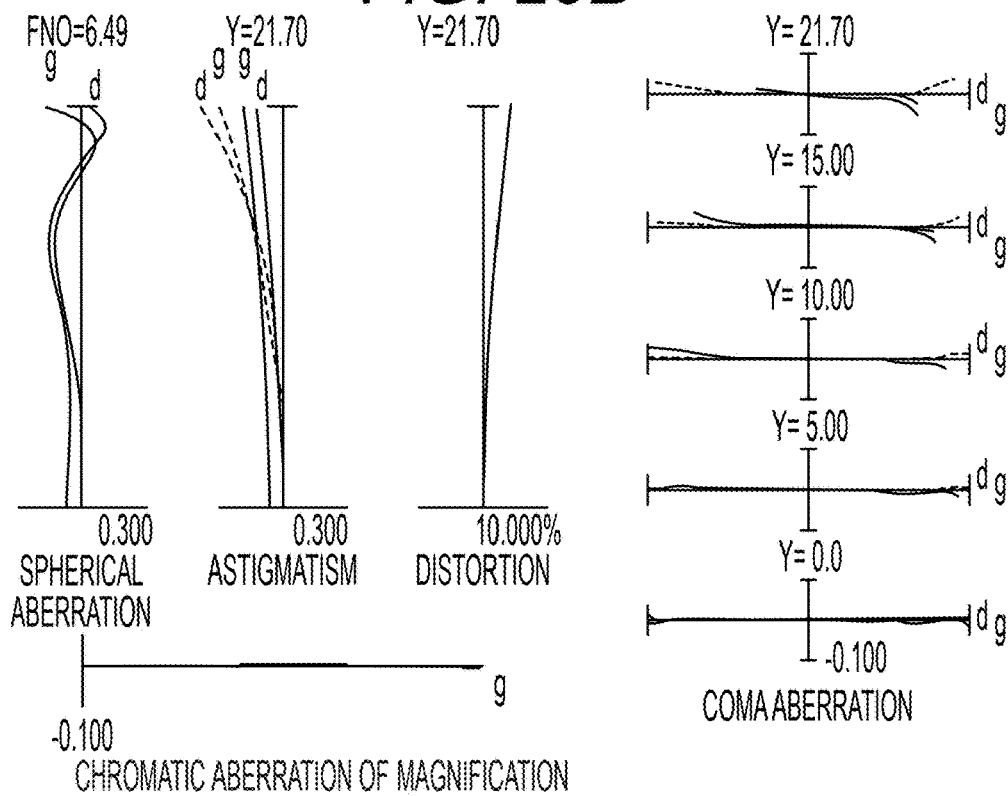
Figure 21A:
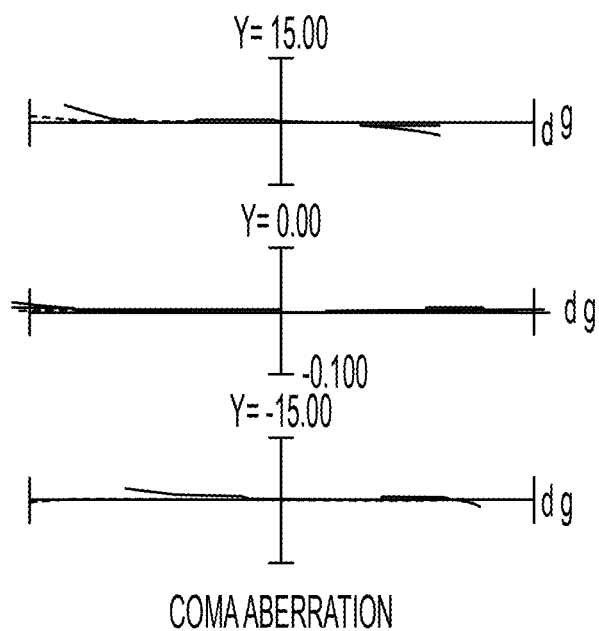
FIGS. 21A and 21B are coma aberration graphs of the zoom optical system according to the seventh example in the wide-angle end state and the telephoto end state when blur correction is performed.
Figure 21B:
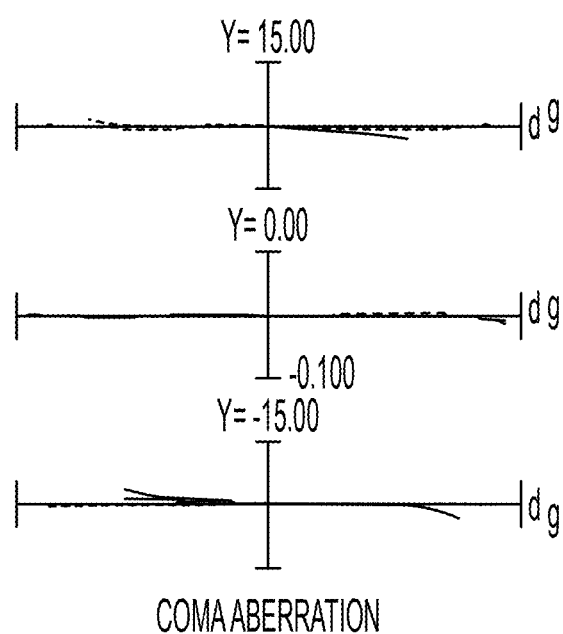

FIGS. 20A and 20B are various aberration graphs of the zoom optical system according to the seventh example upon focusing on infinity in the wide-angle end state and the telephoto end state. FIGS. 21A and 21B are coma aberration graphs of the zoom optical system according to the seventh example in the wide-angle end state and the telephoto end state when blur correction is performed. The various aberration graphs show that the zoom optical system according to the seventh example favorably corrects the various aberrations, and has an excellent imaging performance.

Eighth Example

Figure 22:
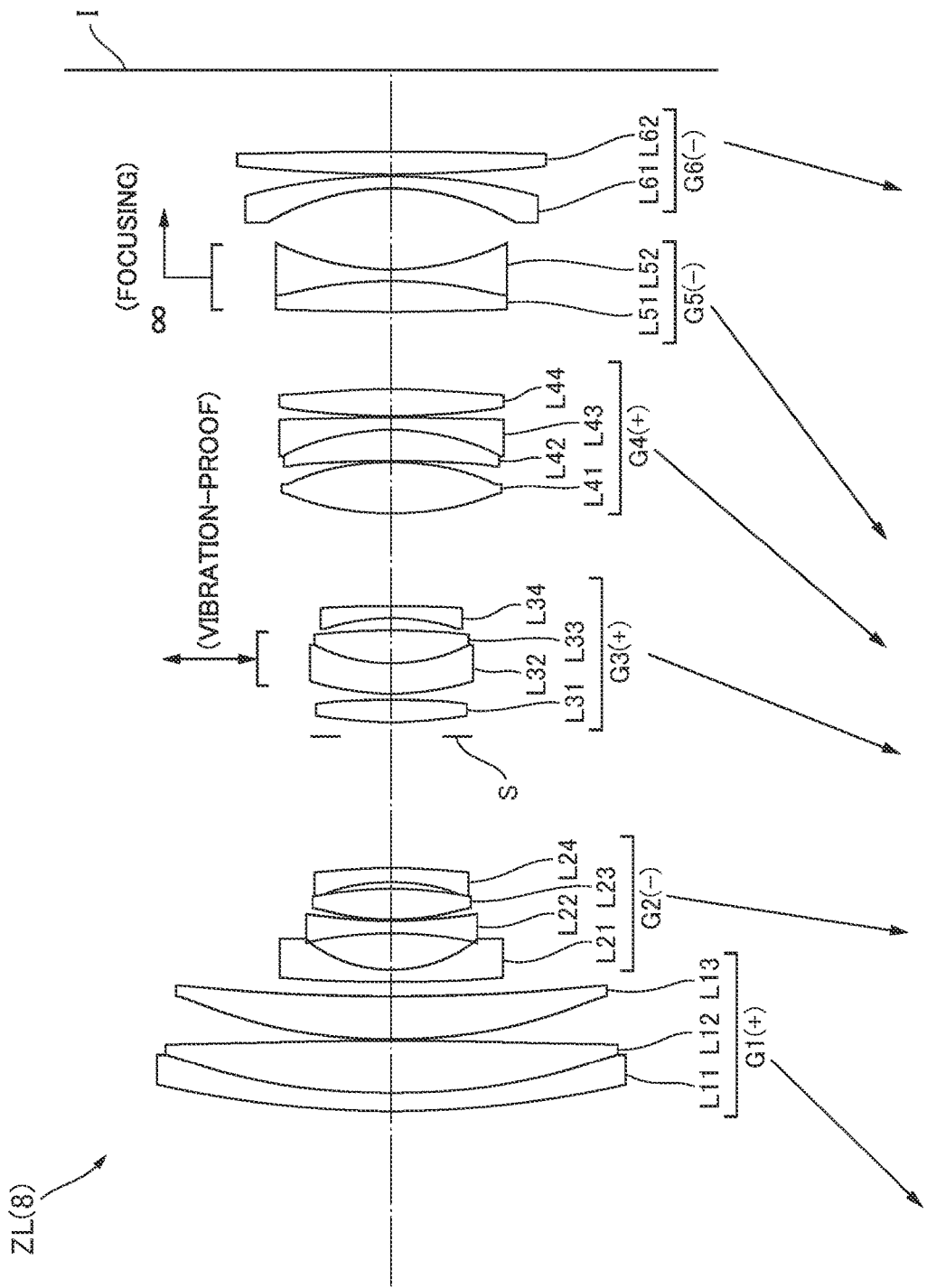
FIG. 22 is a lens configuration diagram of a zoom optical system according to an eighth example upon focusing on infinity in a wide angle end state.

An eighth example is described with reference to FIGS. 22 to 24A and 24B and Table 8. FIG. 22 is a lens configuration diagram of a zoom optical system according to the eighth example upon focusing on infinity in a wide angle end state. The zoom optical system ZL(8) according to the eighth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 22 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The image side surface of the negative meniscus lens L21 is of aspherical shape.

The third lens group G3 consists of, in order from the object: a biconvex positive lens L31; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a biconvex positive lens L41; a cemented lens composed of a positive meniscus lens L42 having a concave surface facing the object and a negative meniscus lens L43 having a concave surface facing the object; and a biconvex positive lens L44. The image side surface of the positive lens L44 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 8 lists values of data on the zoom optical system according to the eighth example.

TABLE 8

[General Data]

Zooming ratio 7.854
f123w = −440.44611
f123t = −323.78995

|  | W | M1 | M2 | T |
|---|---|---|---|---|
| FNO | 4.12083 | 5.77298 | 6.33626 | 6.49162 |
| ω | 42.50455 | 22.44807 | 11.22387 | 6.10280 |
| Y | 20.61 | 21.70 | 21.70 | 21.70 |
| TL | 120.46149 | 143.33661 | 170.26168 | 190.2487 |

[Lens Data]

| Surface Number | R | D | vd | nd |
|---|---|---|---|---|
| 1 | 119.2532 | 2.0000 | 25.26 | 1.902000 |
| 2 | 75.4740 | 6.1889 | 82.57 | 1.497820 |
| 3 | −685.9404 | 0.1000 |  |  |
| 4 | 62.0223 | 5.1009 | 67.90 | 1.593190 |
| 5 | 237.4793 | D1(Variable) |  |  |
| 6* | 153.6662 | 1.5000 | 46.59 | 1.816000 |
| 7 | 15.5464 | 4.2474 |  |  |
| 8 | −40.2333 | 1.5002 | 43.79 | 1.848500 |
| 9 | 79.6309 | 0.1006 |  |  |
| 10 | 32.2669 | 3.5980 | 22.74 | 1.808090 |
| 11 | −38.3529 | 0.7346 |  |  |
| 12 | −22.0127 | 1.5000 | 43.79 | 1.848500 |

TABLE 8-continued

| 13 | −91.6465 | D2(Variable) |  |  |
|---|---|---|---|---|
| 14 | ∞ | 1.5000 |  | (Aperture Stop S) |
| 15 | 44.5290 | 2.6559 | 44.85 | 1.743972 |
| 16 | −81.3774 | 0.7000 |  |  |
| 17 | 33.2106 | 3.4046 | 30.99 | 1.940752 |
| 18 | 19.5338 | 3.9016 | 59.70 | 1.508752 |
| 19 | −65.3422 | 1.3372 |  |  |
| 20 | −26.7545 | 1.5000 | 29.68 | 1.730111 |
| 21 | −101.6153 | D3(Variable) |  |  |
| 22 | 33.1030 | 6.1030 | 70.40 | 1.487502 |
| 23 | −28.7765 | 0.1000 |  |  |
| 24 | −116.0123 | 3.4598 | 68.30 | 1.507497 |
| 25 | −28.0491 | 1.5000 | 32.03 | 1.910214 |
| 26 | −237.5876 | 0.2542 |  |  |
| 27 | 95.5133 | 3.1295 | 59.13 | 1.611115 |
| 28* | −51.7400 | D4(Variable) |  |  |
| 29 | 333.8201 | 3.4464 | 22.74 | 1.808090 |
| 30 | −49.9705 | 1.5000 | 44.82 | 1.743986 |
| 31* | 31.2247 | D5(Variable) |  |  |
| 32 | −27.4502 | 1.5000 | 66.16 | 1.531180 |
| 33 | −59.8926 | 0.1000 |  |  |
| 34 | 164.9552 | 2.6581 | 27.80 | 1.749763 |
| 35 | −519.6427 | BF |  |  |

[Aspherical Surface Data]

6th Surface

κ = 1.0000, A4 = 2.54661E−06, A6 = 1.57681E−08
A8 = −1.62633E−10, A10 = 6.99665E−13, A12 = 0.00000E+00

28th Surface

κ = 1.0000, A4 = 2.83706E−05, A6 = −3.41484E−08
A8 = 2.83345E−10, A10 = −4.50609E−13, A12 = 0.00000E+00

31st Surface

κ = 1.0000, A4 = −4.24770E−06, A6 = 6.21761E−08
A8 = −2.79037E−10, A10 = 4.34156E−13, A12 = 0.00000E+00

[Lens Group Data]

| Group | First surface | Focal length |
|---|---|---|
| G1 | 1 | 99.94559 |
| G2 | 6 | −15.36108 |
| G3 | 15 | 40.04464 |
| G4 | 22 | 30.83594 |
| G5 | 29 | −50.14179 |
| G6 | 32 | −238.46610 |

[Variable Distance Data]

|  | W Infinity | M1 Infinity | M2 Infinity | T Infinity |
|---|---|---|---|---|
| f | 24.69999 | 49.99998 | 104.99995 | 193.99998 |
| D0 | ∞ | ∞ | ∞ | ∞ |
| D1 | 1.50000 | 18.29170 | 34.70486 | 54.28408 |
| D2 | 15.49680 | 10.23739 | 4.55937 | 1.50000 |
| D3 | 10.63532 | 4.97092 | 1.81398 | 1.50000 |
| D4 | 8.89670 | 4.43383 | 5.19646 | 1.51052 |
| D5 | 9.31183 | 19.43911 | 21.83341 | 25.83333 |
| BF | 9.29998 | 20.64280 | 36.83273 | 40.29998 |

|  | W Short-distance | M1 Short-distance | M2 Short-distance | T Short-distance |
|---|---|---|---|---|
| β | −0.06119 | −0.09874 | −0.16976 | −0.27724 |
| D0 | 371.9273 | 449.0522 | 522.1271 | 502.1400 |
| D1 | 1.50000 | 18.29170 | 34.70486 | 54.28408 |
| D2 | 15.49680 | 10.23739 | 4.55937 | 1.50000 |
| D3 | 10.63532 | 4.97092 | 1.81398 | 1.50000 |
| D4 | 10.32916 | 6.26965 | 9.16937 | 12.36360 |
| D5 | 7.87937 | 17.60328 | 17.86051 | 14.98025 |
| BF | 9.32282 | 20.70243 | 37.00914 | 40.76930 |

TABLE 8-continued

[Conditional expression corresponding value]

Conditional Expression(1) Mv4/Mv3 = 1.295
Conditional Expression(2) Mv2/fw = 0.688
Conditional Expression(3) ft/fw = 7.854
Conditional Expression(4) ωw = 42.505
Conditional Expression(5) ωt = 6.103
Conditional Expression(6) fw/f123w = −0.056
Conditional Expression(7) ft/f123t = −0.599
Conditional Expression(8) BFw/fw = 0.377
Conditional Expression(9) (−f5)/fw = 2.030
Conditional Expression(10) Mv5/Mv6 = 1.533
Conditional Expression(11) Mv1/(ft − fw) = 0.412
Conditional Expression(12) (RAr2 + RAr1)/(RAr2 − RAr1) = 0.467

Figure 23A:
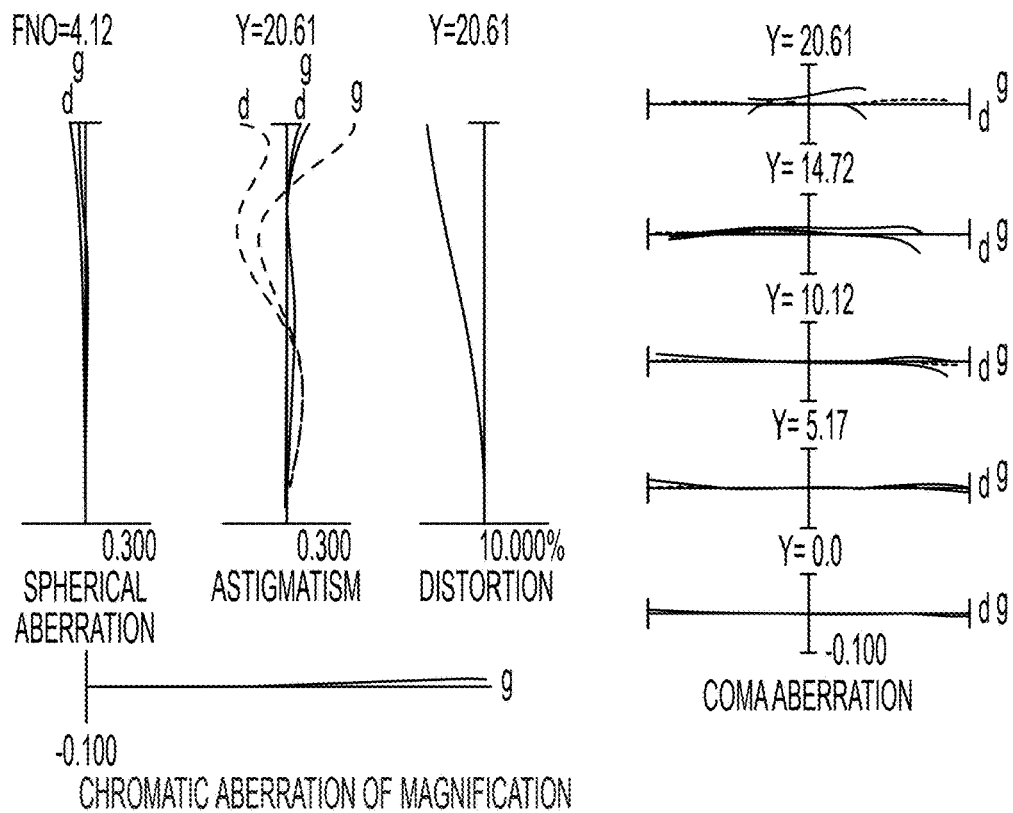
FIGS. 23A and 23B are various aberration graphs of the zoom optical system according to the eighth example upon focusing on infinity in the wide-angle end state and a telephoto end state.
Figure 23B:
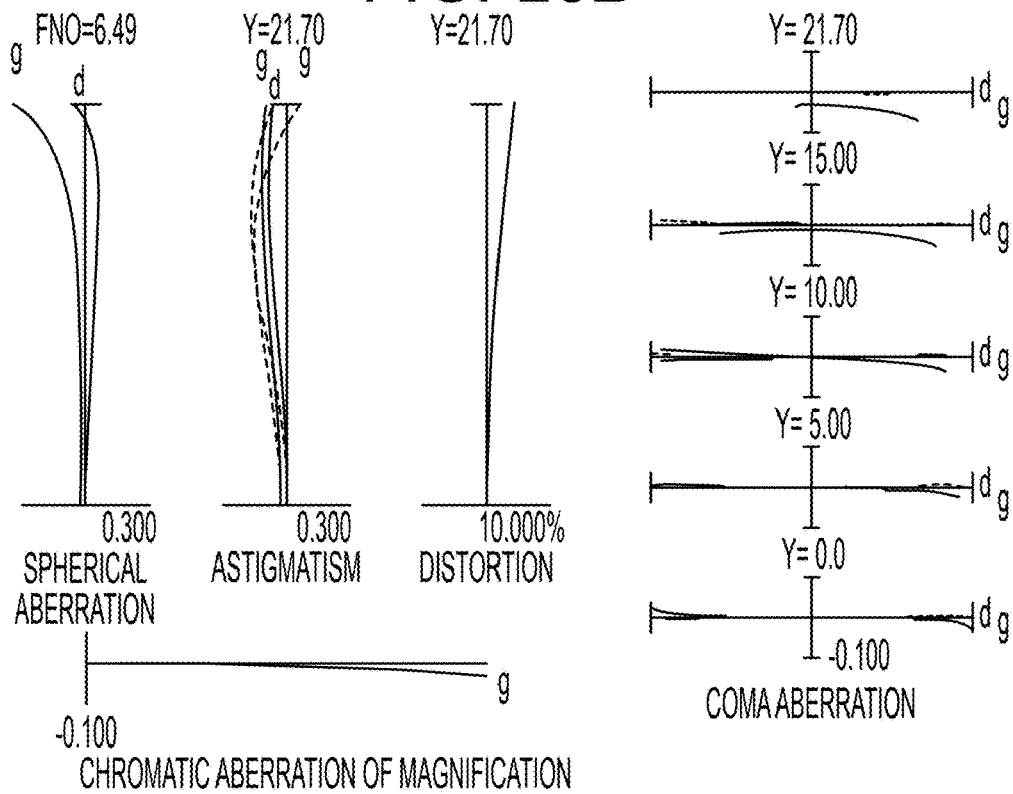
Figure 24A:
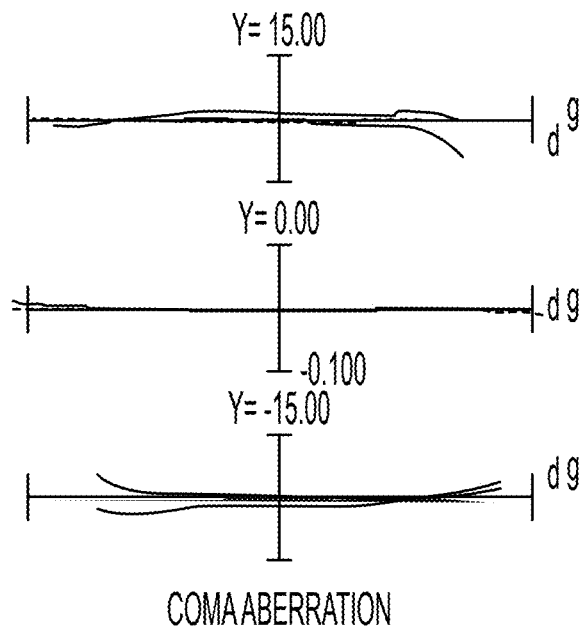
FIGS. 24A and 24B are coma aberration graphs of the zoom optical system according to the eighth example in the wide-angle end state and the telephoto end state when blur correction is performed.
Figure 24B:
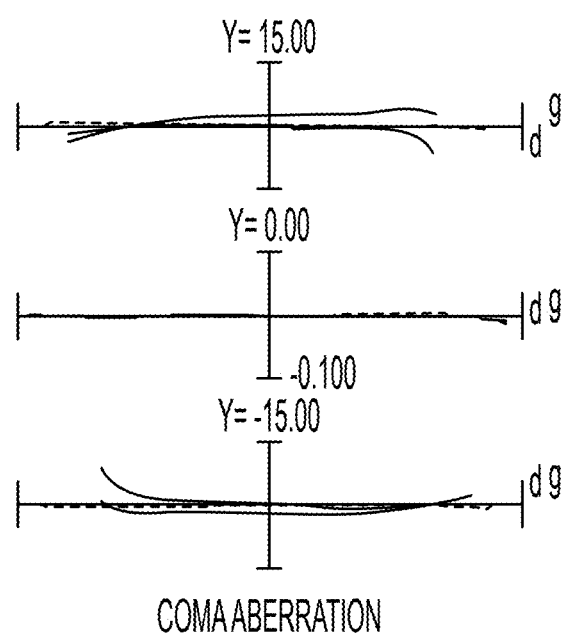

FIGS. 23A and 23B are various aberration graphs of the zoom optical system according to the eighth example upon focusing on infinity in the wide-angle end state and the telephoto end state. FIGS. 24A and 24B are coma aberration graphs of the zoom optical system according to the eighth example in the wide-angle end state and the telephoto end state when blur correction is performed. The various aberration graphs show that the zoom optical system according to the eighth example favorably corrects the various aberrations, and has an excellent imaging performance.

Ninth Example

Figure 25:
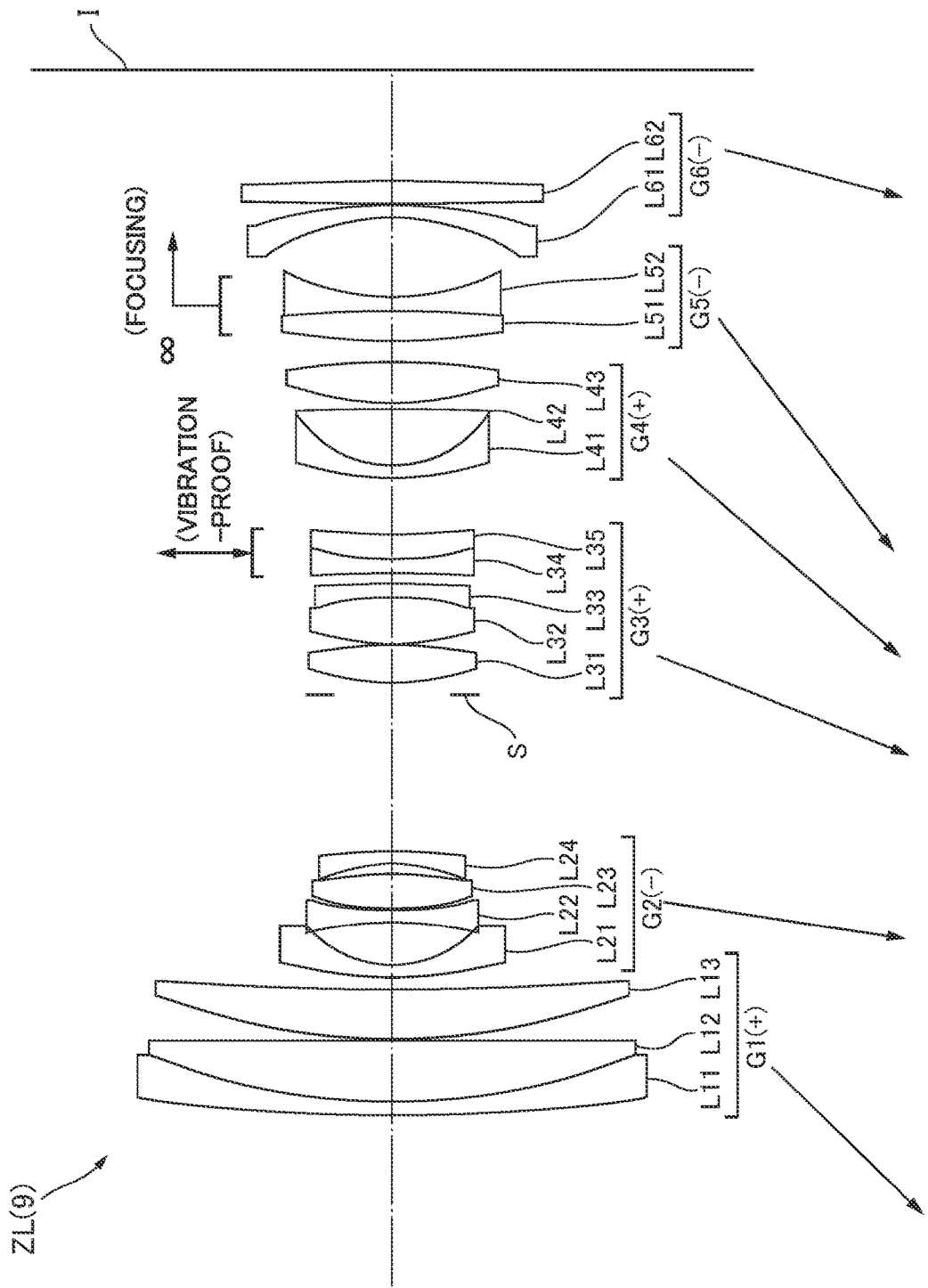
FIG. 25 is a lens configuration diagram of a zoom optical system according to a ninth example upon focusing on infinity in a wide angle end state.

A ninth example is described with reference to FIGS. 25 to 27A and 27B and Table 9. FIG. 25 is a lens configuration diagram of a zoom optical system according to the ninth example upon focusing on infinity in a wide angle end state. The zoom optical system ZL(9) according to the ninth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 25 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a plano-convex positive lens L12 having a plane facing the image surface I; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The image side surface of the negative meniscus lens L21 is of aspherical shape. The image side surface of the negative meniscus lens L24 is of aspherical shape.

The third lens group G3 consists of, in order from the object: a biconvex positive lens L31; a cemented lens composed of a biconvex positive lens L32 and a negative meniscus lens L33 having a concave surface facing the object; and a cemented lens composed of a biconcave negative lens L34 and a positive meniscus lens L35 having a convex surface facing the object. The image side surface of the positive lens L31 is of aspherical shape. The image side surface of the negative lens L34 is of aspherical shape.

The fourth lens group G4 consists of, in order from the object: a cemented lens composed of a negative meniscus lens L41 having a convex surface facing the object and a biconvex positive lens L42; and a biconvex positive lens L43. The image side surface of the positive lens L43 is of aspherical shape.

The fifth lens group G5 consists of a cemented lens composed of a biconvex positive lens L51 and a biconcave negative lens L52.

The sixth lens group G6 consists of, in order from the object: a negative meniscus lens L61 having a concave surface facing the object; and a biconvex positive lens L62. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative lens L34 and the positive meniscus lens L35 in the third lens group G3 constitutes a vibration-proof group that has a negative refractive power and is movable in a direction perpendicular to the optical axis, and corrects the displacement of the imaging position due to camera shake and the like (an image blur on the image surface I).

The following Table 9 lists values of data on the zoom optical system according to the ninth example.

TABLE 9

[General Data]

Zooming ratio 7.854
f123w = 46.29531
f123t = 1060.13724

| | W | M1 | M2 | T |
|---|---|---|---|---|
| FNO | 4.11505 | 5.74532 | 6.36855 | 6.68279 |
| ω | 42.27184 | 21.88249 | 10.96245 | 6.04244 |
| Y | 21.03 | 21.70 | 21.70 | 21.70 |
| TL | 121.00241 | 139.79338 | 169.47903 | 195.5079 |

[Lens Data]

| Surface Number | R | D | vd | nd |
|---|---|---|---|---|
| 1 | 215.1564 | 1.5000 | 23.80 | 1.846660 |
| 2 | 73.5337 | 7.2326 | 67.90 | 1.593190 |
| 3 | ∞ | 0.1000 | | |
| 4 | 75.0074 | 5.6048 | 40.66 | 1.883000 |
| 5 | 344.8006 | D1(Variable) | | |
| 6* | 43.3708 | 1.5000 | 40.66 | 1.883000 |
| 7 | 13.2343 | 4.8088 | | |
| 8 | −47.4291 | 1.5052 | 40.66 | 1.883000 |
| 9 | 43.0037 | 0.1000 | | |
| 10 | 28.6036 | 4.0197 | 20.88 | 1.922860 |
| 11 | −55.9891 | 1.1418 | | |
| 12 | −23.0332 | 1.5000 | 40.66 | 1.883000 |
| 13* | −75.5957 | D2(Variable) | | |
| 14 | ∞ | 1.5000 | | (Aperture Stop S) |
| 15* | 28.4224 | 4.3742 | 52.85 | 1.598604 |
| 16 | −48.8993 | 0.1504 | | |
| 17 | 30.2173 | 5.4129 | 70.40 | 1.487490 |
| 18 | −31.5840 | 1.5000 | 21.23 | 1.903627 |
| 19 | −130.7132 | 1.2693 | | |

TABLE 9-continued

| | | | | |
|---|---|---|---|---|
| 20* | −107.8541 | 1.5000 | 41.09 | 1.854203 |
| 21 | 30.6579 | 3.0466 | 26.18 | 1.822542 |
| 22 | 165.6444 | D3(Variable) | | |
| 23 | 33.3486 | 1.5007 | 40.66 | 1.883000 |
| 24 | 13.1929 | 6.5567 | 65.07 | 1.544771 |
| 25 | −190.2474 | 0.7289 | | |
| 26 | 37.5609 | 4.7319 | 62.98 | 1.574225 |
| 27* | −76.3130 | D4(Variable) | | |
| 28 | 80.1779 | 3.4856 | 27.58 | 1.755201 |
| 29 | −127.8937 | 1.5007 | 45.13 | 1.740338 |
| 30 | 26.5334 | D5(Variable) | | |
| 31 | −26.2026 | 1.5000 | 60.35 | 1.619799 |
| 32 | −54.6221 | 0.1000 | | |
| 33 | 586.6701 | 2.5595 | 28.29 | 1.738351 |
| 34 | −391.8753 | BF | | |

[Aspherical Surface Data]

6th Surface

κ = 1.0000, A4 = −6.29772E−06, A6 = −1.23182E−08
A8 = 7.32161E−11, A10 = −3.10876E−13, A12 = 0.00000E+00

13th Surface

κ = 1.0000, A4 = −8.92953E−06, A6 = −3.71644E−08
A8 = 8.09196E−10, A10 = −5.73691E−12, A12 = 0.00000E+00

15th Surface

κ = 1.0000, A4 = −1.00000E−05, A6 = 2.20240E−08
A8 = −1.02146E−10, A10 = 0.00000E+00, A12 = 0.00000E+00

20th Surface

κ = 1.0000, A4 = 3.32815E−06, A6 = 1.66254E−09
A8 = 0.00000E+00, A10 = 0.00000E+00, A12 = 0.00000E+00

27th Surface

κ = 1.0000, A4 = 1.00000E−05, A6 = −3.83755E−08
A8 = −1.30773E−10, A10 = −1.22891E−12, A12 = 0.00000E+00

[Lens Group Data]

| Group | First surface | Focal length |
|---|---|---|
| G1 | 1 | 102.37710 |
| G2 | 6 | −14.98474 |
| G3 | 15 | 29.62517 |
| G4 | 23 | 38.66055 |
| G5 | 28 | −56.76096 |
| G6 | 31 | −113.46417 |

[Variable Distance Data]

| | W Infinity | M1 Infinity | M2 Infinity | T Infinity |
|---|---|---|---|---|
| f | 24.70007 | 50.00020 | 105.00052 | 194.00105 |
| D0 | ∞ | ∞ | ∞ | ∞ |
| D1 | 1.50000 | 18.30775 | 37.76411 | 54.05443 |
| D2 | 18.03389 | 8.85777 | 3.84960 | 1.50000 |
| D3 | 6.37316 | 1.62225 | 1.50000 | 1.64117 |
| D4 | 2.43986 | 3.20131 | 6.09526 | 1.50000 |
| D5 | 9.22531 | 23.30380 | 13.81143 | 17.88006 |
| BF | 13.00010 | 14.07041 | 36.02852 | 48.50219 |

| | W Short-distance | M1 Short-distance | M2 Short-distance | T Short-distance |
|---|---|---|---|---|
| β | −0.08175 | −0.12239 | −0.19581 | −0.27905 |
| D0 | 272.2777 | 353.4868 | 423.8013 | 497.7725 |
| D1 | 1.50000 | 18.30775 | 37.76411 | 54.05443 |
| D2 | 18.03389 | 8.85777 | 3.84960 | 1.50000 |
| D3 | 6.37316 | 1.62225 | 1.50000 | 1.64117 |
| D4 | 4.23169 | 6.02328 | 12.47110 | 12.78692 |
| D5 | 7.43347 | 20.48182 | 7.43559 | 6.59314 |
| BF | 13.03743 | 14.15445 | 36.24396 | 48.93981 |

TABLE 9-continued

[Conditional expression corresponding value]

Conditional Expression(1) Mv4/Mv3 = 1.123
Conditional Expression(2) Mv2/fw = 0.889
Conditional Expression(3) ft/fw = 7.887
Conditional Expression(4) ωw = 42.272
Conditional Expression(5) ωt = 6.042
Conditional Expression(6) fw/f123w = 0.534
Conditional Expression(7) ft/f123t = 0.179
Conditional Expression(8) BFw/fw = 0.526
Conditional Expression(9) (−f5)/fw = 2.298
Conditional Expression(10) Mv5/Mv6 = 1.244
Conditional Expression(11) Mv1/(ft − fw) = 0.438
Conditional Expression(12) (RAr2 + RAr1)/(RAr2 − RAr1) = 0.830

Figure 26A:
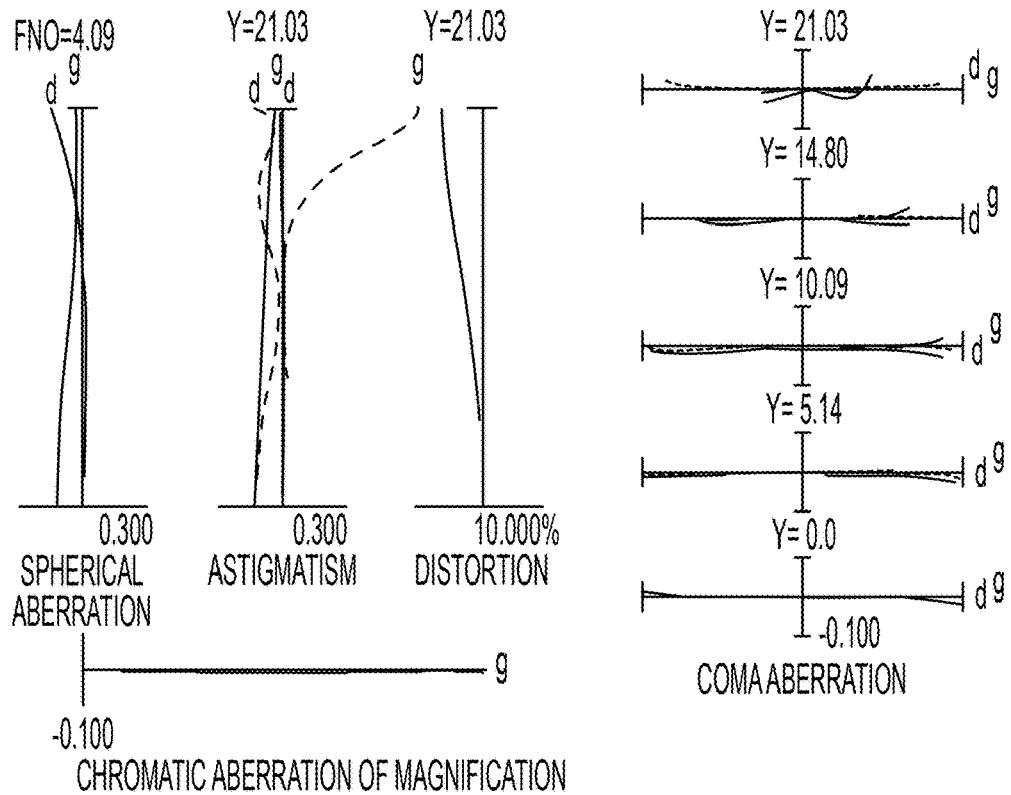
FIGS. 26A and 26B are various aberration graphs of the zoom optical system according to the ninth example upon focusing on infinity in the wide-angle end state and a telephoto end state.
Figure 26B:
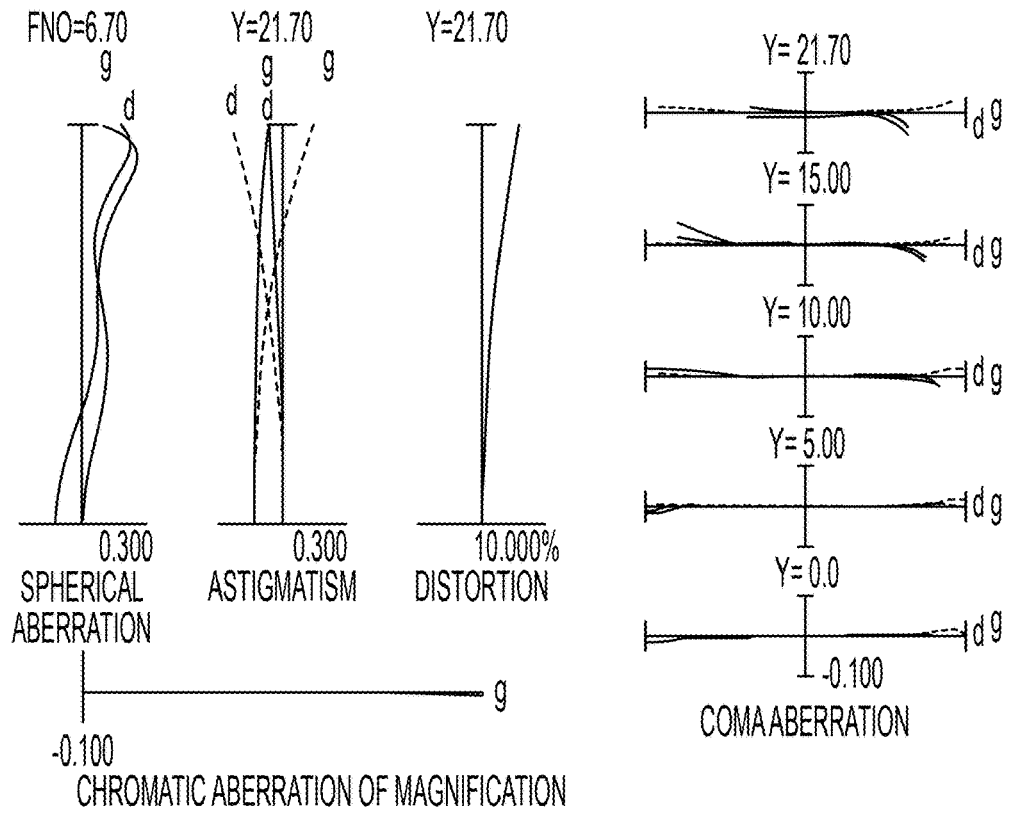
Figure 27A:
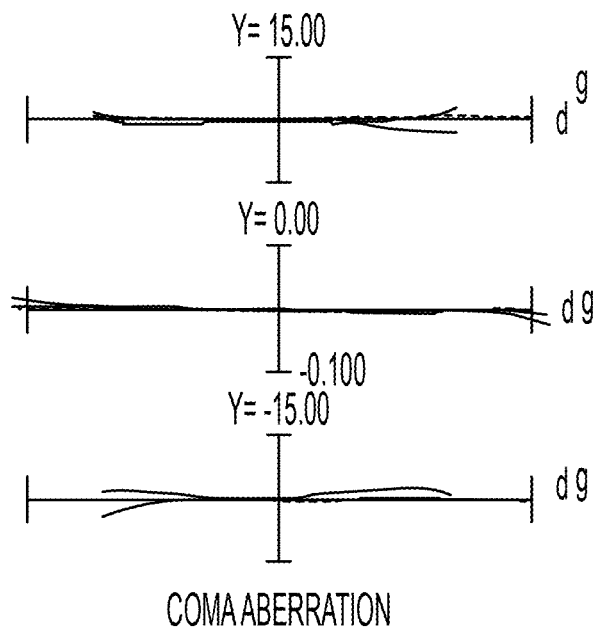
FIGS. 27A and 27B are coma aberration graphs of the zoom optical system according to the ninth example in the wide-angle end state and the telephoto end state when blur correction is performed.
Figure 27B:
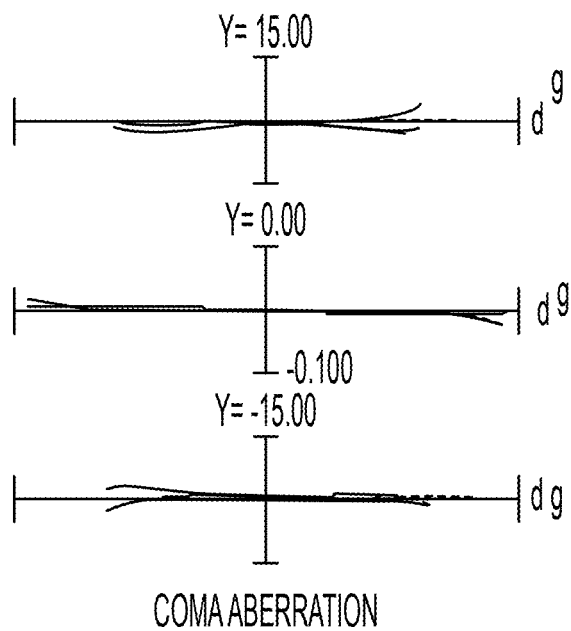

FIGS. 26A and 26B are various aberration graphs of the zoom optical system according to the ninth example upon focusing on infinity in the wide-angle end state and the telephoto end state. FIGS. 27A and 27B are coma aberration graphs of the zoom optical system according to the ninth example in the wide-angle end state and the telephoto end state when blur correction is performed. The various aberration graphs show that the zoom optical system according to the ninth example favorably corrects the various aberrations, and has an excellent imaging performance.

Tenth Example

Figure 28:
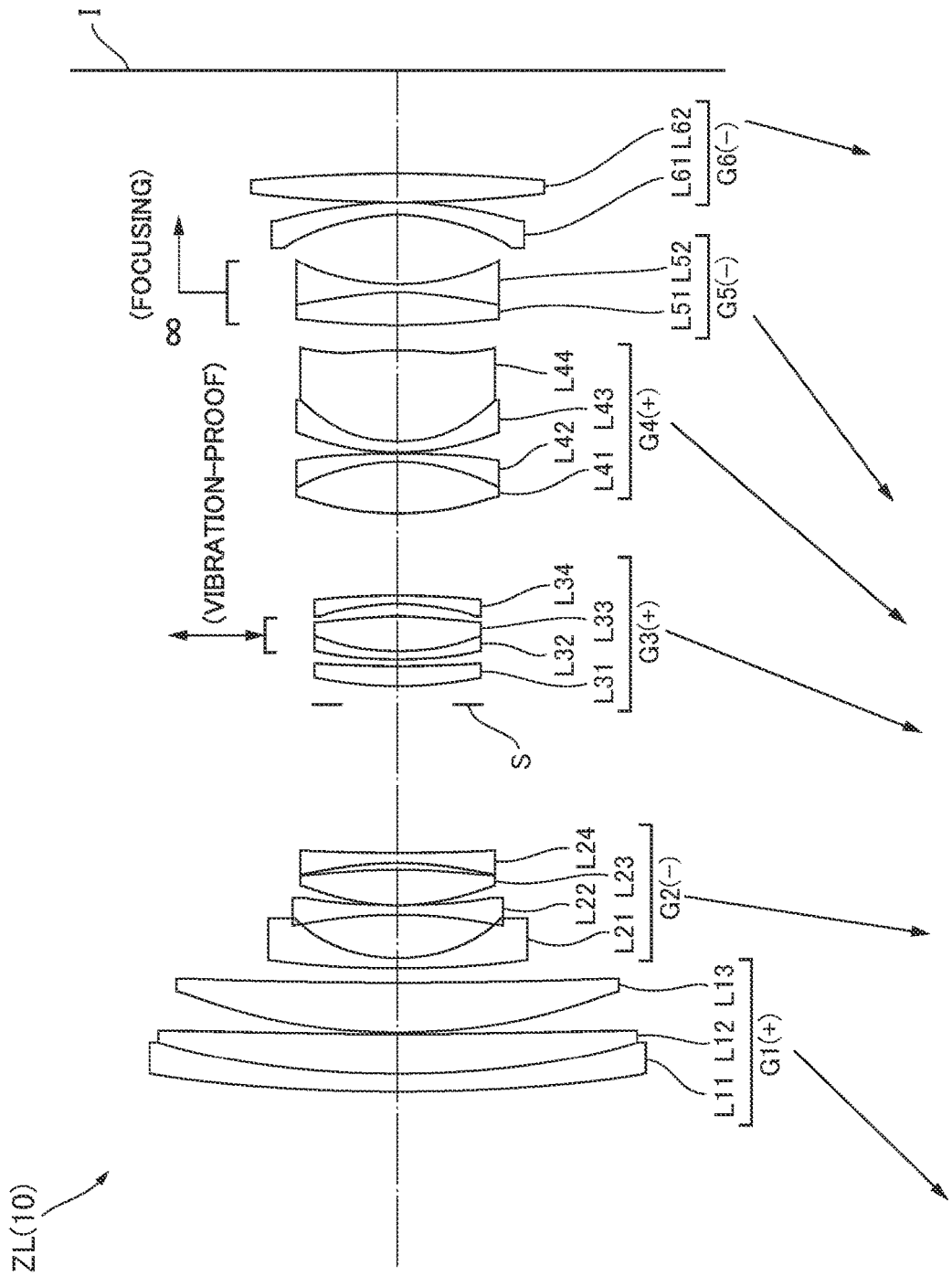
FIG. 28 is a lens configuration diagram of a zoom optical system according to a tenth example upon focusing on infinity in a wide angle end state.

A tenth example is described with reference to FIGS. 28 to 30A and 30B and Table 10. FIG. 28 is a lens configuration diagram of a zoom optical system according to the tenth example upon focusing on infinity in a wide angle end state. The zoom optical system ZL(10) according to the tenth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 28 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a biconcave negative lens L24.

The third lens group G3 consists of, in order from the object: a positive meniscus lens L31 having a convex surface facing the object; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a cemented lens composed of a biconvex positive lens L41 and a negative meniscus lens L42 having a concave surface facing the object; and a cemented lens composed of a negative meniscus lens L43 having a convex surface facing the object and a biconvex positive lens L44. The image side surface of the positive lens L44 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 10 lists values of data on the zoom optical system according to the tenth example.

TABLE 10

[General Data]

Zooming ratio 4.692
f123w = −96.28619
f123t = −88.05735

|  | W | M1 | M2 | T |
|---|---|---|---|---|
| FNO | 3.66063 | 4.51062 | 5.00831 | 5.83006 |
| ω | 42.43419 | 22.44766 | 13.66195 | 10.17394 |
| Y | 20.54 | 21.70 | 21.70 | 21.70 |
| TL | 116.50601 | 138.64669 | 160.34507 | 171.5048 |

[Lens Data]

| Surface Number | R | D | vd | nd |
|---|---|---|---|---|
| 1 | 200.0000 | 2.0000 | 23.80 | 1.846660 |
| 2 | 108.2337 | 4.6568 | 70.32 | 1.487490 |
| 3 | 1133.5711 | 0.1000 |  |  |
| 4 | 68.7807 | 5.7029 | 70.32 | 1.487490 |
| 5 | 816.5190 | D1(Variable) |  |  |
| 6 | 102.0974 | 1.2000 | 46.59 | 1.816000 |
| 7 | 17.6075 | 4.9760 |  |  |
| 8 | −59.3363 | 1.1000 | 51.28 | 1.659368 |
| 9 | 81.2225 | 0.1000 |  |  |
| 10 | 29.1388 | 3.9898 | 23.80 | 1.846660 |
| 11 | −107.8110 | 0.8213 |  |  |
| 12 | −38.4600 | 1.0000 | 46.59 | 1.816000 |
| 13 | 157.0586 | D2(Variable) |  |  |
| 14 | ∞ | 2.0000 |  | (Aperture Stop S) |
| 15 | 41.9442 | 2.5619 | 35.72 | 1.902650 |
| 16 | 552.5411 | 0.5000 |  |  |
| 17 | 41.0223 | 0.9000 | 29.12 | 2.001000 |
| 18 | 23.0700 | 4.0200 | 53.74 | 1.579570 |
| 19 | −69.7834 | 1.5452 |  |  |
| 20 | −27.7457 | 1.0000 | 32.33 | 1.953750 |
| 21 | −68.0384 | D3(Variable) |  |  |
| 22 | 33.5256 | 5.9460 | 46.59 | 1.816000 |
| 23 | −23.9703 | 1.0000 | 32.35 | 1.850260 |
| 24 | −83.2531 | 0.1000 |  |  |
| 25 | 30.5301 | 1.1000 | 32.35 | 1.850260 |
| 26 | 14.8810 | 10.3852 | 70.32 | 1.487490 |
| 27* | −119.0936 | D4(Variable) |  |  |
| 28 | 81.3890 | 3.7144 | 23.80 | 1.846660 |
| 29 | −48.0181 | 1.0000 | 42.73 | 1.834810 |
| 30* | 23.7254 | D5(Variable) |  |  |
| 31 | −24.5058 | 1.4000 | 46.59 | 1.816000 |
| 32 | −48.4638 | 0.1000 |  |  |
| 33 | 142.4943 | 3.2707 | 37.57 | 1.683760 |
| 34 | −160.0000 | BF |  |  |

[Aspherical Surface Data]

27th Surface

κ = 1.0000, A4 = 4.39579E−05, A6 = −4.15837E−09
A8 = 6.65149E−10, A10 = 0.00000E+00, A12 = 0.00000E+00

30th Surface

κ = 1.0000, A4 = −2.71688E−06, A6 = 1.79186E−08
A8 = −3.84607E−10, A10 = 0.00000E+00, A12 = 0.00000E+00

[Lens Group Data]

| Group | First surface | Focal length |
|---|---|---|
| G1 | 1 | 143.63567 |
| G2 | 6 | −20.08403 |
| G3 | 15 | 60.03586 |
| G4 | 22 | 25.77538 |
| G5 | 28 | −42.36974 |
| G6 | 31 | −151.12346 |

[Variable Distance Data]

|  | W Infinity | M1 Infinity | M2 Infinity | T Infinity |
|---|---|---|---|---|
| f | 24.72617 | 50.01050 | 85.01086 | 116.00340 |
| D0 | ∞ | ∞ | ∞ | ∞ |
| D1 | 1.50000 | 23.91054 | 40.85381 | 47.19819 |
| D2 | 17.00636 | 9.20443 | 4.57783 | 1.50000 |
| D3 | 9.28353 | 3.49337 | 1.15783 | 0.30000 |
| D4 | 2.84012 | 1.14718 | 1.49326 | 3.00287 |
| D5 | 7.97989 | 15.46299 | 17.45245 | 16.80067 |
| BF | 11.70601 | 19.23807 | 28.61979 | 36.51305 |

|  | W Short-distance | M1 Short-distance | M2 Short-distance | T Short-distance |
|---|---|---|---|---|
| β | −0.06049 | −0.09676 | −0.16160 | −0.22064 |
| D0 | 377.2840 | 455.1463 | 433.4475 | 422.2840 |
| D1 | 1.50000 | 23.91054 | 40.85381 | 47.19819 |
| D2 | 17.00636 | 9.20443 | 4.57783 | 1.50000 |
| D3 | 9.28353 | 3.49337 | 1.15783 | 0.30000 |
| D4 | 3.90798 | 2.82710 | 4.74497 | 7.99347 |
| D5 | 6.91203 | 13.78307 | 14.20074 | 11.81007 |
| BF | 11.72550 | 19.28822 | 28.75888 | 36.77070 |

[Conditional expression corresponding value]

Conditional Expression(1) Mv4/Mv3 = 1.362
Conditional Expression(2) Mv2/fw = 0.376
Conditional Expression(3) ft/fw = 4.692
Conditional Expression(4) ωw = 42.434
Conditional Expression(5) ωt = 10.174
Conditional Expression(6) fw/f123w = −0.257
Conditional Expression(7) ft/f123t = −1.323
Conditional Expression(8) BFw/fw = 0.473
Conditional Expression(9) (−f5)/fw = 1.714
Conditional Expression(10) Mv5/Mv6 = 1.356
Conditional Expression(11) Mv1/(ft − fw) = 0.603
Conditional Expression(12) (RAr2 + RAr1)/(RAr2 − RAr1) = 0.492

Figure 29A:
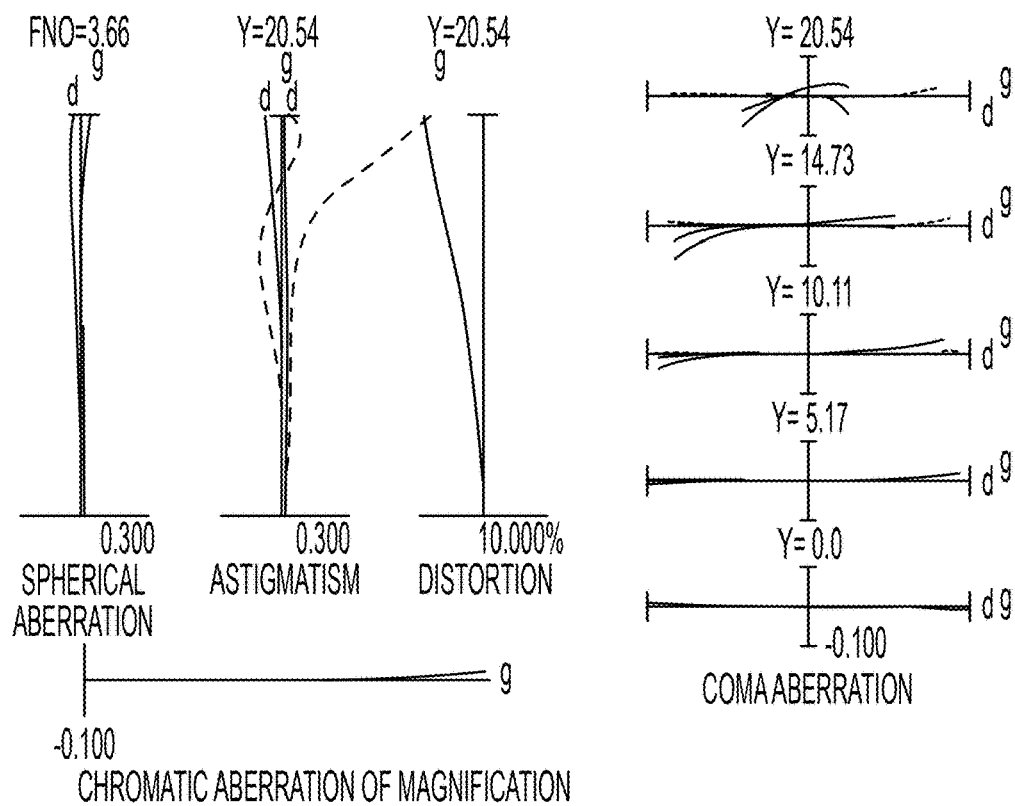
FIGS. 29A and 29B are various aberration graphs of the zoom optical system according to the tenth example upon focusing on infinity in the wide-angle end state and a telephoto end state.
Figure 29B:
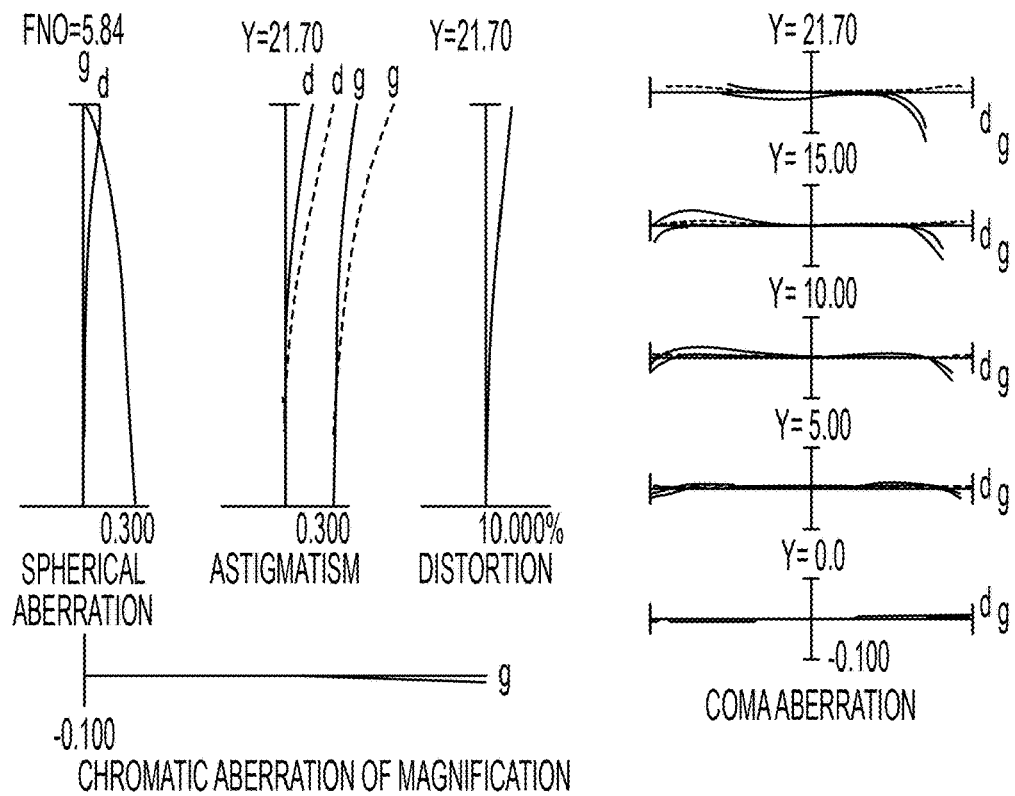
Figure 30A:
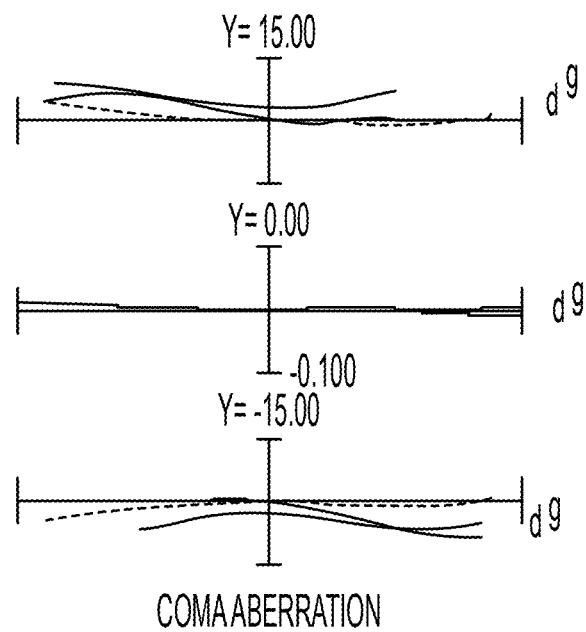
FIGS. 30A and 30B are coma aberration graphs of the zoom optical system according to the tenth example in the wide-angle end state and the telephoto end state when blur correction is performed.
Figure 30B:
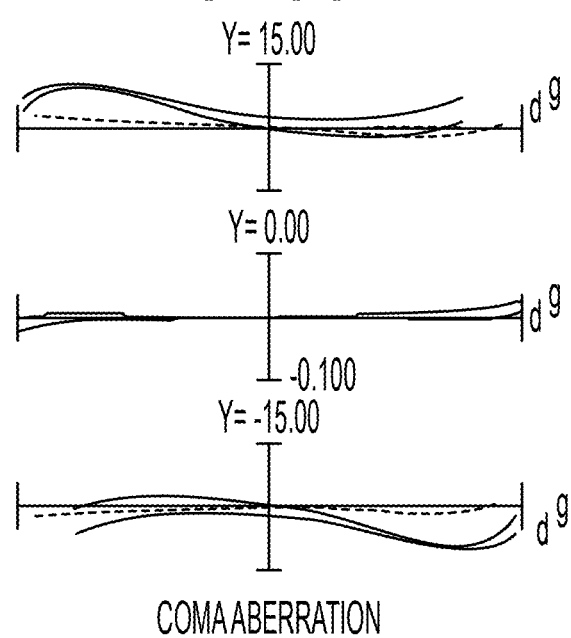

FIGS. 29A and 29B are various aberration graphs of the zoom optical system according to the tenth example upon focusing on infinity in the wide-angle end state and the telephoto end state. FIGS. 30A and 30B are coma aberration graphs of the zoom optical system according to the tenth example in the wide-angle end state and the telephoto end state when blur correction is performed. The various aberration graphs show that the zoom optical system according to the tenth example favorably corrects the various aberrations, and has an excellent imaging performance.

Eleventh Example

Figure 31:
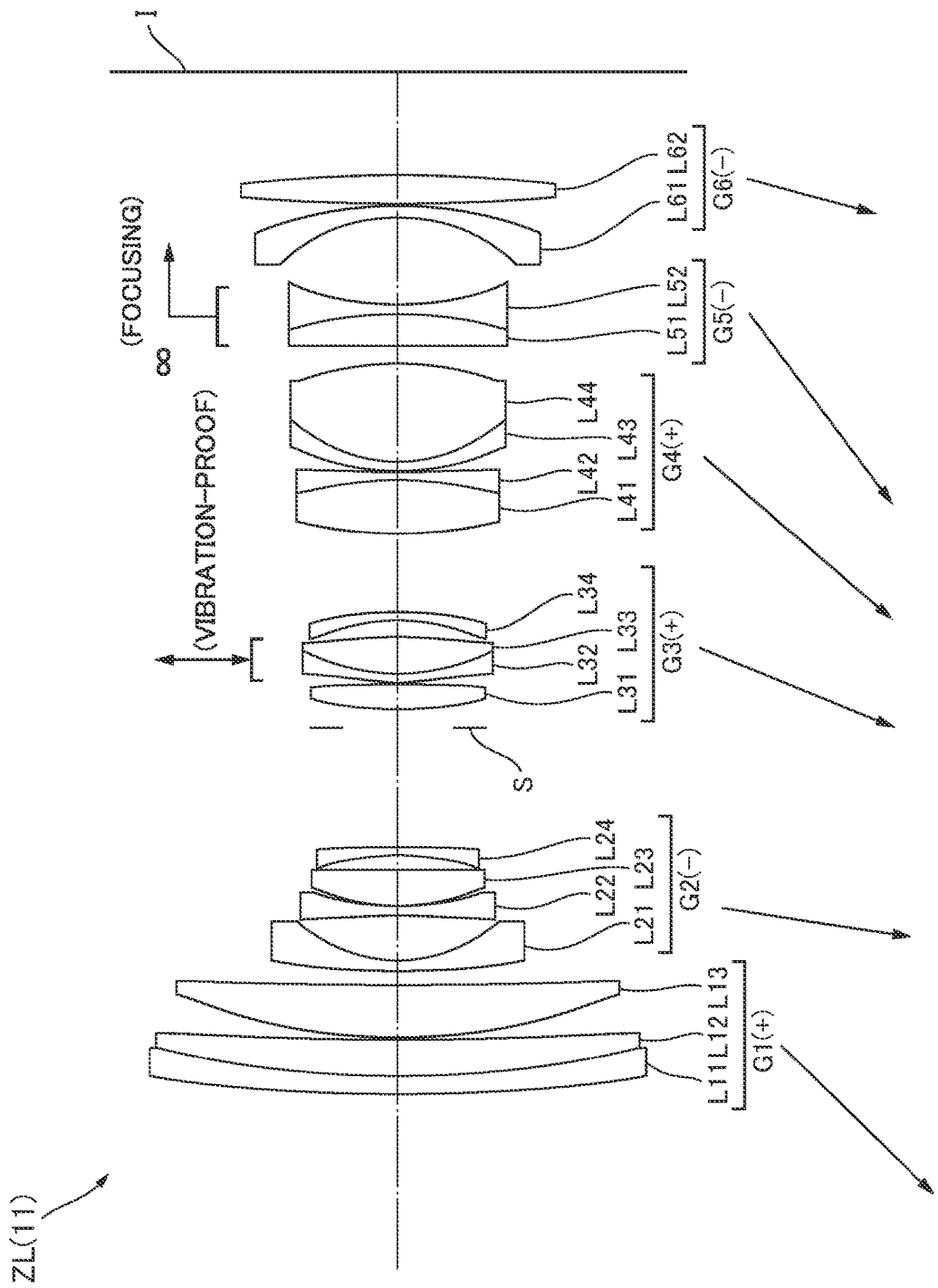
FIG. 31 is a lens configuration diagram of a zoom optical system according to an eleventh example upon focusing on infinity in a wide angle end state.

An eleventh example is described with reference to FIGS. 31 to 33A and 33B and Table 11. FIG. 31 is a lens configuration diagram of a zoom optical system according to the eleventh example upon focusing on infinity in a wide angle end state. The zoom optical system ZL(11) according to the eleventh example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a negative refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 31 along the optical axis, and the distances between the adjacent lens groups change. Note that upon zooming, the aperture stop S, the third lens group G3 and the sixth lens group G6 integrally move.

The first lens group G1 consists of, in order from the object: a cemented lens composed of a negative meniscus lens L11 having a convex surface facing the object and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object.

The third lens group G3 consists of, in order from the object: a biconvex positive lens L31; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a cemented lens composed of a biconvex positive lens L41 and a biconcave negative lens L42; and a cemented lens composed of a negative meniscus lens L43 having a convex surface facing the object and a biconvex positive lens L44. The image side surface of the positive lens L44 is of aspherical shape.

The fifth lens group G5 consists of a cemented lens composed of a positive meniscus lens L51 having a concave surface facing the object and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62. The image surface I is disposed on the image side of the sixth lens group G6.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 11 lists values of data on the zoom optical system according to the eleventh example.

TABLE 11

[General Data]

Zooming ratio 3.438
f123w = 2466.12612
f123t = −146.93338

| | W | M1 | M2 | T |
|---|---|---|---|---|
| FNO | 3.65039 | 4.00020 | — | 4.50024 |
| ω | 43.52469 | −22.45389 | — | 13.66502 |
| Y | 21.27 | 21.70 | — | 21.70 |
| TL | 116.50677 | 138.27327 | — | 161.50351 |

[Lens Data]

| Surface Number | R | D | vd | nd |
|---|---|---|---|---|
| 1 | 200.0000 | 2.0000 | 23.80 | 1.846660 |
| 2 | 112.4996 | 4.3442 | 70.32 | 1.487490 |
| 3 | 642.3642 | 0.1000 | | |
| 4 | 64.3082 | 6.0839 | 70.32 | 1.487490 |
| 5 | 1033.4518 | D1(Variable) | | |
| 6 | 91.5822 | 1.2000 | 46.59 | 1.816000 |
| 7 | 16.7434 | 5.0969 | | |
| 8 | −135.4549 | 1.1000 | 50.66 | 1.670176 |
| 9 | 31.8729 | 0.1000 | | |
| 10 | 24.8799 | 4.1715 | 23.80 | 1.846660 |
| 11 | −336.6794 | 1.4309 | | |
| 12 | −32.2164 | 1.0000 | 46.59 | 1.816000 |
| 13 | −277.8484 | D2(Variable) | | |
| 14 | ∞ | 2.0000 | | (Aperture Stop S) |
| 15 | 41.4933 | 2.7587 | 43.79 | 1.848500 |
| 16 | −1372.9949 | 0.5000 | | |
| 17 | 55.1173 | 0.9000 | 34.87 | 1.847939 |
| 18 | 24.3945 | 4.0805 | 56.69 | 1.586546 |
| 19 | −76.2325 | 1.8582 | | |
| 20 | −25.5665 | 1.0000 | 34.04 | 1.847872 |
| 21 | −37.7016 | D3(Variable) | | |
| 22 | 46.4011 | 6.1027 | 46.59 | 1.816000 |
| 23 | −43.4919 | 1.0000 | 26.59 | 1.847083 |
| 24 | 397.5382 | 0.1000 | | |
| 25 | 28.7499 | 1.1000 | 32.35 | 1.850260 |
| 26 | 18.0000 | 11.1086 | 70.32 | 1.487490 |
| 27* | −25.6478 | D4(Variable) | | |
| 28 | −713.8966 | 3.6653 | 23.80 | 1.846660 |
| 29 | −42.0000 | 1.0000 | 45.28 | 1.796882 |
| 30* | 31.7158 | D5(Variable) | | |
| 31 | −19.7135 | 1.4000 | 62.26 | 1.536206 |
| 32 | −42.7591 | 0.1000 | | |
| 33 | 217.1940 | 3.3164 | 37.57 | 1.683760 |
| 34 | −160.0000 | BF | | |

[Aspherical Surface Data]

27th Surface

κ = 1.0000, A4 = 6.15332E−05, A6 = −2.11407E−07
A8 = 7.47121E−10, A10 = −1.12141E−12, A12 = 0.00000E+00

TABLE 11-continued

30th Surface

κ = 1.0000, A4 = −1.68999E−05, A6 = 1.65258E−07
A8 = −4.68439E−10, A10 = 7.74341E−13, A12 = 0.00000E+00

[Lens Group Data]

| Group | First surface | Focal length |
|---|---|---|
| G1 | 1 | 135.65910 |
| G2 | 6 | −17.91192 |
| G3 | 15 | 42.22744 |
| G4 | 22 | 26.33888 |
| G5 | 28 | −39.70963 |
| G6 | 31 | −150.62287 |

[Variable Distance Data]

| | W Infinity | M1 Infinity | M2 Infinity | T Infinity |
|---|---|---|---|---|
| f | 24.72587 | 50.00755 | — | 85.00361 |
| D0 | ∞ | ∞ | — | ∞ |
| D1 | 1.50000 | 24.03902 | — | 40.38368 |
| D2 | 13.72037 | 5.30562 | — | 1.50000 |
| D3 | 8.95150 | 2.76337 | — | 0.30000 |
| D4 | 1.97894 | 1.51459 | — | 1.15589 |
| D5 | 10.03133 | 16.68380 | — | 19.50588 |
| BF | 11.70677 | 19.34900 | — | 30.04020 |

| | W Short-distance | M1 Short-distance | M2 Short-distance | T Short-distance |
|---|---|---|---|---|
| β | −0.06066 | −0.11959 | — | −0.19908 |
| D0 | 377.2840 | 355.5169 | — | 332.2840 |
| D1 | 1.50000 | 24.03902 | — | 40.38368 |
| D2 | 13.72037 | 5.30562 | — | 1.50000 |
| D3 | 8.95150 | 2.76337 | — | 0.30000 |
| D4 | 2.78309 | 3.22774 | — | 4.28073 |
| D5 | 9.22718 | 14.97065 | — | 16.38104 |
| BF | 11.72684 | 19.42705 | — | 30.25539 |

[Conditional expression corresponding value]

Conditional Expression(1) Mv4/Mv3 = 1.472
Conditional Expression(2) Mv2/fw = 0.247
Conditional Expression(3) ft/fw = 3.438
Conditional Expression(4) ωw = 43.525
Conditional Expression(5) ωt = 13.665
Conditional Expression(6) fw/f123w = 0.010
Conditional Expression(7) ft/f123t = −0.579
Conditional Expression(8) BFw/fw = 0.473
Conditional Expression(9) (−f5)/fw = 1.616
Conditional Expression(10) Mv5/Mv6 = 1.517
Conditional Expression(11) Mv1/(ft − fw) = 0.746
Conditional Expression(12) (RAr2 + RAr1)/(RAr2 − RAr1) = 0.671

Figure 32A:
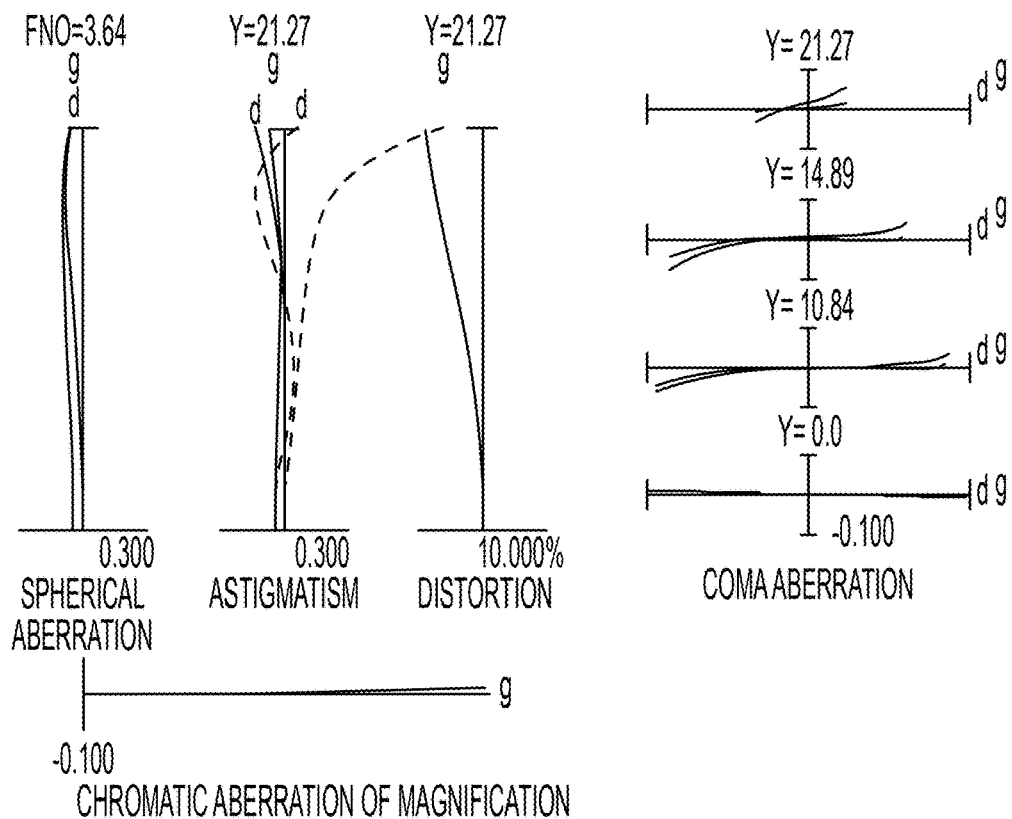
FIGS. 32A and 32B are various aberration graphs of the zoom optical system according to the eleventh example upon focusing on infinity in the wide-angle end state and a telephoto end state.
Figure 32B:
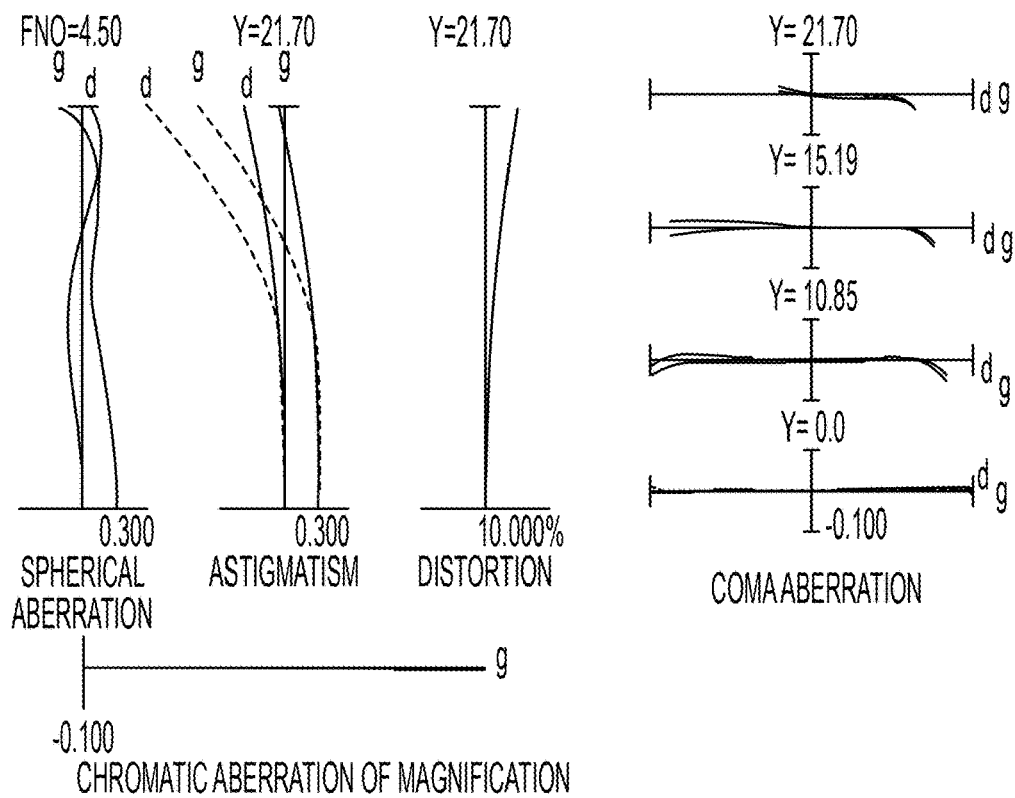
Figure 33A:
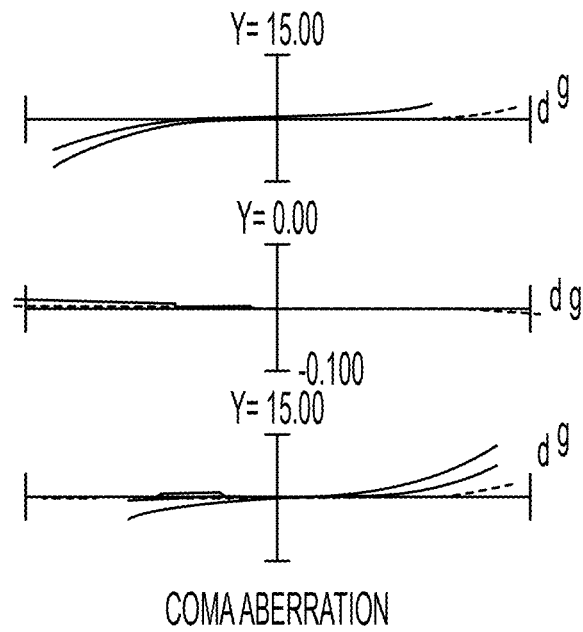
FIGS. 33A and 33B are coma aberration graphs of the zoom optical system according to the eleventh example in the wide-angle end state and the telephoto end state when blur correction is performed.
Figure 33B:
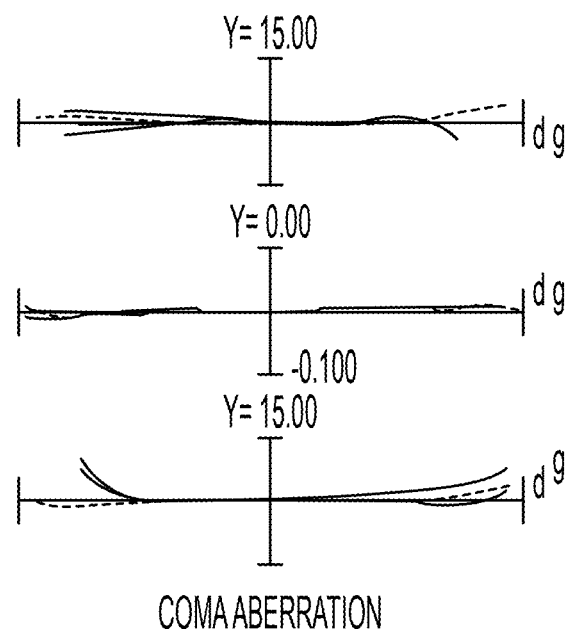

FIGS. 32A and 32B are various aberration graphs of the zoom optical system according to the eleventh example upon focusing on infinity in the wide-angle end state and the telephoto end state. FIGS. 33A and 33B are coma aberration graphs of the zoom optical system according to the eleventh example in the wide-angle end state and the telephoto end state when blur correction is performed. The various aberration graphs show that the zoom optical system according to the eleventh example favorably corrects the various aberrations, and has an excellent imaging performance.

Twelfth Example

Figure 34:
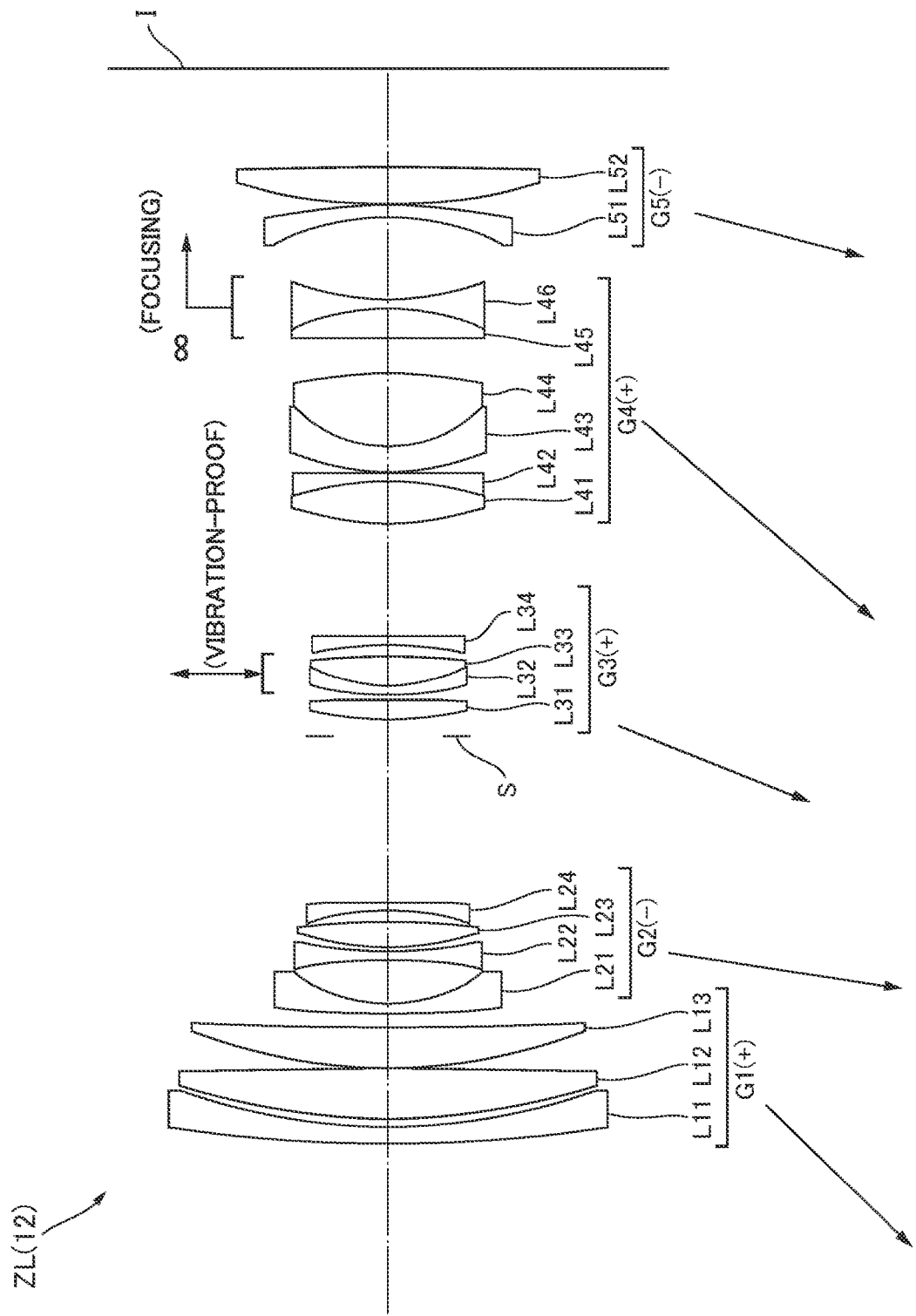
FIG. 34 is a lens configuration diagram of a zoom optical system according to a twelfth example upon focusing on infinity in a wide angle end state.

A twelfth example is described with reference to FIGS. 34 to 36A and 36B and Table 12. FIG. 34 is a lens configuration diagram of a zoom optical system according to the twelfth example upon focusing on infinity in a wide angle end state. The zoom optical system ZL(12) according to the twelfth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; and a fifth lens group G5 having a negative refractive power. Upon zooming from the wide angle end state to the telephoto end state, the first lens group G1, the second lens group G2, the aperture stop S, the third lens group G3, the fourth lens group G4 and the fifth lens group G5 move in directions indicated by arrows in FIG. 34 along the optical axis, and the distances between the adjacent lens groups change. Note that upon zooming, the aperture stop S, the third lens group G3 and the fifth lens group G5 integrally move.

The first lens group G1 consists of, in order from the object: a negative meniscus lens L11 having a convex surface facing the object; a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object.

The third lens group G3 consists of, in order from the object: a biconvex positive lens L31; a cemented lens composed of a negative meniscus lens L32 having a convex surface facing the object and a biconvex positive lens L33; and a biconcave negative lens L34.

The fourth lens group G4 consists of, in order from the object: a cemented lens composed of a biconvex positive lens L41 and a negative meniscus lens L42 having a concave surface facing the object; a cemented lens composed of a negative meniscus lens L43 having a convex surface facing the object and a biconvex positive lens L44; and a cemented lens composed of a biconvex positive lens L45 and a biconcave negative lens L46. The image side surface of the positive lens L44 is of aspherical shape. The image side surface of the negative lens L46 is of aspherical shape.

The fifth lens group G5 consists of, in order from the object: a negative meniscus lens L51 having a concave surface facing the object; and a biconvex positive lens L52. The image side surface of the negative meniscus lens L51 is of aspherical shape. The image surface I is disposed on the image side of the fifth lens group G5.

In this example, by moving the cemented lens composed of the positive lens L45 and the negative lens L46 in the fourth lens group G4 toward the image surface I, focusing from a far distant object to a short distant object (from an infinity object to a finite distance object) is achieved. Note that upon zooming with focusing on the short distant object, the cemented lens composed of the positive lens L45 and the negative lens L46, which serves as a focusing group, moves by a different amount of movement, with respect to the cemented lens composed of the positive lens L41 and the negative meniscus lens L42, and the cemented lens composed of the negative meniscus lens L43 and the positive lens L44 in the fourth lens group. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 12 lists values of data on the zoom optical system according to the twelfth example.

TABLE 12

[General Data]

Zooming ratio 7.848
f123w = −297.77158
f123t = −199.23081

| | W | M1 | M2 | T |
|---|---|---|---|---|
| FNO | 4.12000 | 5.69956 | 6.30000 | 6.50003 |
| ω | 42.96973 | 22.56096 | 11.03929 | 6.08825 |
| Y | 21.29 | 21.70 | 21.70 | 21.70 |
| TL | 129.0507 | 143.6432 | 173.1936 | 191.4323 |

[Lens Data]

| Surface Number | R | D | vd | nd |
|---|---|---|---|---|
| 1 | 181.0189 | 2.0855 | 31.27 | 1.90366 |
| 2 | 74.7364 | 0.8982 | | |
| 3 | 78.3131 | 6.0267 | 67.90 | 1.59319 |
| 4 | −878.3490 | 0.1429 | | |
| 5 | 65.0716 | 4.8340 | 67.90 | 1.59319 |
| 6 | 661.4054 | D1(Variable) | | |
| 7 | 171.3932 | 1.1000 | 35.72 | 1.90265 |
| 8 | 18.9469 | 5.2527 | | |
| 9 | −57.6716 | 1.0000 | 52.33 | 1.75500 |
| 10 | 53.7286 | 0.4722 | | |
| 11 | 34.8478 | 3.1650 | 20.88 | 1.92286 |
| 12 | −81.2943 | 1.3566 | | |
| 13 | −31.9419 | 0.9000 | 46.59 | 1.81600 |
| 14 | −487.1030 | D2(Variable) | | |
| 15 | ∞ | 2.0101 | | (Aperture Stop S) |
| 16 | 45.9039 | 2.3316 | 35.72 | 1.90265 |
| 17 | −163.4046 | 0.5000 | | |
| 18 | 33.6170 | 1.1581 | 29.12 | 2.00100 |
| 19 | 19.7670 | 3.5655 | 53.74 | 1.57957 |
| 20 | −85.9122 | 1.3700 | | |
| 21 | −41.3606 | 1.0329 | 32.33 | 1.95375 |
| 22 | 1717.1475 | D3(Variable) | | |
| 23 | 37.7633 | 4.9751 | 42.73 | 1.83481 |
| 24 | −38.9447 | 1.0000 | 31.27 | 1.90366 |
| 25 | −804.1582 | 0.1000 | | |
| 26 | 29.7427 | 3.0986 | 32.33 | 1.95375 |
| 27 | 15.4408 | 8.8739 | 81.49 | 1.49710 |
| 28* | −39.9876 | D4(Variable) | | |
| 29 | 10338.5730 | 3.6738 | 23.80 | 1.84666 |
| 30 | −27.6080 | 1.0000 | 40.13 | 1.85135 |
| 31* | 31.8891 | D5(Variable) | | |
| 32 | −29.8624 | 1.4000 | 40.13 | 1.85135 |
| 33* | −63.8559 | 0.1000 | | |
| 34 | 66.4034 | 4.5715 | 37.57 | 1.68376 |
| 35 | −424.4531 | BF | | |

[Aspherical Surface Data]

28th Surface

κ = 1.0000, A4 = 2.91470E−05, A6 = −1.17772E−07
A8 = 9.21285E−10, A10 = −5.94865E−12, A12 = 0.14842E−13

31st Surface

κ = 1.0000, A4 = −5.83910E−06, A6 = 1.34714E−07
A8 = −1.32747E−09, A10 = 8.60735E−12, A12 = −0.22325E−13

33rd Surface

κ = 1.0000, A4 = 4.26328E−06, A6 = −4.06929E−09
A8 = 4.06528E−11, A10 = −1.22140E−13, A12 = 0.00000E+00

[Lens Group Data]

| Group | First surface | Focal length |
|---|---|---|
| G1 | 1 | 105.7291 |
| G2 | 7 | −16.8196 |
| G3 | 16 | 48.27007 |
| G4 | 23 | 44.51528 |
| G5 | 32 | −372.043 |

[Variable Distance Data]

| | W Infinity | M1 Infinity | M2 Infinity | T Infinity |
|---|---|---|---|---|
| f | 24.72000 | 49.99999 | 104.99993 | 194.00004 |
| D0 | ∞ | ∞ | ∞ | ∞ |
| D1 | 1.73220 | 15.73205 | 40.41864 | 55.46338 |
| D2 | 20.01315 | 10.99318 | 5.91904 | 1.09143 |
| D3 | 13.56296 | 6.37783 | 3.44003 | 1.69135 |
| D4 | 4.09147 | 4.09147 | 4.09147 | 4.09147 |
| D5 | 9.90112 | 17.08625 | 20.02405 | 21.77273 |
| BF | 11.75486 | 21.36749 | 31.30545 | 39.32701 |

| | W Short-distance | M1 Short-distance | M2 Short-distance | T Short-distance |
|---|---|---|---|---|
| β | −0.06144 | −0.10950 | −0.17803 | −0.26497 |
| D0 | 370.94930 | 406.35680 | 476.80640 | 558.56770 |
| D1 | 1.73220 | 15.73205 | 40.41864 | 55.46338 |
| D2 | 20.01315 | 10.99318 | 5.91904 | 1.09143 |
| D3 | 13.56296 | 6.37783 | 3.44003 | 1.69135 |
| D4 | 4.89647 | 5.55202 | 7.55497 | 11.91843 |
| D5 | 9.09612 | 15.62570 | 16.56055 | 13.94577 |
| BF | 11.75486 | 21.36749 | 31.30545 | 39.32701 |

[Conditional expression corresponding value]

Conditional Expression(1) Mv4/Mv3 = 1.614
Conditional Expression(2) Mv2/fw = 0.350
Conditional Expression(3) ft/fw = 7.848
Conditional Expression(4) ωw = 42.970
Conditional Expression(5) ωt = 6.088
Conditional Expression(6) fw/f123w = −0.083
Conditional Expression(7) ft/f123t = −0.974
Conditional Expression(8) BFw/fw = 0.476
Conditional Expression(9) (−f5)/fw = 15.051
Conditional Expression(11) Mv1/(ft − fw) = 0.369

Figure 35A:
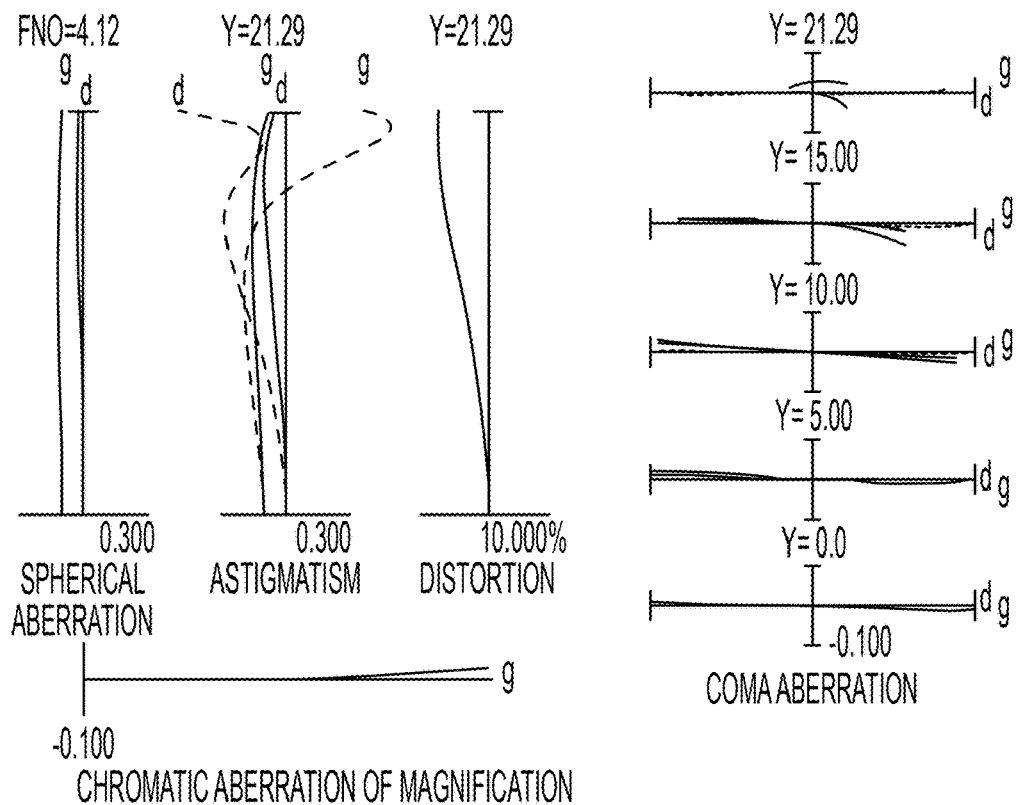
FIGS. 35A and 35B are various aberration graphs of the zoom optical system according to the twelfth example upon focusing on infinity in the wide-angle end state and a telephoto end state.
Figure 35B:
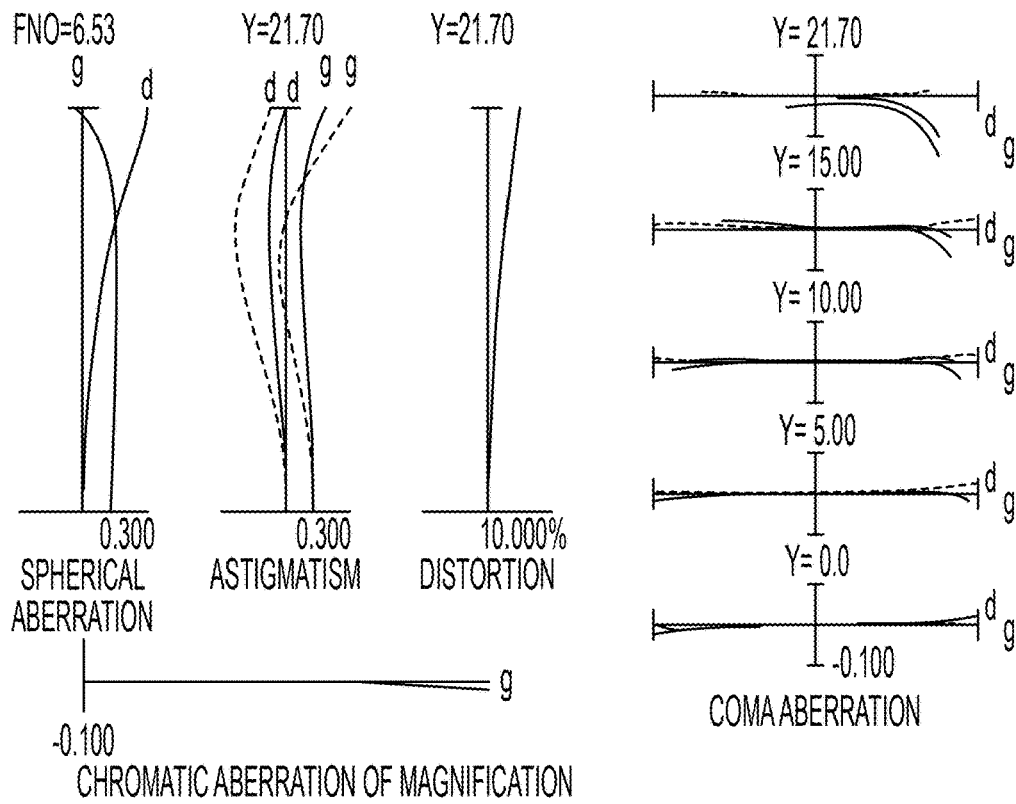
Figure 36A:
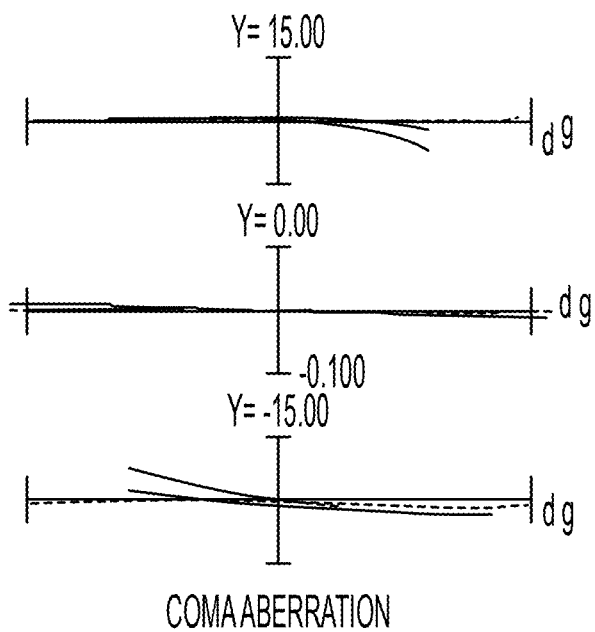
FIGS. 36A and 36B are coma aberration graphs of the zoom optical system according to the twelfth example in the wide-angle end state and the telephoto end state when blur correction is performed.
Figure 36B:
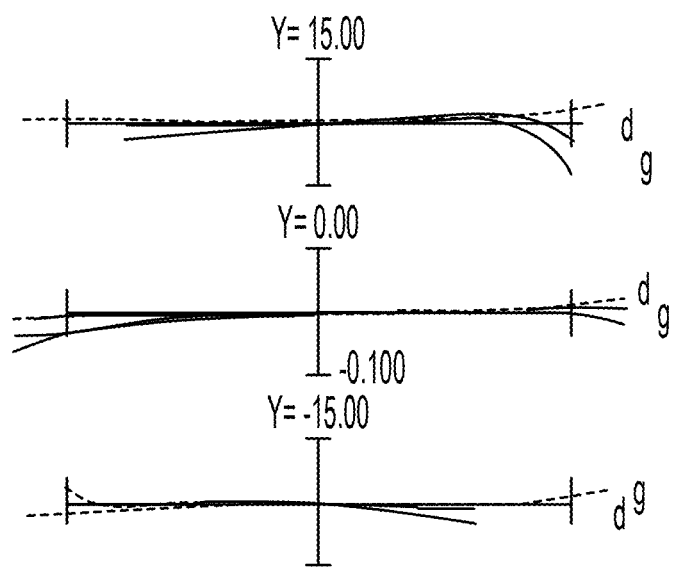

FIGS. 35A and 35B are various aberration graphs of the zoom optical system according to the twelfth example upon focusing on infinity in the wide-angle end state and the telephoto end state. FIGS. 36A and 36B are coma aberration graphs of the zoom optical system according to the twelfth example in the wide-angle end state and the telephoto end state when blur correction is performed. The various aberration graphs show that the zoom optical system according to the twelfth example favorably corrects the various aberrations, and has an excellent imaging performance.

Thirteenth Example

Figure 37:
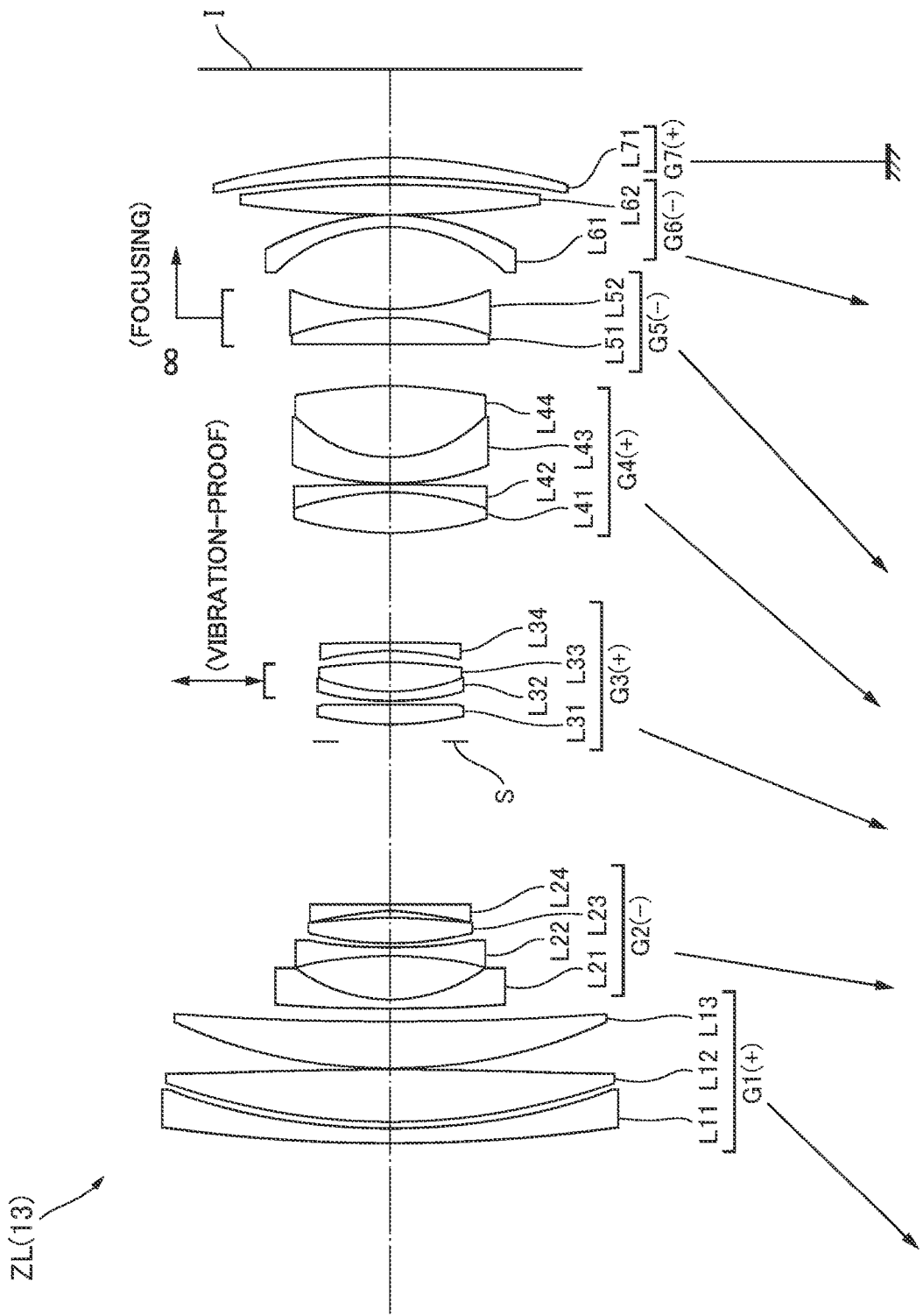
FIG. 37 is a lens configuration diagram of a zoom optical system according to a thirteenth example upon focusing on infinity in a wide angle end state.

A thirteenth example is described with reference to FIGS. 37 to 39A and 39B and Table 13. FIG. 37 is a lens configuration diagram of a zoom optical system according to the thirteenth example upon focusing on infinity in a wide angle end state. The zoom optical system ZL(13) according to the thirteenth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; a sixth lens group G6 having a negative refractive power; and a seventh lens group G7 having a positive refractive power. Upon zooming from the wide angle end state to the telephoto end state, the first lens group G1, the second lens group G2, the aperture stop S, the third lens group G3, the fourth lens group G4, the fifth lens group G5 and the sixth lens group G6 move in directions indicated by arrows in FIG. 37 along the optical axis, and the distances between the adjacent lens groups change. Note that upon zooming, the aperture stop S, the third lens group G3 and the sixth lens group G6 integrally move. Upon zooming, the seventh lens group G7 is fixed with respect to the image surface I.

The first lens group G1 consists of, in order from the object: a negative meniscus lens L11 having a convex surface facing the object; a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object.

The third lens group G3 consists of, in order from the object: a biconvex positive lens L31; a cemented lens composed of a negative meniscus lens L32 having a convex surface facing the object and a biconvex positive lens L33; and a negative meniscus lens L34 having a concave surface facing the object.

The fourth lens group G4 consists of, in order from the object: a cemented lens composed of a biconvex positive lens L41 and a negative meniscus lens L42 having a concave surface facing the object; and a cemented lens composed of a negative meniscus lens L43 having a convex surface facing the object and a biconvex positive lens L44. The image side surface of the positive lens L44 is of aspherical shape.

The fifth lens group G5 consists of a cemented lens composed of a biconvex positive lens L51 and a biconcave negative lens L52. The image side surface of the negative lens L52 is of aspherical shape.

The sixth lens group G6 consists of, in order from the object: a negative meniscus lens L61 having a concave surface facing the object; and a biconvex positive lens L62. An air lens is formed between the negative meniscus lens L61 and the positive lens L62.

The seventh lens group G7 consists of a positive meniscus lens L71 having a concave surface facing the object. An image surface I is disposed on the image side of the seventh lens group G7.

In this example, by moving the fifth lens group G5 toward the image surface I, focusing from a far distant object to a short distant object (from an infinity object to a finite distance object) is achieved. In this example, the cemented lens composed of the negative meniscus lens L32 and the positive lens L33 in the third lens group G3 constitutes a vibration-proof group that has a positive refractive power and is movable in a direction perpendicular to the optical axis, and corrects the displacement of the imaging position due to camera shake and the like (an image blur on the image surface I).

The following Table 13 lists values of data on the zoom optical system according to the thirteenth example.

TABLE 13

[General Data]

Zooming ratio 7.852
f123w = −242.5247
f123t = −265.90409

|  | W | M1 | M2 | T |
|---|---|---|---|---|
| FNO | 4.12000 | 5.69956 | 6.30000 | 6.50003 |
| ω | 42.96973 | 22.56096 | 11.03929 | 6.08825 |

TABLE 13-continued

| Y | 20.93 | 21.70 | 21.70 | 21.70 |
|---|---|---|---|---|
| TL | 127.52968 | 144.84356 | 169.66796 | 191.04949 |

[Lens Data]

| Surface Number | R | D | νd | nd |
|---|---|---|---|---|
| 1 | 183.1489 | 1.7000 | 31.27 | 1.90366 |
| 2 | 76.2993 | 0.8845 | | |
| 3 | 78.7954 | 6.1936 | 67.90 | 1.59319 |
| 4 | −594.6799 | 0.1000 | | |
| 5 | 61.9988 | 5.6077 | 67.90 | 1.59319 |
| 6 | 371.0839 | D1(Variable) | | |
| 7 | 190.1957 | 1.1000 | 35.72 | 1.90265 |
| 8 | 19.1266 | 5.1112 | | |
| 9 | −52.1202 | 1.0000 | 52.33 | 1.75500 |
| 10 | 58.1840 | 0.5132 | | |
| 11 | 36.9591 | 3.1252 | 20.88 | 1.92286 |
| 12 | −69.4993 | 0.6909 | | |
| 13 | −34.0835 | 0.9000 | 46.59 | 1.81600 |
| 14 | −15713.5710 | D2(Variable) | | |
| 15 | ∞ | 2.0000 | | (Aperture Stop S) |
| 16 | 40.7989 | 2.3289 | 35.72 | 1.90265 |
| 17 | −299.8253 | 0.5000 | | |
| 18 | 38.9427 | 1.0000 | 29.12 | 2.00100 |
| 19 | 21.5486 | 3.5304 | 53.74 | 1.57957 |
| 20 | −63.7114 | 1.3676 | | |
| 21 | −35.4002 | 1.0000 | 32.33 | 1.95375 |
| 22 | −265.5862 | D3(Variable) | | |
| 23 | 37.7375 | 4.7476 | 42.73 | 1.83481 |
| 24 | −37.5607 | 1.0000 | 31.27 | 1.90366 |
| 25 | −325.9958 | 0.1000 | | |
| 26 | 31.4406 | 3.1004 | 32.33 | 1.95375 |
| 27 | 15.3849 | 8.5803 | 81.49 | 1.49710 |
| 28* | −42.3410 | D4(Variable) | | |
| 29 | 572.4423 | 3.1728 | 23.80 | 1.84666 |
| 30 | −34.5910 | 1.0000 | 40.13 | 1.85135 |
| 31* | 31.5461 | D5(Variable) | | |
| 32 | −19.9700 | 1.4000 | 40.13 | 1.85135 |
| 33* | −28.8707 | 0.1000 | | |
| 34 | 136.4370 | 3.5760 | 37.57 | 1.68376 |
| 35 | −114.7970 | D6(Variable) | | |
| 36 | −118.5432 | 2.3370 | 63.88 | 1.51680 |
| 37 | −70.3002 | BF | | |

[Aspherical Surface Data]

28th Surface

κ = 1.0000, A4 = 3.78774E−05, A6 = −4.14498E−07
A8 = 6.80734E−09, A10 = −6.10728E−11, A12 = 0.20806E−12

31st Surface

κ = 1.0000, A4 = −1.36815E−05, A6 = 2.49099E−07
A8 = −3.33308E−09, A10 = 2.73107E−11, A12 = −0.88099E−13

33rd Surface

κ = 1.0000, A4 = 1.98989E−06, A6 = −1.03153E−08
A8 = 4.34935E−11, A10 = −1.04756E−13, A12 = 0.00000E+00

[Lens Group Data]

| Group | First surface | Focal length |
|---|---|---|
| G1 | 1 | 103.06116 |
| G2 | 7 | −17.00821 |
| G3 | 16 | 49.18043 |
| G4 | 23 | 29.23287 |
| G5 | 29 | −39.13048 |
| G6 | 32 | −1300.48544 |
| G7 | 36 | 328.82617 |

TABLE 13-continued

[Variable Distance Data]

|  | W Infinity | M1 Infinity | M2 Infinity | T Infinity |
|---|---|---|---|---|
| f | 24.72000 | 50.00000 | 104.99999 | 194.09403 |
| D0 | ∞ | ∞ | ∞ | ∞ |
| D1 | 1.50000 | 17.37231 | 39.57659 | 56.44287 |
| D2 | 19.29037 | 11.03703 | 4.56142 | 1.16368 |
| D3 | 12.96315 | 6.13632 | 3.05308 | 1.47831 |
| D4 | 4.87593 | 4.10851 | 5.56324 | 1.90252 |
| D5 | 9.73283 | 17.32708 | 18.95559 | 24.19108 |
| D6 | 0.80000 | 10.49492 | 19.59067 | 27.50369 |
| BF | 10.60000 | 10.59999 | 10.59998 | 10.59995 |

|  | W Short-distance | M1 Short-distance | M2 Short-distance | T Short-distance |
|---|---|---|---|---|
| β | −0.06123 | −0.10885 | −0.17758 | −0.28031 |
| D0 | 372.47030 | 405.15640 | 480.33200 | 508.95050 |
| D1 | 1.50000 | 17.37231 | 39.57659 | 56.44287 |
| D2 | 19.29037 | 11.03703 | 4.56142 | 1.16368 |
| D3 | 12.96315 | 6.13632 | 3.05308 | 1.47831 |
| D4 | 5.77372 | 5.76435 | 9.89727 | 11.65975 |
| D5 | 8.83504 | 15.67124 | 14.62157 | 14.43385 |
| D6 | 0.80000 | 10.49492 | 19.59067 | 27.50369 |
| BF | 11.75486 | 21.36749 | 31.30545 | 39.32701 |

[Conditional expression corresponding value]

Conditional Expression(1) Mv4/Mv3 = 1.430
Conditional Expression(2) Mv2/fw = 0.347
Conditional Expression(3) ft/fw = 7.852
Conditional Expression(4) ωw = 42.970
Conditional Expression(5) ωt = 6.088
Conditional Expression(6) fw/f123w = −0.102
Conditional Expression(7) ft/f123t = −0.730
Conditional Expression(8) BFw/fw = 0.429
Conditional Expression(9) (−f5)/fw = 1.583
Conditional Expression(10) Mv5/Mv6 = 1.541
Conditional Expression(11) Mv1/(ft − fw) = 0.375
Conditional Expression(12) (RAr2 + RAr1)/(RAr2 − RAr1) = −0.651

Figure 38A:
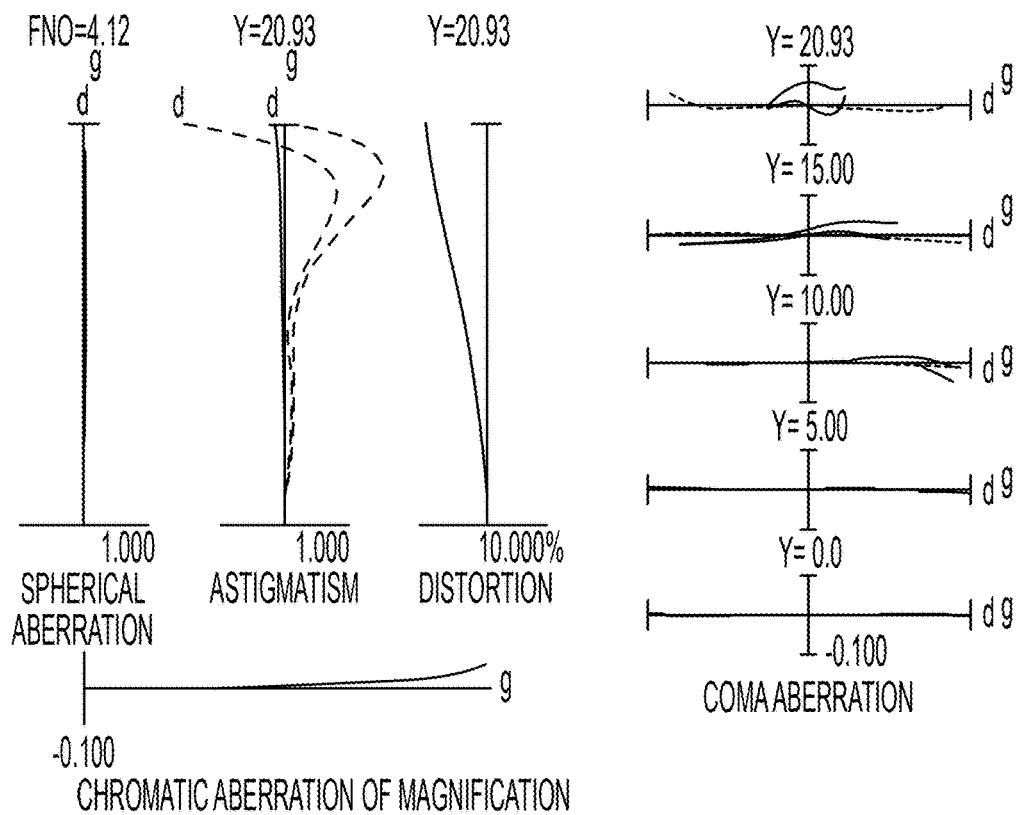
FIGS. 38A and 38B are various aberration graphs of the zoom optical system according to the thirteenth example upon focusing on infinity in the wide-angle end state and a telephoto end state.
Figure 38B:
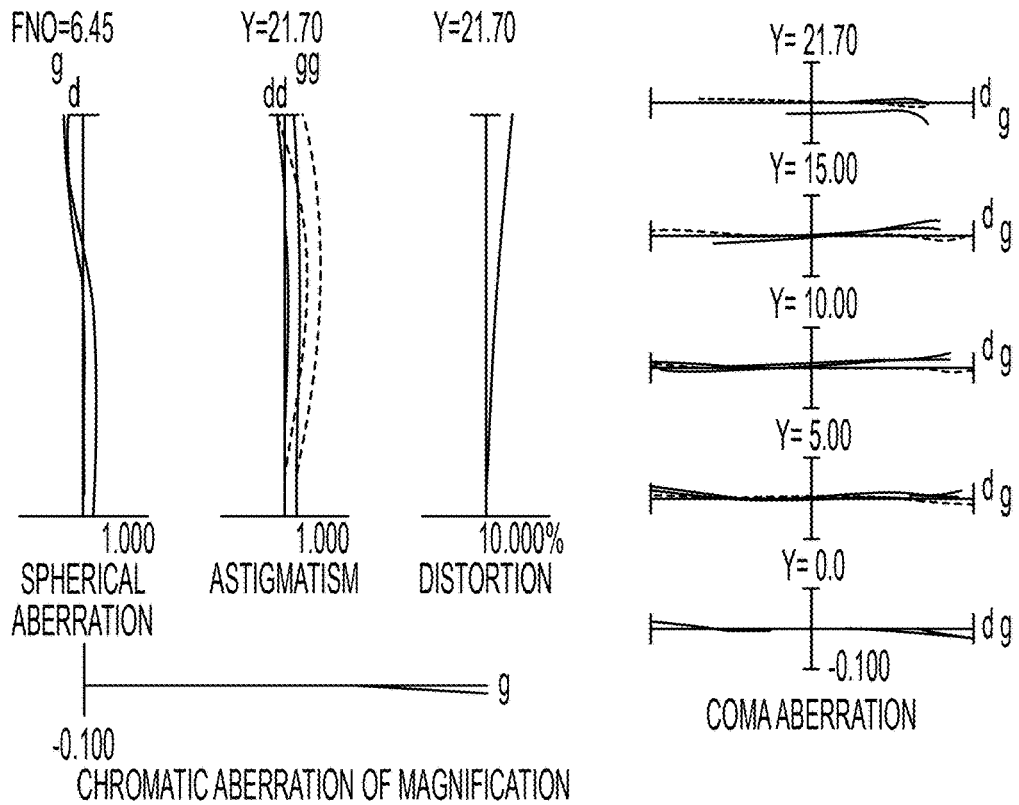
Figure 39A:
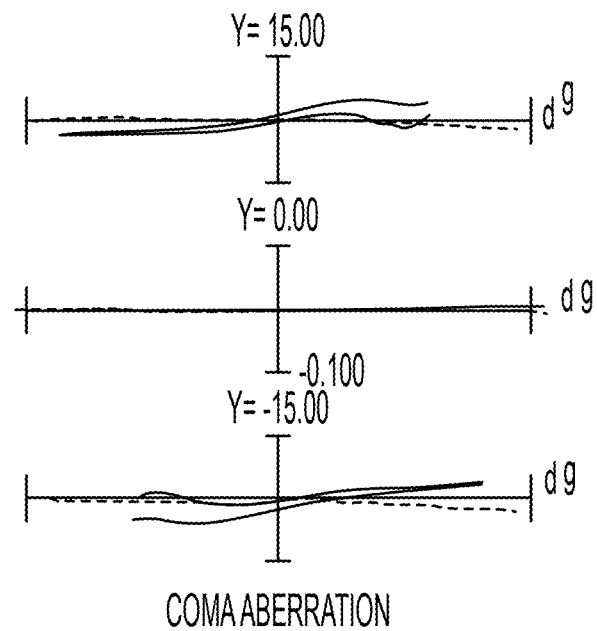
FIGS. 39A and 39B are coma aberration graphs of the zoom optical system according to the thirteenth example in the wide-angle end state and the telephoto end state when blur correction is performed.
Figure 39B:
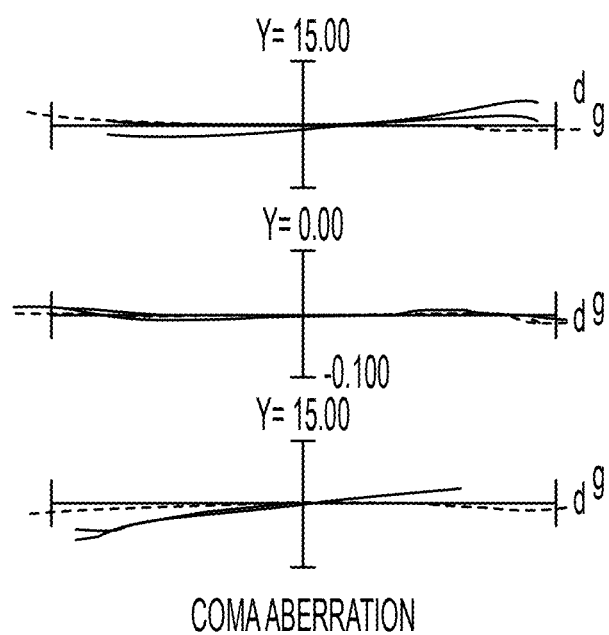

FIGS. 38A and 38B are various aberration graphs of the zoom optical system according to the thirteenth example upon focusing on infinity in the wide-angle end state and the telephoto end state. FIGS. 39A, and 39B are coma aberration graphs of the zoom optical system according to the thirteenth example in the wide-angle end state and the telephoto end state when blur correction is performed. The various aberration graphs show that the zoom optical system according to the thirteenth example favorably corrects the various aberrations, and has an excellent imaging performance.

According to each example, the zoom optical system with various aberrations, such as the spherical aberration, being favorably corrected, can be achieved.

Here, each of the examples described above indicates a specific example of the invention of the present application. The invention of the present application is not limited thereto.

Note that the following details can be appropriately adopted in a range without degrading the optical performance of the zoom optical system according to this embodiment.

As numerical examples of the zoom optical system, systems having the five-, six- and seven-element group configurations have been described. However, the present application is not limited thereto. A zoom optical system having another group configuration (for example, a four- or eight-element group configuration) may be configured. Specifically, a configuration may be adopted where a lens or a lens group is added on the most-object side or the most-image side of the zoom optical system. Note that the lens group indicates a portion that includes at least one lens separated by air distances changing during zooming.

The lens surface may be formed to be a spherical surface or a plane, or formed to be an aspherical surface. A case where lens surfaces are spherical surfaces or planes is preferable because the case facilitates processing, assembly and adjustment of lenses, and can prevent degradation of optical performances due to errors in the processing, assembly and adjustment. Furthermore, it is preferable because degradation of drawing performances is small even in case the image surface deviates.

In a case where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

To reduce flares and ghosts and achieve a high optical performance having a high contrast, an antireflection film having a high transmissivity over a wide wavelength region may be applied to each lens surface. Accordingly, flares and ghosts can be reduced, and high optical performances having a high contrast can be achieved.

EXPLANATION OF NUMERALS AND CHARACTERS

| | |
|---|---|
| G1 First lens group | G2 Second lens group |
| G3 Third lens group | G4 Fourth lens group |
| G5 Fifth lens group | G6 Sixth lens group |
| G7 Seventh lens group | |
| I Image surface | S Aperture stop |

The invention claimed is:

1. A zoom optical system, comprising, in order from an object: a first lens group having a positive refractive power; a second lens group having a negative refractive power; a third lens group having a positive refractive power; a fourth lens group having a positive refractive power; a fifth lens group; and a sixth lens group, wherein
   upon zooming, a distance between the adjacent lens groups changes,
   upon focusing, the fifth lens group moves with respect to an image surface, and
   the zoom optical system satisfies the following conditional expressions:

$$1.00 < Mv4/Mv3 < 3.00$$

$$1.00 < (-f5)/fw < 16.00$$

where Mv3: an amount of movement of the third lens group upon zooming from a wide angle end state to a telephoto end state,
   Mv4: an amount of movement of the fourth lens group upon zooming from the wide angle end state to the telephoto end state,
   f5: a focal length of the fifth lens group, and
   fw: a focal length of the zoom optical system in the wide angle end state.

2. The zoom optical system according to claim 1, wherein the zoom optical system satisfies the following conditional expression:

$$0.00 < Mv2/fw < 10.00$$

where Mv2: an amount of movement of the second lens group upon zooming from the wide angle end state to the telephoto end state.

3. The zoom optical system according to claim 1, wherein the zoom optical system satisfies the following conditional expression:

$$3.00 < ft/fw < 30.00$$

where ft: a focal length of the zoom optical system in the telephoto end state.

4. The zoom optical system according to claim 1, wherein the zoom optical system satisfies the following conditional expression:

$$35.0° < \omega w < 75.0°$$

where ωw: a half angle of view of the zoom optical system in the wide angle end state.

5. The zoom optical system according to claim 1, wherein the zoom optical system satisfies the following conditional expression:

$$2.5° < \omega t < 15.0°$$

where ωt: a half angle of view of the zoom optical system in the telephoto end state.

6. The zoom optical system according to claim 1, wherein the zoom optical system satisfies the following conditional expression:

$$-0.30 < fw/f123w < 0.60$$

where
f123w: a combined focal length of the first lens group, the second lens group and the third lens group in the wide angle end state.

7. The zoom optical system according to claim 1, wherein the zoom optical system satisfies the following conditional expression:

$$-1.50 < ft/f123t < 1.00$$

where ft: a focal length of the zoom optical system in the telephoto end state, and
f123t: a combined focal length of the first lens group, the second lens group and the third lens group in the telephoto end state.

8. The zoom optical system according to claim 1, wherein the zoom optical system satisfies the following conditional expression:

$$0.20 < BFw/fw < 0.60$$

where BFw: a distance to an image surface from a lens surface of the zoom optical system closest to an image in the wide angle end state.

9. The zoom optical system according to claim 1, wherein the fifth lens group includes at least one positive lens, and at least one negative lens.

10. The zoom optical system according to claim 1, wherein
the zoom optical system satisfies the following conditional expression:

$$1.00 < Mv5/Mv6 < 3.00$$

where Mv5: an amount of movement of the fifth lens group upon zooming from the wide angle end state to the telephoto end state, and
Mv6: an amount of movement of the sixth lens group upon zooming from the wide angle end state to the telephoto end state.

11. The zoom optical system according to claim 1, wherein upon zooming, the first lens group moves with respect to an image surface.

12. The zoom optical system according to claim 1, wherein the first lens group consists of three or more lenses.

13. The zoom optical system according to claim 1, wherein
the zoom optical system satisfies the following conditional expression:

$$0.30 < Mv1/(ft-fw) < 0.80$$

where Mv1: an amount of movement of the first lens group upon zooming from the wide angle end state to the telephoto end state, and
ft: a focal length of the zoom optical system in the telephoto end state.

14. The zoom optical system according to claim 1, wherein
an air lens is provided in the sixth lens group, and
the zoom optical system satisfies the following conditional expression:

$$0.00 < (RAr2+RAr1)/(RAr2-RAr1) < 2.00$$

where RAr1: a radius of curvature of an object-side lens surface of the air lens of the sixth lens group, and
RAr2: a radius of curvature of an image-side lens surface of the air lens of the sixth lens group.

15. The zoom optical system according to claim 1, wherein upon zooming, at least the first lens group, the third lens group, the fourth lens group, the fifth lens group, and the sixth lens group move with respect to an image surface.

16. The zoom optical system according to claim 1, wherein the lens groups moving upon zooming move toward the object upon zooming from the wide angle end state to the telephoto end state.

17. An optical apparatus, comprising the zoom optical system according to claim 1 mounted thereon.

18. A method for manufacturing a zoom optical system comprising, in order from the object: a first lens group having a positive refractive power; a second lens group having a negative refractive power; a third lens group having a positive refractive power; a fourth lens group having a positive refractive power; a fifth lens group; and a sixth lens group, the method comprising:
arranging the lens groups in a lens barrel such that:
upon zooming, a distance between the adjacent lens groups changes, upon focusing, the fifth lens group moves with respect to an image surface, and
satisfying the following conditional expressions:

$$1.00 < Mv4/Mv3 < 3.00$$

$$1.00 < (-f5)/fw < 16.00$$

where Mv3: an amount of movement of the third lens group upon zooming from a wide angle end state to a telephoto end state,
Mv4: an amount of movement of the fourth lens group upon zooming from the wide angle end state to the telephoto end state,
f5: a focal length of the fifth lens group, and
fw: a focal length of the zoom optical system in the wide angle end state.

* * * * *